(12) United States Patent
Nakagawa

(10) Patent No.: US 8,111,477 B2
(45) Date of Patent: Feb. 7, 2012

(54) RECORDING MEDIUM, RECORDING APPARATUS, REPRODUCING APPARATUS, AND REPRODUCING METHOD

(75) Inventor: Toshiyuki Nakagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 275 days.

(21) Appl. No.: 12/497,965

(22) Filed: Jul. 6, 2009

(65) Prior Publication Data
US 2010/0007984 A1 Jan. 14, 2010

(30) Foreign Application Priority Data

Jul. 11, 2008 (JP) ................... 2008-181785
Jul. 11, 2008 (JP) ................... 2008-182041

(51) Int. Cl.
*G11B 5/584* (2006.01)
(52) U.S. Cl. ................... 360/77.12
(58) Field of Classification Search ............... 360/77.12, 360/75, 72.1, 77.05, 77.06, 40, 134; 386/68, 386/200, 268
See application file for complete search history.

(56) References Cited

U.S. PATENT DOCUMENTS

| | | | | |
|---|---|---|---|---|
| 4,422,111 A * | 12/1983 | Moeller et al. | ............... | 360/72.1 |
| 4,858,039 A * | 8/1989 | Mintzlaff | ................... | 360/72.2 |
| 5,083,226 A * | 1/1992 | Shiiki et al. | ............... | 360/77.05 |
| 5,491,590 A * | 2/1996 | Endo et al. | ................... | 386/268 |
| 6,014,278 A * | 1/2000 | Gotoh et al. | ................... | 360/64 |
| 6,141,486 A * | 10/2000 | Lane et al. | ................... | 386/200 |
| 6,154,332 A * | 11/2000 | Yanagawa et al. | ............... | 360/64 |
| 6,266,204 B1 * | 7/2001 | Nonoyama | ................ | 360/73.08 |
| 6,424,482 B2 * | 7/2002 | Yanagawa et al. | ........... | 360/72.1 |
| 6,678,104 B2 * | 1/2004 | Morling et al. | ................ | 360/40 |
| 6,744,594 B2 * | 6/2004 | Denison et al. | ................ | 360/121 |
| 7,009,805 B2 * | 3/2006 | Wong et al. | ................ | 360/77.06 |
| 7,016,140 B1 * | 3/2006 | Schultz et al. | ................ | 360/75 |
| 7,359,132 B2 * | 4/2008 | Morling et al. | ................ | 360/40 |
| 2004/0175110 A1 * | 9/2004 | Kosaka et al. | ................ | 386/68 |

FOREIGN PATENT DOCUMENTS

JP 2007-265568 10/2007

* cited by examiner

*Primary Examiner* — Fred Tzeng
(74) *Attorney, Agent, or Firm* — Wolf, Greenfield & Sacks, P.C.

(57) ABSTRACT

Provided is a recording medium onto which a plurality of tracks that constitute a unit as one unit of signal processing for reproducing data are recorded, each of the plurality of tracks being recorded with at least data and, as a preamble necessary for controlling the reproduction of the data, a separation pattern necessary for detecting a positional relationship between a reproducing head and the plurality of tracks in a track width direction and synchronization patterns for synchronization processing, the synchronization patterns being recorded in front and rear of the separation pattern in a running direction of the plurality of tracks.

10 Claims, 37 Drawing Sheets

RECORDING MEDIUM, RECORDING APPARATUS, REPRODUCING APPARATUS, AND REPRODUCING METHOD

BACKGROUND OF THE INVENTION

1. Field of the Invention

The present invention relates to a reproducing apparatus and method for reproducing signals from a recording medium onto which a plurality of tracks are recorded using one or a plurality of reproducing heads.

2. Description of the Related Art

In magnetic recordings and reproductions in recent years, an additional increase in a recording density is demanded along with an increase in a capacity of magnetic recording systems. However, if a track width is narrowed so as to obtain a high recording density, there is a problem that it becomes difficult to obtain sufficient tracking performance at a time of the reproduction. In this regard, a non-tracking system capable of reading a signal from a track even when a position of a reproducing head is somewhat deviated from the track is proposed. For appropriately obtaining a reproduction signal in the non-tracking system, however, a strict restriction is placed on a setting of the reproducing head. Thus, there has been a limit in increasing the recording density by narrowing the track width.

In this regard, the inventors of the present invention have proposed a system in which a plurality of tracks that constitute one unit of signal processing for detecting data are recorded onto a magnetic recording medium using a recording head, a plurality of signals with respect to the plurality of tracks are reproduced with different positional relationships with respect to the plurality of tracks using a reproducing head capable of reproducing signals across the plurality of tracks at a time of the reproduction, and reproduction signals are combined as one unit and subjected to signal processing to thus generate a reproduction signal of each track (see, for example, Japanese Patent Application Laid-open No. 2007-265568; hereinafter, referred to as Patent Document 1). With this structure, it is possible to relieve restrictions in determining a width of the reproducing head, narrow a track width, and increase a recording density (see, for example, Patent Document 1).

FIG. 32 is a diagram showing a structure of a recording apparatus 800 that employs the magnetic recording/reproducing system described above.

As shown in the figure, the recording apparatus 800 is constituted of a multitracking section 110, a multitrack recording encoding section 120, a multitrack preamble adding section 130, a multitrack recording section 140, and a recording head array 150.

The multitracking section 110 is constituted of a data distributor 111 that divides recording data 1 into pieces of data corresponding to the number of recording heads W-1, W-2, and W-3 provided to the recording head array 150 for multitracking.

The multitrack recording encoding section 120 is constituted of M recording encoding sections 121-1, 121-2, and 121-3 that encode the M pieces of recording data divided by the data distributor 111.

The multitrack preamble adding section 130 is constituted of M preamble adding sections 131-1, 131-2, and 131-3 that add a preamble specific to each track to the corresponding recording data encoded by the multitrack recording encoding section 120.

The multitrack recording section 140 is means for recording onto the recording medium a recording code string of each track to which the preamble has been added. More specifically, the multitrack recording section 140 is constituted of M output timing setting sections 141-1, 141-2, and 141-3 that each impart a desired timing to the recording code string to which the preamble has been added, M recording compensating sections 144-1, 144-2, and 144-3 that carry out recording compensation processing, and M recording amplifiers 147-1, 147-2, and 147-3 that drive the recording heads W-1, W-2, and W-3, respectively, based on the recording code strings that have been subjected to the recording compensation processing.

FIG. 33 is a flowchart showing a unit recording operation of the recording apparatus 800. In the recording apparatus 800, the multitracking section 110 first divides input recording data 1 into pieces of data corresponding to the number of recording heads W-1, W-2, and W-3 (M=3), that is, pieces of data corresponding to the number of tracks that constitute a unit (Step S801).

The divided pieces of data are encoded into code strings that take into account recording/reproduction characteristics of a magnetic recording medium 2 in the recording encoding sections 121-1, 121-2, and 121-3 of the multitrack recording encoding section 120. At this time, information necessary for data demodulation, such as a synchronization pattern for demodulation, is added to the code strings of the data (Step S802).

Next, in each of the preamble adding sections 131-1, 131-2, and 131-3 of the multitrack preamble adding section 130, a pattern necessary for controlling the reproduction of the data per unit is added as a preamble to the encoded recording data at a predetermined position. Thus, a recording code string is obtained (Step S803).

Here, the predetermined position of the encoded recording data is a position determined while taking into account that the recording code strings are successively recorded/reproduced. Further, the preamble includes, for example, a gain control pattern used in learning for gain control with respect to the reproduction signal, a synchronization pattern used in bit synchronization processing and the like, and a separation pattern necessary for calculating a channel matrix that corresponds to a positional relationship between a plurality of reproducing heads and a plurality of tracks of one unit in a track width direction. Here, the plurality of tracks of one unit refers to a plurality of tracks that constitute one unit of signal processing for reproducing data. The synchronization pattern is also used as information for specifying a start position of the separation pattern or data for each track. Those patterns are created in consideration of a regularity of the code strings generated in the recording encoding sections 121-1, 121-2, and 121-3 of the multitrack recording encoding section 120.

After being imparted with desired timings in the output timing setting sections 141-1, 141-2, and 141-3 of the multitrack recording section 140, the recording code strings of the respective tracks are subjected to the recording compensation processing for optimization for recording onto the magnetic recording medium 2 in the recording compensating sections 144-1, 144-2, and 144-3.

After that, the recording code strings of the respective tracks are subjected to a voltage-to-current conversion in the recording amplifiers 147-1, 147-2, and 147-3 and transmitted to the recording heads W-1, W-2, and W-3, to thus be recorded onto the magnetic recording medium 2 by the recording heads W-1, W-2, and W-3 (Step S804).

Then, the recording operation per unit described above with respect to the magnetic recording medium 2 is repeated so that a plurality of units are recorded successively in a track running direction.

Next, a reproducing apparatus that employs the magnetic recording/reproducing system described above will be described.

FIG. 34 is a diagram showing a structure of a reproducing apparatus 900 that employs the magnetic recording/reproducing system described above.

As shown in the figure, the reproducing apparatus 900 includes a reproducing head array 210, a channel reproducing section 220, a signal separating section 230, a multitrack demodulating section 240, and a restoring section 260.

The reproducing head array 210 includes N (N=3) reproducing heads R-1, R-2, and R-3 that read out signals from the tracks recorded onto the magnetic recording medium 2. A head width and position of the reproducing heads R-1, R-2, and R-3 are determined so that the reproducing heads R-1, R-2, and R-3 are capable of reproducing signals from one or more adjacent tracks on the magnetic recording medium 2.

The channel reproducing section 220 includes N reproducing amplifiers 221-1, 221-2, and 221-3 that amplify the signals reproduced by the N reproducing heads R-1, R-2, and R-3 mounted to the reproducing head array 210, gain adjusting sections 224-1, 224-2, and 224-3 that control a gain so that output amplitude levels of the N reproducing amplifiers 221-1, 221-2, and 221-3 become predetermined values, and A/D converters 225-1, 225-2, and 225-3 that quantize the outputs of the gain adjusting sections 224-1, 224-2, and 224-3 into digital values of a predetermined bit width.

It should be noted that a lowpass filter for removing unnecessary high-frequency components may be provided immediately before the A/D converters 225-1, 225-2, and 225-3 as necessary.

Moreover, the gain adjusting sections 224-1, 224-2, and 224-3 may be disposed subsequent to the A/D converters 225-1, 225-2, and 225-3 instead of before. This is effective in a case where the bit widths of the A/D converters 225-1, 225-2, and 225-3 are to be used effectively or a structure of the gain adjusting sections 224-1, 224-2, and 224-3 is to be made a simple structure that takes into account the detection of the patterns included in the preamble.

The signal separating section 230 includes a synchronization signal detecting section 231 for detecting synchronization patterns from the outputs of the A/D converters 225-1, 225-2, and 225-3, and a signal separating processor 236 for specifying a start position of the separation patterns based on synchronization signals detected by the synchronization signal detecting section 231 and carrying out a channel estimation calculation and a signal separation calculation using the separation patterns, to thus separate a reproduction signal of each track from the reproduction signals of one unit reproduced by the plurality of reproducing heads R-1, R-2, and R-3.

The multitrack demodulating section 240 includes M equalizers 241-1, 241-2, and 241-3 that carry out equalization processing on the reproduction signal of each track separated by the signal separating processor 236, M PLLs 242-1, 242-2, and 242-3 that carry out bit synchronization based on the outputs of the equalizers 241-1, 241-2, and 241-3, M detectors 243-1, 243-2, and 243-3 exemplified by a Viterbi detector, for generating code strings by binarizing the reproduction signals of the respective tracks using bit synchronization signals generated by the PLLs 242-1, 242-2, and 242-3, M synchronization signal detectors 244-1, 244-2, and 244-3 that detect the synchronization patterns on the code strings from the binarized reproduction signals as the outputs of the detectors 243-1, 243-2, and 243-3, and M decoders 245-1, 245-2, and 245-3 that specify a start position of the data based on the synchronization patterns detected by the synchronization signal detectors 244-1, 244-2, and 244-3 and decode data strings from the code strings.

The restoring section 260 includes a data integrator 261 that couples the data of the tracks output from the M decoders 245-1, 245-2, and 245-3 of the multitrack demodulating section 240 by an operation opposite to that at the time of recording, to thus restore reproduction data 3.

FIG. 35 is a flowchart showing a flow of a unit reproduction operation of the reproducing apparatus 900. In the reproducing apparatus 900, signals are first reproduced from the plurality of tracks of one unit on the magnetic recording medium 2 using the N reproducing heads R-1, R-2, and R-3 capable of reproducing signals from one or more adjacent tracks (Step S901).

Next, after the output amplitude levels of the reproducing amplifiers 221-1, 221-2, and 221-3 are adjusted by the gain adjusting sections 224-1, 224-2, and 224-3, the outputs of the gain adjusting sections 224-1, 224-2, and 224-3 are converted into digital values by the A/D converters 225-1, 225-2, and 225-3 and output to the synchronization signal detecting section 231 (Step S902).

The synchronization signal detecting section 231 detects, for each of the outputs of the A/D converters 225-1, 225-2, and 225-3, a synchronization pattern to specify a start position of the separation pattern in the preamble and the like (Step S903).

Next, the signal separating processor 236 specifies the start position of the separation patterns based on the synchronization signals detected by the synchronization signal detecting section 231 and obtains a channel matrix that corresponds to the positional relationship between each of the reproducing heads R-1, R-2, and R-3 and the plurality of tracks of one unit in the track width direction by the channel estimation calculation using the separation patterns (Step S904). After that, the reproduction signals of the respective tracks are separated from the reproduction signals of one unit reproduced by the reproducing heads R-1, R-2, and R-3 using the channel matrix (Step S905).

After that, the data string is decoded from the reproduction signal of each track by the multitrack demodulating section 240 (Step S906), and the pieces of data of the tracks are coupled by the restoring section 260. Thus, reproduction data 3 is obtained (Step S907).

SUMMARY OF THE INVENTION

Here, a case where the magnetic recording/reproducing system described above is applied to a linear tape storage system will be discussed. As a standard of a large-capacity linear tape aiming at high-speed reading/writing, there is an LTO (Linear Tape-Open) and the like. In the case of the linear tape, recording and reproduction are carried out as follows by a scan in both directions. For example, a scan is carried out in one direction along a longitudinal direction of the linear tape (forward direction), and when a head has reached an end of the linear tape, the head is forwarded in a direction orthogonal to the longitudinal direction of the linear tape so that a scan in a backward direction is subsequently carried out.

However, the preamble of Patent Document 1 only supports the reading in the same direction as the recording direction (forward direction) and not the reading in the direction opposite to the recording direction. Therefore, signals of the preamble and data cannot be expected to be favorably reproduced by the reproduction in the direction opposite to the recording direction. Particularly when a track width is narrowed for increasing a recording density, it is expected that a degree of an influence of a positional deviation of the reproducing head from the track on the reproduction increases and the reproduction in the direction opposite to the recording direction thus becomes difficult. Furthermore, also when a width of the reproducing head is increased with respect to the recording track width as in Patent Document 1, the same situation as in the case where a track interval is reduced is caused.

In view of the circumstances as described above, there is a need for a recording medium, a recording apparatus, and a reproducing apparatus that are capable of favorably carrying out data reproduction processing in both the forward direction and the backward direction.

Moreover, in a case where a plurality of units are recorded in parallel along a running direction of the tracks, the reproduction is carried out such that, after one unit is finished being reproduced, the reproducing head is forwarded to a position of the next unit so that the reproduction of the next unit is started therefrom. When forwarding the reproducing head, the reproducing head is forwarded in a direction orthogonal to the running direction of the tracks only by a fixed forwarding amount determined according to a track format. Therefore, when a position of the reproducing head with respect to the track in the track width direction is deviated from its proper position at a point when the reproduction of the unit is finished to the end, a deviation amount thereof is carried over to a positional relationship between the next unit and the reproducing head, thus imparting an adverse influence on subsequent data reproductions.

In view of the circumstances as described above, there is also a need for a reproducing apparatus and method that are capable of favorably carrying out data reproduction processing by correcting a positional relationship between a unit and a reproducing head in a track width direction when the reproducing head is forwarded in the track width direction for switching the unit to be reproduced.

According to an embodiment of the present invention, there is provided a recording medium onto which a plurality of tracks that constitute a unit as one unit of signal processing for reproducing data are recorded, each of the plurality of tracks being recorded with at least data and, as a preamble necessary for controlling the reproduction of the data, a separation pattern necessary for detecting a positional relationship between a reproducing head and the plurality of tracks in a track width direction and synchronization patterns for synchronization processing, the synchronization patterns being recorded in front and rear of the separation pattern in a running direction of the plurality of tracks.

According to the embodiment of the present invention, because the synchronization patterns are recorded in front and rear of the separation pattern, a reproduction signal of the separation pattern can be accurately estimated based on a result of the detection of the synchronization patterns at a time of the reproductions in the forward direction and the backward direction. Accordingly, signal separation processing and data reproduction processing can be carried out favorably. In addition, because the synchronization pattern can be detected twice in total in front and rear of the separation pattern, synchronization detection can be carried out more accurately. Particularly since the synchronization pattern in the rear of the separation pattern is disposed right before the data, accuracy in estimating a head position of the data based on a result of the detection of the synchronization patterns is improved.

The synchronization patterns recorded in front and rear of the separation pattern may be constituted of code strings that are longitudinally symmetric with respect to each other.

Accordingly, a specific code string can be detected as a synchronization pattern at the time of the reproduction in both the forward direction and the backward direction, with the result that a synchronization pattern as a detection target does not need to be changed depending on the reproduction direction, thus simplifying processing of a detecting section that detects synchronization patterns.

Moreover, in the recording medium according to the embodiment of the present invention, the preamble is at least recorded at a start point and an end point of each of the plurality of tracks. Accordingly, it becomes possible to obtain, when the reproduction direction is switched between the forward direction and the backward direction every time the unit to be reproduced is switched, a reproduction signal of the preamble immediately after a trace of the next unit is started, and estimate the reproduction signal of the separation pattern based on a result of the detection of the synchronization patterns in the preamble.

According to an embodiment of the present invention, there is provided a recording apparatus recording, onto a recording medium using a recording head, a plurality of tracks that constitute a unit as one unit of signal processing for reproducing data, including a recording encoding section, a preamble adding section, and a multitrack recording section. The recording encoding section encodes data to be recorded for each of the plurality of tracks. The preamble adding section adds, to the data of each of the plurality of tracks that has been encoded by the recording encoding section, as a preamble necessary for controlling the reproduction of the data, a separation pattern necessary for detecting a positional relationship between a reproducing head and the plurality of tracks in a track width direction, the separation pattern being provided with synchronization patterns for synchronization processing in front and rear thereof. The multitrack recording section carries out processing for recording the data of each of the plurality of tracks, to which the preamble has been added, onto the recording medium using the recording head.

According to an embodiment of the present invention, there is provided a reproducing apparatus reproducing a recording medium onto which a plurality of tracks that constitute a unit as one unit of signal processing for reproducing data are recorded, each of the plurality of tracks being recorded with at least data and, as a preamble necessary for controlling the reproduction of the data, a separation pattern necessary for detecting a positional relationship between a reproducing head and the plurality of tracks in a track width direction and synchronization patterns for synchronization processing, the synchronization patterns being recorded in front and rear of the separation pattern in a running direction of the plurality of tracks, the reproducing apparatus including a detecting section and an estimating section. The detecting section detects the synchronization patterns in front and rear of the separation pattern. The estimating section estimates a head position of the separation pattern and the data based on a result of detecting the synchronization patterns by the detecting section at a time of reproduction in a first direction along the plurality of tracks and a time of reproduction in a second direction opposite to the first direction.

Furthermore, according to an embodiment of the present invention, there is provided a reproducing apparatus reproducing a tape-like recording medium onto which a plurality of tracks that constitute a unit as one unit of signal processing for reproducing data are recorded, each of the plurality of tracks being recorded with data and, as a pattern necessary for controlling the reproduction of the data, a preamble including a separation pattern necessary for detecting a positional relationship between a reproducing head and the plurality of tracks in a track width direction, the unit being recorded plurally in parallel to each other along a running direction of the plurality of tracks, the reproducing apparatus including one or more reproducing heads, an estimating section, and a forwarding amount calculating section. The one or more reproducing heads are capable of reproducing signals across one or more tracks. The estimating section estimates a positional relationship between the one or more reproducing heads and the plurality of tracks in the track width direction at a time of the reproduction using a reproduction signal of the separation pattern. The forwarding amount calculating section calculates a forwarding amount of the one or more reproducing heads at a time of switching the unit to be reproduced based on the positional relationship obtained by the estimating section.

According to the embodiment of the present invention, it is possible to forward, when forwarding the reproducing head among the units, the reproducing head only by an appropriate forwarding amount that takes into account a positional deviation amount between the unit and the reproducing head before the forwarding in the track width direction, and favorably carry out the data reproduction while forwarding the reproducing head among the units.

The forwarding amount calculating section may calculate an adjustment amount with respect to a defined forwarding amount of the one or more reproducing heads at the time of switching the unit to be reproduced based on the positional relationship obtained by the estimating section, and calculate a value obtained by adjusting the defined forwarding amount by the adjustment amount as a calculation result. The defined forwarding amount used herein refers to a fixed value determined in advance according to a track format.

Further, the reproducing apparatus according to the embodiment of the present invention may further include a judging section to judge a quality of the reproduced data. In this case, the forwarding amount calculating section may additionally calculate a forwarding amount of the one or more reproducing heads at a time of retracing the unit when reproduction data of a unit that does not satisfy a predetermined quality is judged by the judging section. Accordingly, it is possible to forward, to a position of the unit to be retraced, the reproducing head only by an appropriate forwarding amount that takes into account the positional deviation amount between the unit and the reproducing head before the forwarding in the track width direction, the forwarding amount being a forwarding amount of the reproducing head for retracing the same unit, and favorably carry out the reproduction by the retrace of the unit that has failed to be reproduced.

Furthermore, in the reproducing apparatus according to the embodiment of the present invention, the preamble recorded onto the recording medium may be constituted of patterns that are capable of being reproduced in both a forward direction as a running direction of the plurality tracks and a backward direction opposite thereto, the reproduction direction at a time of trace being switched alternately between the forward direction and the backward direction. In other words, according to the embodiment of the present invention, by forwarding, when forwarding the reproducing head among the units, the reproducing head only by an appropriate forwarding amount that takes into account the positional deviation amount between the unit and the reproducing head before the forwarding in the track width direction, a series of data reproductions can favorably be carried out while forwarding the reproducing head among the units.

In addition, in the reproducing apparatus according to the embodiment of the present invention, the preamble may include gain control patterns in front and rear of the separation pattern. In this case, the reproducing apparatus may further include a gain controller to control a gain with respect to a reproduction output of the one or more reproducing heads based on a reproduction signal of the gain control patterns in the preamble.

Moreover, in the reproducing apparatus according to the embodiment of the present invention, the preamble may include, in front and rear of the separation pattern, synchronization patterns for estimating a head position of a pattern and data disposed subsequent thereto in terms of a reproduction order. In this case, the reproducing apparatus may further include a detecting section to detect the synchronization patterns in the preamble.

According to another embodiment of the present invention, there is provided a method of reproducing a tape-like recording medium onto which a plurality of tracks that constitute a unit as one unit of signal processing for reproducing data are recorded, each of the plurality of tracks being recorded with data and, as a pattern necessary for controlling the reproduction of the data, a preamble including a separation pattern necessary for detecting a positional relationship between a reproducing head and the plurality of tracks in a track width direction at a time of the reproduction, the unit being recorded plurally in parallel to each other along a running direction of the plurality of tracks. The method includes: estimating a positional relationship between one or more reproducing heads capable of reproducing signals across one or more tracks and the plurality of tracks in the track width direction at the time of the reproduction using a reproduction signal of the separation pattern; and calculating a forwarding amount of the one or more reproducing heads at a time of switching the unit to be reproduced based on the estimated positional relationship.

As described above, according to the embodiments of the present invention, it is possible to correct the positional relationship between the unit and the reproducing head in the track width direction when forwarding the reproducing head in the track width direction for switching the unit to be reproduced, and thus favorably carry out data reproduction processing.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described in detail with reference to the drawings.

First Embodiment

Figure 1:
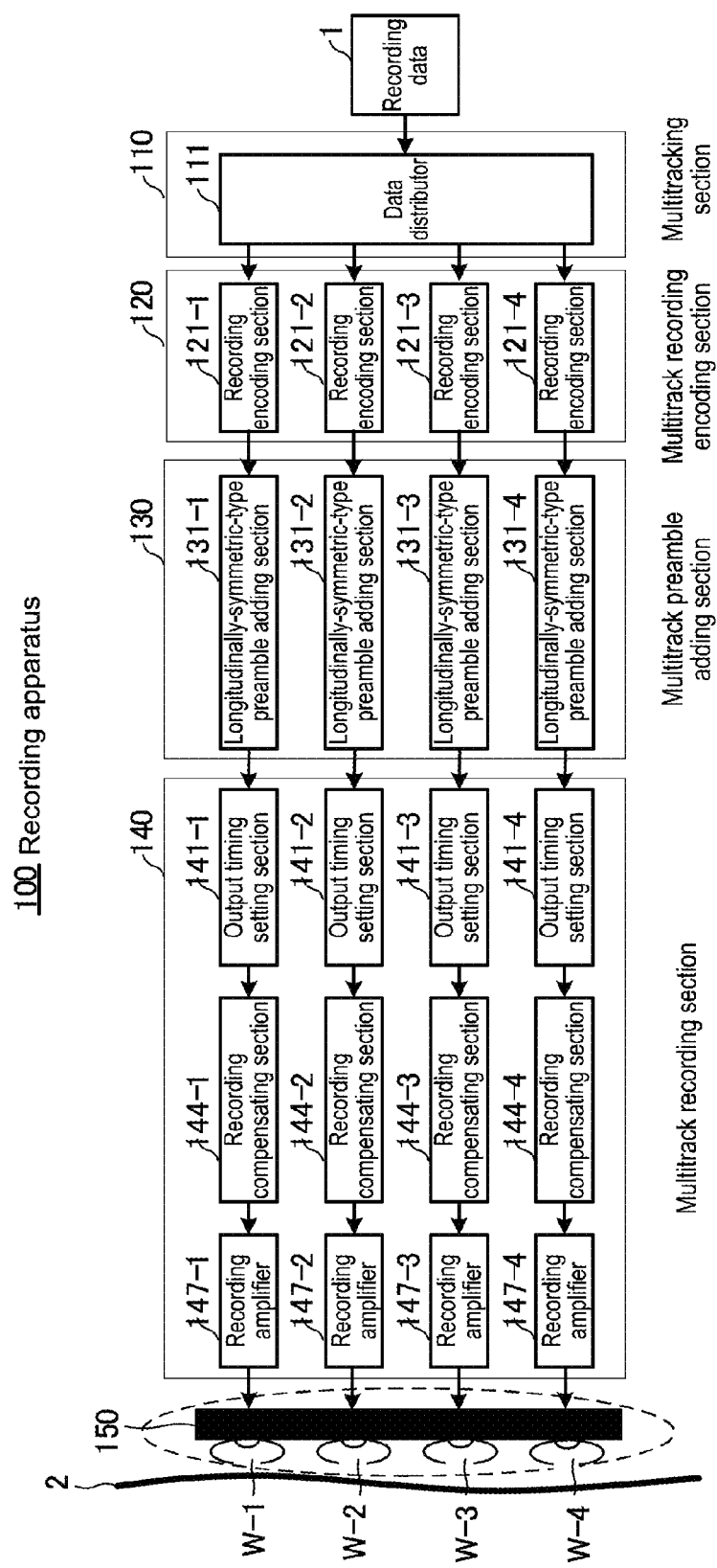
FIG. 1 is a diagram showing a structure of a recording apparatus in a magnetic recording/reproducing system that uses a multihead according to a first embodiment of the present invention.

FIG. 1 is a diagram showing a structure of a recording apparatus in a magnetic recording/reproducing system that uses a multihead according to a first embodiment of the present invention. A recording apparatus in this magnetic recording/reproducing system is an apparatus that records a signal onto a tape-like magnetic recording medium without aligning a recording position for each track, and a reproducing apparatus of this magnetic recording/reproducing system is an apparatus that reproduces the signal from the magnetic recording medium without aligning a reproduction position for each track. Here, the number of recording heads is represented by M, and the number of reproducing heads is represented by N. In this embodiment, M and N are both set to 4.

As shown in the figure, a recording apparatus 100 is constituted of a multitracking section 110, a multitrack recording encoding section 120, a multitrack preamble adding section 130, a multitrack recording section 140, and a recording head array 150.

The multitracking section 110 is constituted of a data distributor 111 that divides recording data 1 into pieces of data corresponding to the number of recording heads W-1, W-2, W-3, and W-4 (M=4) provided to the recording head array 150 for multitracking.

The multitrack recording encoding section 120 is constituted of M recording encoding sections 121-1, 121-2, 121-3, and 121-4 that encode the M pieces of recording data divided by the data distributor 111.

The multitrack preamble adding section 130 is constituted of M longitudinally-symmetric-type preamble adding sections 131-1, 131-2, 131-3, and 131-4 that add a longitudinally-symmetric-type preamble that can be read from both a forward direction and a backward direction to the pieces of recording data encoded by the multitrack recording encoding section 120, as a preamble necessary for controlling a data reproduction per unit.

The multitrack recording section 140 is means for recording onto the recording medium a recording code string of each track to which the preamble has been added. More specifically, the multitrack recording section 140 is constituted of M output timing setting sections 141-1, 141-2, 141-3, and 141-4 that impart desired timings to the recording code strings to which the preambles have been added, M recording compensating sections 144-1, 144-2, 144-3, and 144-4 that carry out recording compensation processing, and M recording amplifiers 147-1, 147-2, 147-3, and 147-4 that drive the individual recording heads W-1, W-2, W-3, and W-4, respectively, based on the recording code strings that have been subjected to the recording compensation processing.

The recording head array 150 includes M recording heads W-1, W-2, W-3, and W-4 used for recording tracks including data onto a magnetic recording medium 2.

Figure 2:
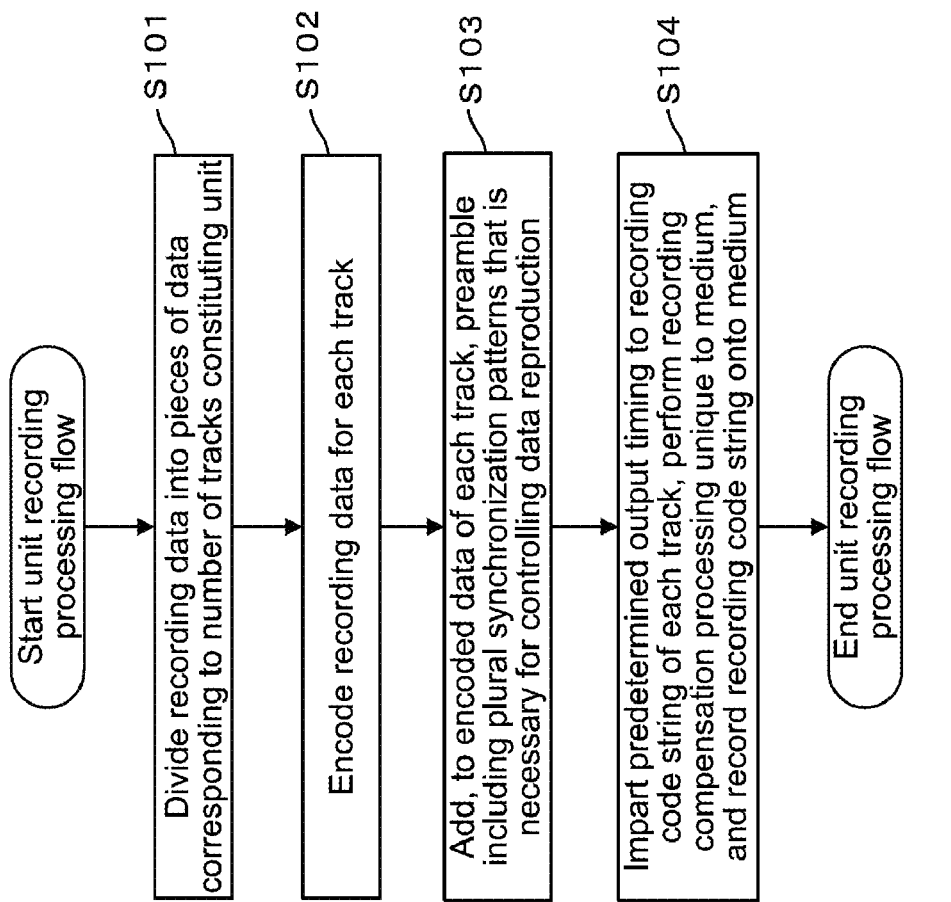
FIG. 2 is a flowchart showing a unit recording operation of a recording apparatus according to the first embodiment.

FIG. 2 is a flowchart showing a unit recording operation of the recording apparatus 100. In the recording apparatus 100, the multitracking section 110 first divides input recording data 1 into pieces of data corresponding to the number of recording heads W-1, W-2, W-3, and W-4 (M=4), that is, pieces of data corresponding to the number of tracks that constitute a unit (Step S101).

The divided pieces of data are encoded into code strings that take into account recording/reproduction characteristics of the magnetic recording medium 2 in the recording encoding sections 121-1, 121-2, 121-3, and 121-4 of the multitrack recording encoding section 120. At this time, information necessary for data demodulation, such as a synchronization pattern for demodulation, is added to the code string of the data (Step S102).

Next, in the longitudinally-symmetric-type preamble adding sections 131-1, 131-2, 131-3, and 131-4 of the multitrack preamble adding section 130, a longitudinally-symmetric-type preamble that can be read from both the forward direction and the backward direction is added to the pieces of recording data encoded by the recording encoding sections 121-1, 121-2, 121-3, and 121-4, as a preamble necessary for controlling the data reproduction. Thus, recording code strings are obtained (Step S103).

Here, examples of the pattern of the preamble necessary for controlling the data reproduction include a gain control pattern used in learning for gain control with respect to a reproduction signal, a synchronization pattern used for synchronization detection for bit synchronization processing and the like, an identification pattern for identifying a track, and a separation pattern necessary for calculating a channel matrix that corresponds to a positional relationship between a plurality of reproducing heads and a plurality of tracks of one unit in a track width direction. The plurality of tracks of one unit refers to a plurality of tracks that constitute a unit as one unit of signal processing for the data reproduction. The synchronization pattern is also used as information for specifying a head position of various patterns and data disposed subsequent thereto for each track. The patterns described above are created in consideration of a regularity of the code strings generated in the recording encoding sections 121-1, 121-2, 121-3, and 121-4 of the multitrack recording encoding section 120.

After being imparted with desired timings in the output timing setting sections 141-1, 141-2, 141-3, and 141-4 of the multitrack recording section 140, the recording code string of the respective tracks are subjected to recording compensation processing for optimization for recording onto the magnetic recording medium 2 in the recording compensating sections 144-1, 144-2, 144-3, and 144-4. The recording code strings of the respective tracks that have been subjected to the recording compensation processing are then subjected to a voltage-to-current conversion in the recording amplifiers 147-1, 147-2, 147-3, and 147-4 and transmitted to the recording heads W-1, W-2, W-3, and W-4, to thus be recorded onto the magnetic recording medium 2 by the recording heads W-1, W-2, W-3, and W-4 (Step S104).

Next, a reproducing apparatus in the magnetic recording/reproducing system according to the first embodiment of the present invention will be described.

Figure 3:
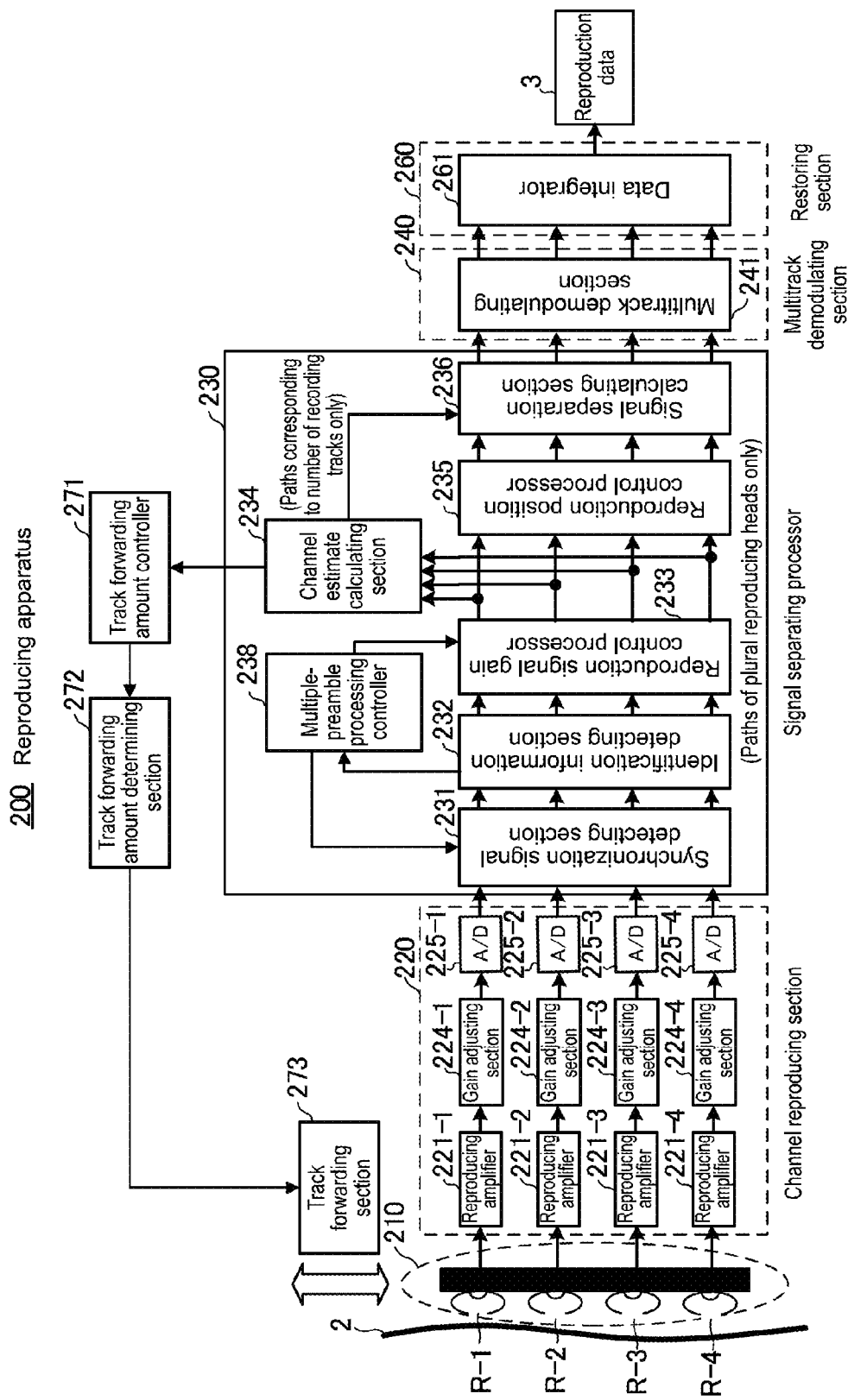
FIG. 3 is a diagram showing a structure of a reproducing apparatus according to the first embodiment.

FIG. 3 is a diagram showing a structure of a reproducing apparatus 200 in the magnetic recording/reproducing system according to the first embodiment.

As shown in the figure, the reproducing apparatus 200 includes a reproducing head array 210, a channel reproducing section 220, a signal separating processor 230, a multitrack demodulating section 240, a restoring section 260, a track forwarding amount controller 271, a track forwarding amount determining section 272, and a track forwarding section 273.

The reproducing head array 210 includes N (N=4) reproducing heads R-1, R-2, R-3, and R-4 that read out signals from the tracks recorded onto the magnetic recording medium 2. A head width and position of the reproducing heads R-1, R-2, R-3, and R-4 are determined so that the reproducing heads R-1, R-2, R-3, and R-4 are capable of reproducing signals from one or more adjacent tracks on the magnetic recording medium 2.

The channel reproducing section 220 includes N reproducing amplifiers 221-1, 221-2, 221-3, and 221-4 that amplify the signals reproduced by the N reproducing heads R-1, R-2, R-3, and R-4 mounted to the reproducing head array 210, gain adjusting sections 224-1, 224-2, 224-3, and 224-4 that control a gain so that output amplitude levels of the N reproducing amplifiers 221-1, 221-2, 221-3, and 221-4 become predetermined values, and A/D converters 225-1, 225-2, 225-3, and 225-4 that quantize the outputs of the gain adjusting sections 224-1, 224-2, 224-3, and 224-4 into digital values of a predetermined bit width.

It should be noted that a lowpass filter for removing unnecessary high-frequency components may be provided immediately before the A/D converters 225-1, 225-2, 225-3, and 225-4 as necessary.

Moreover, the gain adjusting sections 224-1, 224-2, 224-3, and 224-4 may be disposed subsequent to the A/D converters 225-1, 225-2, 225-3, and 225-4 instead of before. This is effective in a case where the bit widths of the A/D converters 225-1, 225-2, 225-3, and 225-4 are to be used effectively or a structure of the gain adjusting sections 224-1, 224-2, 224-3, and 224-4 is to be made a simple structure that takes into account the detection of the patterns included in the preamble.

The signal separating processor 230 includes a synchronization signal detecting section 231, an identification information detecting section 232, a reproduction signal gain control processor 233, a channel estimate calculating section 234, a reproduction position control processor 235, a signal separation calculating section 236, and a multiple-preamble processing controller 238.

The synchronization signal detecting section 231 detects a synchronization pattern recorded in front of the separation pattern from the reproduction signal of each of the reproducing heads R-1, R-2, R-3, and R-4 output from the corresponding one of the A/D converters 225-1, 225-2, 225-3, and 225-4.

The identification information detecting section 232 uses information obtained by the synchronization signal detecting section 231 to specify and detect a head position of the identification patterns in the reproduction signals of the reproducing heads R-1, R-2, R-3, and R-4, to thus obtain identification information of the tracks.

Regarding each of the tracks identified by the identification information detecting section 232, the multiple-preamble processing controller 238 specifies head positions of various patterns subsequent to the synchronization pattern that has been detected first in terms of a reproduction order. Then, the multiple-preamble processing controller 238 carries out predetermined processing control such as a calculation of a gain with respect to the reproduction signals of the reproducing heads R-1, R-2, R-3, and R-4 based on reproduction signals of various patterns within a preamble disposed subsequent to the separation pattern (third preamble).

Based on a reproduction signal of a gain control pattern within a preamble disposed in front of the separation pattern in terms of the reproduction order (first preamble), the reproduction signal gain control processor 233 calculates a gain with respect to the reproduction signals of the reproducing heads R-1, R-2, R-3, and R-4, combines the gain with the gain input from the multiple-preamble processing controller 238, determines a more-appropriate gain with respect to the reproduction signals of the reproducing heads R-1, R-2, R-3, and R-4, and controls a level of the reproduction signals by amplifying the reproduction signals by the gain.

Based on the synchronization patterns detected by the synchronization signal detecting section 231 and the identification information obtained by the identification information detecting section 232, the channel estimate calculating section 234 specifies a head position of the separation pattern included in the preamble of the reproduction signal of each of the reproducing heads R-1, R-2, R-3, and R-4 and carries out a channel estimation calculation for calculating a channel matrix that corresponds to the positional relationship between the plurality of reproducing heads R-1, R-2, R-3, and R-4 and the plurality of tracks in the track width direction based on the reproduction signals of the separation patterns output from the reproduction signal gain control processor 233.

Based on the information obtained by the synchronization signal detecting section 231, the reproduction position control processor 235 carries out processing of aligning reproduction positions of the reproduction signals of the reproducing heads R-1, R-2, R-3, and R-4 that have passed through the reproduction signal gain control processor 233.

The signal separation calculating section 236 carries out processing of separating, from each of the reproduction signals of the reproducing heads R-1, R-2, R-3, and R-4 whose reproduction positions have been aligned by the reproduction position control processor 235, a reproduction signal of each track by predetermined calculation processing using the channel matrix obtained by the channel estimate calculating section 234.

It should be noted that the signal separating processor 230 includes a storing section (not shown) for storing information necessary for the processing. The signal separating processor 230 stores in the storing section, for example, pieces of information of a predetermined number of units that are constituted of preambles and data and processes the information.

Figure 4:
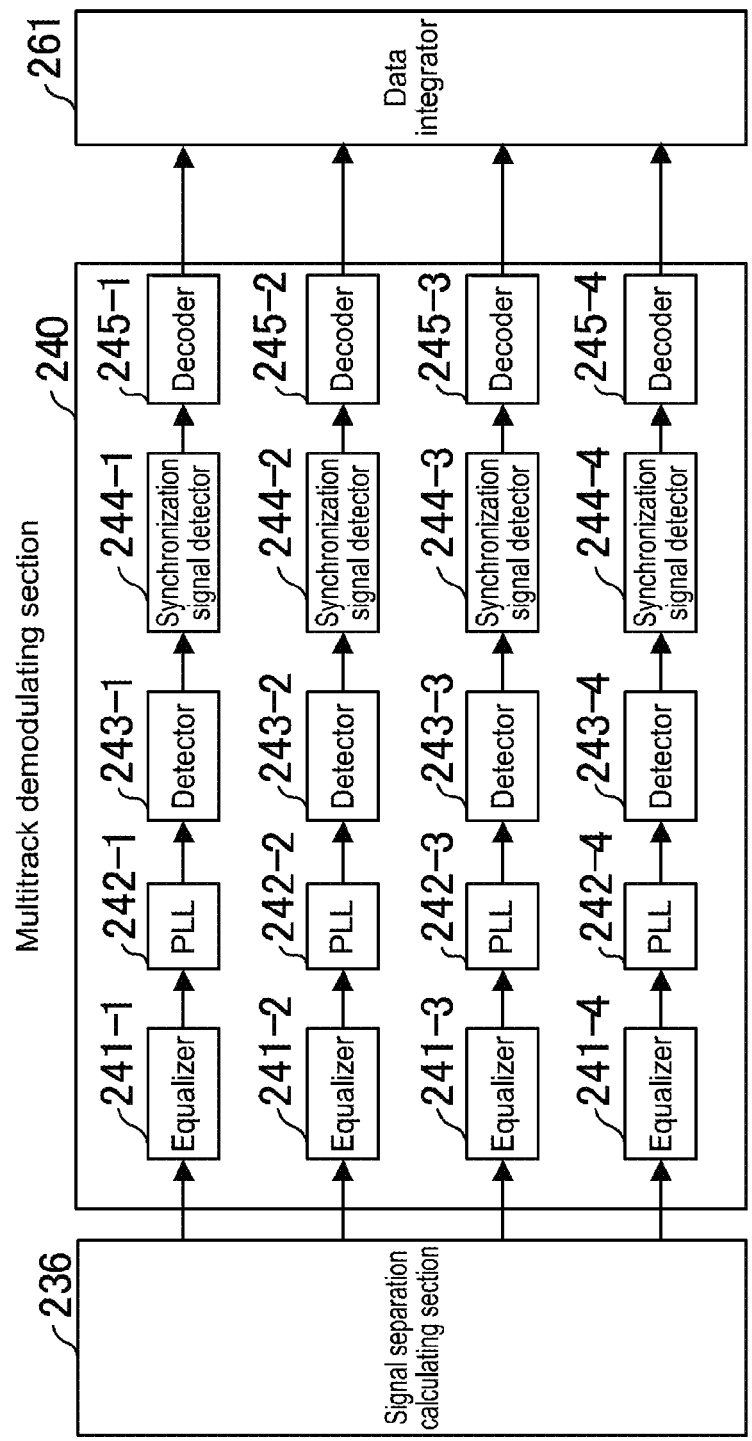
FIG. 4 is a diagram showing a structure of a multitrack demodulating section.

As shown in FIG. 4, the multitrack demodulating section 240 includes M equalizers 241-1, 241-2, 241-3, and 241-4 that carry out equalization processing on the reproduction signal of each track separated by the signal separation calculating section 236, M PLLs 242-1, 242-2, 242-3, and 242-4 that carry out bit synchronization processing based on the outputs of the equalizers 241-1, 241-2, 241-3, and 241-4, M detectors 243-1, 243-2, 243-3, and 243-4 exemplified by a Viterbi detector, for generating code strings by binarizing the reproduction signals of the respective tracks using bit synchronization signals generated by the PLLs 242-1, 242-2, 242-3, and 242-4, M synchronization signal detectors 244-1, 244-2, 244-3, and 244-4 that detect the synchronization patterns on the code strings from the binarized reproduction signals as the outputs of the detectors 243-1, 243-2, 243-3, and 243-4, and M decoders 245-1, 245-2, 245-3, and 245-4 that specify a head position of the data based on the synchronization patterns detected by the synchronization signal detectors 244-1, 244-2, 244-3, and 244-4 and decode data strings from the code strings. It should be noted that the multitrack demodulating section 240 includes a storing section (not shown) that stores information such as data necessary for the processing above.

Referring back to FIG. 3, the restoring section 260 includes a data integrator 261 that couples the data of the tracks output from the M decoders 245-1, 245-2, 245-3, and 245-4 of the multitrack demodulating section 240 by an operation opposite to that at the time of recording, to thus restore reproduction data 3.

The track forwarding amount controller 271 calculates, based on the channel matrix obtained by the channel estimate calculating section 234 through the channel estimation calculation, an adjustment amount with respect to a defined forwarding amount of the reproducing heads R-1, R-2, R-3, and R-4 at a time of switching the unit to be reproduced.

The track forwarding amount determining section 272 determines, as an appropriate forwarding amount, a value obtained by adjusting the defined forwarding amount of the reproducing heads R-1, R-2, R-3, and R-4 determined in advance according to the track format by the adjustment amount obtained by the track forwarding amount controller 271, and outputs a control signal corresponding to the appropriate forwarding amount to the track forwarding section 273.

In response to the control signal output from the track forwarding amount determining section 272, the track forwarding section 273 moves the reproducing heads R-1, R-2, R-3, and R-4 in the track width direction (Step S200). More specifically, the track forwarding section 273 includes a mechanism section for moving the reproducing heads R-1, R-2, R-3, and R-4 in the track width direction and a controller for controlling the mechanism section. Upon receiving the control signal from the track forwarding amount determining section 272, the controller controls the mechanism section so that the reproducing heads R-1, R-2, R-3, and R-4 move based on the control signal.

Figure 5:
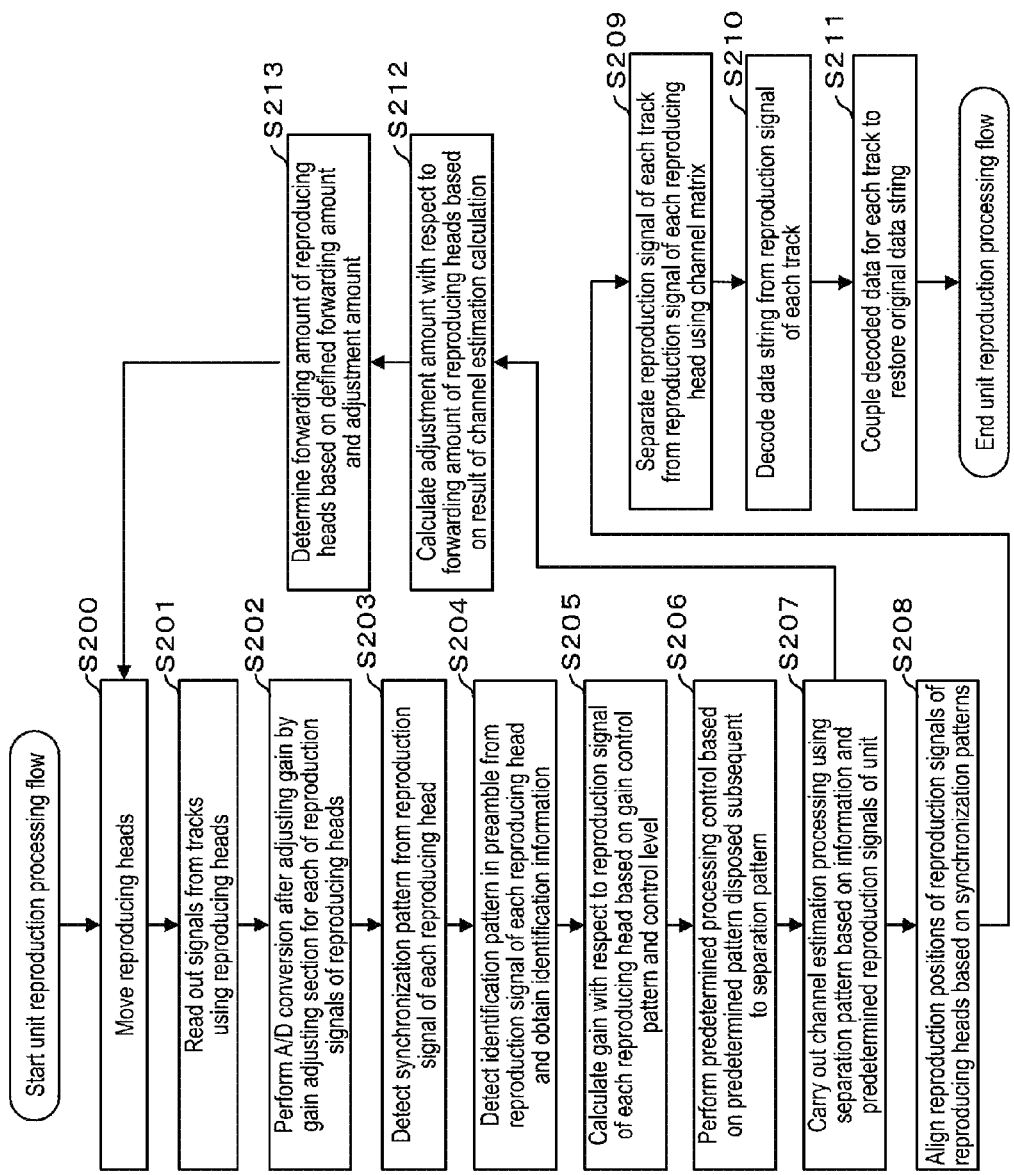
FIG. 5 is a flowchart showing a flow of a unit reproduction operation of the reproducing apparatus according to the first embodiment.

FIG. 5 is a flowchart showing a flow of a unit reproduction operation of the reproducing apparatus 200.

First, in the reproducing apparatus 200, the track forwarding section 273 moves each of the reproducing heads R-1, R-2, R-3, and R-4 in the track width direction based on the forwarding amount determined by the track forwarding amount determining section 272 (Step S200).

Next, the N reproducing heads R-1, R-2, R-3, and R-4 that are capable of reproducing signals from one or more adjacent tracks read out signals from the plurality of tracks of one unit on the magnetic recording medium 2 (Step S201).

Next, the gain adjusting sections 224-1, 224-2, 224-3, and 224-4 adjust the output amplitude levels of the reproducing amplifiers 221-1, 221-2, 221-3, and 221-4. The outputs of the gain adjusting sections 224-1, 224-2, 224-3, and 224-4 are converted into digital values by the A/D converters 225-1, 225-2, 225-3, and 225-4 and output to the synchronization signal detecting section 231 (Step S202).

Subsequently, the synchronization signal detecting section 231 detects the synchronization patterns from the reproduction signals of the reproducing heads R-1, R-2, R-3, and R-4 respectively output from the A/D converters 225-1, 225-2, 225-3, and 225-4 (Step S203).

After that, the identification information detecting section 232 specifies head positions of identification patterns in the reproduction signals of the reproducing heads R-1, R-2, R-3, and R-4 based on the information obtained by the synchronization signal detecting section 231 to thus detect the identification patterns, and obtains identification information (Step S204).

Subsequently, the reproduction signal gain control processor 233 detects a reproduction signal of the gain control pattern within the preamble (first preamble 23 (see FIG. 7)) from each of the reproduction signals of the reproducing heads R-1, R-2, R-3, and R-4 that have passed through the synchronization signal detecting section 231. Based on the reproduction signals of the gain control patterns, the reproduction signal gain control processor 233 calculates a gain with respect to the reproduction signals of the reproducing heads R-1, R-2, R-3, and R-4, obtains a more-appropriate gain by combining the gain with the gain obtained from the multiple-preamble processing controller 238, and amplifies the reproduction signals of the reproducing heads R-1, R-2, R-3, and R-4 by the gain (Step S205).

Next, regarding the tracks identified by the identification information detecting section 232, the multiple-preamble processing controller 238 specifies head positions of the various patterns and data subsequent to the synchronization pattern detected first in terms of the reproduction order. Then, the multiple-preamble processing controller 238 detects the reproduction signal of the gain control pattern within the preamble disposed subsequent to each of the separation patterns (third preamble), calculates a gain with respect to the reproduction signals of the reproducing heads R-1, R-2, R-3, and R-4 based on the reproduction signals of the gain control patterns, and outputs the gain to the reproduction signal gain control processor 233 (Step S206).

Next, the channel estimate calculating section 234 specifies head positions of the reproduction signals of the separation patterns based on the synchronization patterns detected by the synchronization signal detecting section 231 and the identification information of the tracks detected by the identification information detecting section 232, and carries out a channel estimation calculation based on the reproduction signals of the separation patterns of the reproducing heads R-1, R-2, R-3, and R-4 output from the reproduction signal gain control processor 233, to thus obtain a channel matrix (Step S207).

Here, the channel matrix corresponds to positional information of the reproducing heads R-1, R-2, R-3, and R-4 with respect to tracks #1, #2, #3, and #4 of one unit in the track width direction, that is, information indicating what reproducing heads R-1, R-2, R-3, and R-4 positionally overlap what tracks within the unit by what ratio.

Next, based on the synchronization patterns detected by the synchronization signal detecting section 231, the reproduction position control processor 235 carries out processing of aligning the reproduction positions of the reproduction signals of the reproducing heads R-1, R-2, R-3, and R-4 that have passed through the reproduction signal gain control processor 233 (Step S208).

Then, the signal separation calculating section 236 uses the channel matrix obtained by the channel estimate calculating section 234 to carry out processing of separating the reproduction signals of the respective tracks from the reproduction signals of the reproducing heads R-1, R-2, R-3, and R-4 whose reproduction positions have been aligned by the reproduction position control processor 235 (Step S209).

After that, the multitrack demodulating section 240 decodes the data string from the reproduction signal of each track (Step S210), and the restoring section 260 couples the data of the tracks so that reproduction data 3 is obtained (Step S211).

In the processing described above, the channel matrix obtained by the channel estimate calculating section 234 through the channel estimation calculation is also transmitted to the track forwarding amount controller 271. Based on the channel matrix input from the channel estimate calculating section 234, the track forwarding amount controller 271 calculates an adjustment amount with respect to the defined forwarding amount of the reproducing heads R-1, R-2, R-3, and R-4 at a time of switching the unit to be reproduced (at a time of switching the reproduction direction between the forward direction and the backward direction in this embodiment) (Step S212). The adjustment amount calculated by the track forwarding amount controller 271 is transmitted to the track forwarding amount determining section 272.

The track forwarding amount determining section 272 is preset with a defined value of a forwarding amount of the reproducing heads R-1, R-2, R-3, and R-4. In this embodiment, the defined forwarding amount is a sum of a total width of the plurality of tracks that constitute a unit and a width of a guard band 52. Upon obtaining the adjustment amount from the track forwarding amount controller 271, the track forwarding amount determining section 272 determines a value obtained by adjusting the defined forwarding amount among the units by the adjustment amount as an appropriate forwarding amount of the reproducing heads R-1, R-2, R-3, and R-4 (Step S213), and outputs a control signal corresponding to the forwarding amount to the track forwarding section 273.

Then, in response to the control signal from the track forwarding amount determining section 272, the track forwarding section 273 moves the reproducing heads R-1, R-2, R-3, and R-4 in the track width direction. Accordingly, the reproducing heads R-1, R-2, R-3, and R-4 can start the reproduction from appropriate positions in the track width direction from immediately after the switch of the unit to be reproduced (immediately after the reproduction direction is switched in this embodiment), thus resulting in a favorable data reproduction. The appropriate positions in the track width direction used herein are, for example, positions at which centers of all the reproducing heads R-1, R-2, R-3, and R-4 in the track width direction match centers of the respective tracks in the track width direction.

Figure 6:
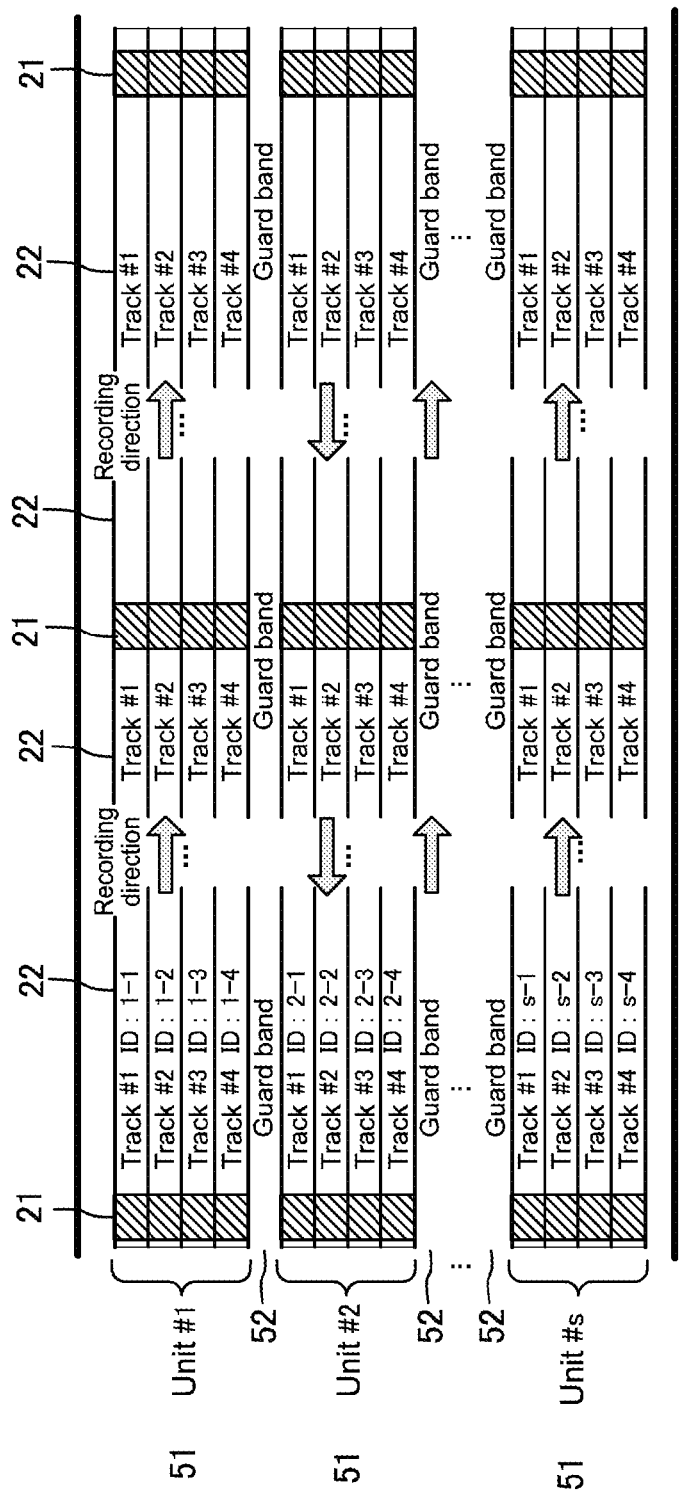
FIG. 6 is a diagram showing a track format according to the first embodiment.

FIG. 6 is a conceptual diagram showing a track format of the magnetic recording medium 2 recorded by the recording apparatus 100 described above.

The tracks #1, #2, #3, and #4 are tracks that have been recorded onto the magnetic recording medium 2 by M (M=4) recording heads of the recording apparatus 100. The tracks #1, #2, #3, and #4 are each recorded with a preamble 21 and data 22. As described above, the preamble 21 includes, as information necessary for reproducing the data 22, a gain control pattern, a synchronization pattern, an identification pattern, and a separation pattern necessary for calculating a channel matrix that corresponds to the positional relationship between the plurality of reproducing heads and the plurality of tracks of one unit in the track width direction.

In each of the tracks #1, #2, #3, and #4, the preamble 21 and the data 22 are recorded alternately in a track running direction. Specifically, the data 22 is interposed between the preambles 21, and the preambles 21 are recorded at both end portions of each of the tracks #1, #2, #3, and #4.

Here, a group of M preambles 21 and M pieces of data 22 on the tracks #1, #2, #3, and #4 corresponds to a unit 51 as one unit of signal processing for the data reproduction.

On the magnetic recording medium 2, s units 51 are recorded in parallel along the track running direction, and an area called a guard band 52 is provided between the adjacent units 51. The purpose of providing the guard band 52 is to prevent tracks of the adjacent unit 51 from being reproduced.

Here, a recording direction with respect to the magnetic recording medium 2 will be described. In the example of FIG. 6, a recording direction of a unit #1 is from left to right in the figure (forward direction), and a recording direction of a unit #2 is from right to left in the figure (backward direction). In other words, when the recording is started from the left end of the unit #1 and completed to the right end, a recording position shifts to a position for recording the unit #2 so that the recording is next started from the right end toward the left-hand direction. Then, upon completion of the recording to the left end of the unit #2, the recording position again shifts to a position for recording the next unit #3 (not shown) and the recording is again started from the left end. The recording of s units is carried out by thus alternately switching the recording direction between the forward direction and the backward direction for each of the units.

Figure 7:
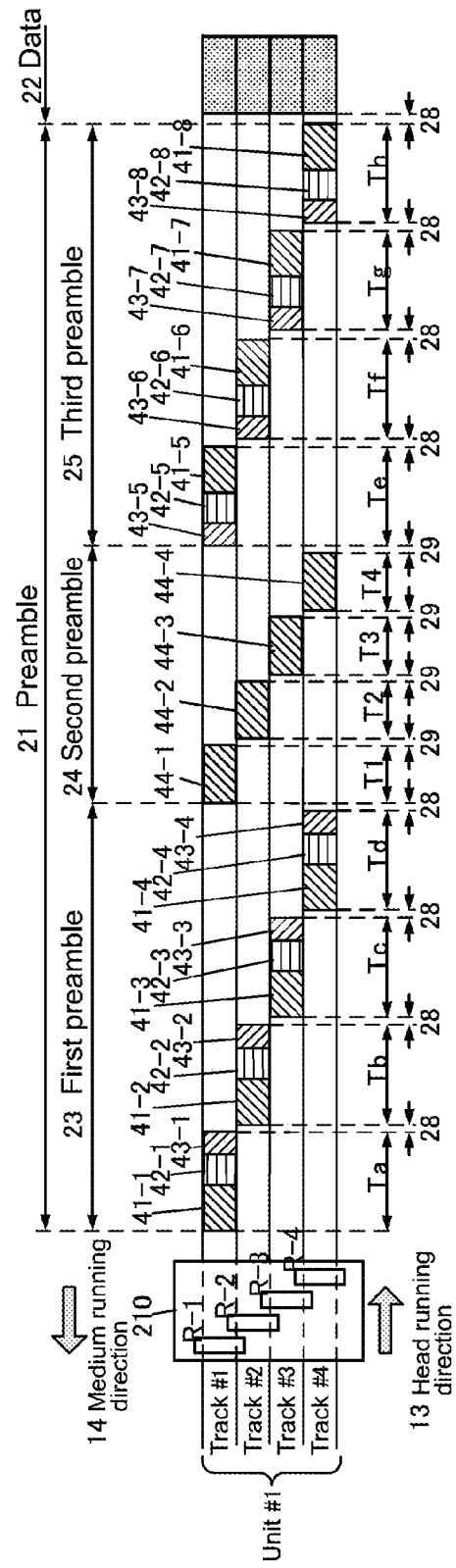
FIG. 7 is a diagram showing a structure of a preamble of a unit #1 in the track format shown in FIG. 6.

FIG. 7 is a diagram showing a structure of the preamble 21 of the unit #1 in the track format shown in FIG. 6.

As shown in the figure, the preamble 21 is constituted of a first preamble 23, a second preamble 24, and a third preamble 25. The first preamble 23, the second preamble 24, and the third preamble 25 are arranged in the stated order from left to right in the figure.

The first preamble 23 is constituted of gain control patterns 41-1, 41-2, 41-3, and 41-4, synchronization patterns 42-1, 42-2, 42-3, and 42-4, and identification patterns 43-1, 43-2, 43-3, and 43-4. The gain control patterns 41-1, 41-2, 41-3, and 41-4, the synchronization patterns 42-1, 42-2, 42-3, and 42-4, and the identification patterns 43-1, 43-2, 43-3, and 43-4 are arranged successively in the stated order from left to right in the figure.

The second preamble 24 is constituted of separation patterns 44-1, 44-2, 44-3, and 44-4 necessary for the channel estimation calculation.

Similar to the first preamble 23, the third preamble 25 is constituted of gain control patterns 41-5, 41-6, 41-7, and 41-8, synchronization patterns 42-5, 42-6, 42-7, and 42-8, and identification patterns 43-5, 43-6, 43-7, and 43-8. Those patterns are provided from left to right in the figure in the stated order of the identification patterns 43-5, 43-6, 43-7, and 43-8, the synchronization patterns 42-5, 42-6, 42-7, and 42-8, and the gain control patterns 41-5, 41-6, 41-7, and 41-8. In other words, the order in which the gain control patterns, the synchronization patterns, and the identification patterns are arranged in the third preamble 25 is opposite to that in the first preamble 23.

On the track #1, the gain control pattern 41-1, the synchronization pattern 42-1, the identification pattern 43-1, the separation pattern 44-1, the identification pattern 43-5, the synchronization pattern 42-5, and the gain control pattern 41-5 are arranged in the stated order from left to right in the figure.

On the track #2, the gain control pattern 41-2, the synchronization pattern 42-2, the identification pattern 43-2, the separation pattern 44-2, the identification pattern 43-6, the synchronization pattern 42-6, and the gain control pattern 41-6 are arranged in the stated order from left to right in the figure.

On the track #3, the gain control pattern 41-3, the synchronization pattern 42-3, the identification pattern 43-3, the separation pattern 44-3, the identification pattern 43-7, the synchronization pattern 42-7, and the gain control pattern 41-7 are arranged in the stated order from left to right in the figure.

On the track #4, the gain control pattern 41-4, the synchronization pattern 42-4, the identification pattern 43-4, the separation pattern 44-4, the identification pattern 43-8, the synchronization pattern 42-8, and the gain control pattern 41-8 are arranged in the stated order from left to right in the figure.

For the synchronization patterns, the gain control patterns, and the identification patterns of the first preamble 23 and the third preamble 25, longitudinally-symmetric patterns with which the same signal can be read by the reproduction in both the forward direction and the backward direction are employed, for example. For example, in a case where the synchronization pattern is "4T-4T-3T-2T" (T: symbol), the synchronization pattern of the first preamble 23 becomes "10001000100101" and the synchronization pattern of the third preamble 25 becomes "10100100010001". Thus, the same code string is reproduced in both the forward direction and the backward direction. Here, the last one bit in both of the synchronization patterns indicates an inversion. The patterns from which the same code string can be reproduced in both the forward direction and the backward direction can also be employed for the gain control patterns and the identification patterns.

It should be noted that since the gain control patterns are repetition signals of a certain frequency (e.g., repetition of 3T), the gain control patterns are originally longitudinally-symmetric patterns.

The data 22 is recorded subsequent to the third preamble 25. The data 22 is a recording code string created by the corresponding one of the recording encoding sections 121-1, 121-2, 121-3, and 121-4 of the recording apparatus 100 shown in FIG. 1 at the time of the recording. The first preamble 23, the second preamble 24, and the third preamble 25 are added to each of the recording code strings by the preamble adding sections 131-1, 131-2, 131-3, and 131-4.

In the first preamble 23, the gain control patterns 41-1, 41-2, 41-3, and 41-4, the synchronization patterns 42-1, 42-2, 42-3, and 42-4, and the identification patterns 43-1, 43-2, 43-3, and 43-4 of the respective tracks #1, #2, #3, and #4 are arranged so that positions thereof in the track running direction do not overlap one another. Specifically, the gain control pattern 41-1, the synchronization pattern 42-1, and the identification pattern 43-1 of the track #1 are arranged in a Ta section, the gain control pattern 41-2, the synchronization pattern 42-2, and the identification pattern 43-2 of the track #2 are arranged in a Tb section, the gain control pattern 41-3, the synchronization pattern 42-3, and the identification pattern 43-3 of the track #3 are arranged in a Tc section, and the gain control pattern 41-4, the synchronization pattern 42-4, and the identification pattern 43-4 of the track #4 are arranged in a Td section. Moreover, between the recording sections of the first preamble 23 on each track, a marginal gap 28 is provided.

The same holds true in the third preamble 25. Specifically, in the third preamble 25, the gain control patterns 41-5, 41-6, 41-7, and 41-8, the synchronization patterns 42-5, 42-6, 42-7, and 42-8, and the identification patterns 43-5, 43-6, 43-7, and 43-8 of the respective tracks #1, #2, #3, and #4 are arranged so that positions thereof in the track running direction do not overlap one another. Specifically, the gain control pattern 41-5, the synchronization pattern 42-5, and the identification pattern 43-5 of the track #1 are arranged in a Te section, the gain control pattern 41-6, the synchronization pattern 42-6, and the identification pattern 43-6 of the track #2 are arranged in a Tf section, the gain control pattern 41-7, the synchronization pattern 42-7, and the identification pattern 43-7 of the track #3 are arranged in a Tg section, and the gain control pattern 41-8, the synchronization pattern 42-8, and the identification pattern 43-8 of the track #4 are arranged in a Th section. Moreover, between the recording sections of the third preamble 25 on each track, a marginal gap 28 is provided.

Next, referring back to FIG. 6, a description will be given on the identification patterns 43-1, 43-2, 43-3, 43-4, 43-5, 43-6, 43-7, and 43-8 in the first preamble 23 and the third preamble 25 on the respective tracks #1, #2, #3, and #4.

Identification information encoded as the identification pattern is expressed as, for example, a combination of a number from "1" to "s" that identifies a unit and a number from "1" to "4" that identifies a track within the unit. For example, "1_2" indicates a second track in a first unit.

In addition, instead of giving an identification number to the unit as described above, identification may be performed with, for example, the unit as a unit of a system frame or a unit of an error correction format.

Next, a relationship between the reproduction in the forward direction and the preamble 21 and a relationship between the reproduction in the backward direction and the preamble 21 will be described. Here, the forward direction refers to a direction in which the reproduction position moves from left to right in the figure, and the backward direction refers to the opposite direction.

First, a relationship between the reproduction in the forward direction and the preamble 21 will be described with reference to FIG. 7.

FIG. 7 is a diagram showing a structure of the preamble 21 of the unit #1 in the track format shown in FIG. 6. In the unit #1, the recording is performed from left to right in the figure.

At the time of the reproduction in the forward direction, the gain control patterns 41-1, 41-2, 41-3, and 41-4 in the first preamble 23 on the respective tracks #1, #2, #3, and #4 are used for gain control of the reproducing amplifiers 221-1, 221-2, 221-3, and 221-4 by the gain adjusting sections 224-1, 224-2, 224-3, and 224-4. The gain control patterns 41-1, 41-2, 41-3, and 41-4 are also used for gain control with respect to the reproduction signals in the reproduction signal gain control processor 233. In addition, the gain control patterns 41-1, 41-2, 41-3, and 41-4 can be used for controlling the reproduction positions of the reproduction signals in the reproduction position control processor 235.

At the time of the reproduction in the forward direction, the synchronization patterns 42-1, 42-2, 42-3, and 42-4 in the first preamble 23 on the respective tracks #1, #2, #3, and #4 are detected by the synchronization signal detecting section 231 and the multiple-preamble processing controller 238 and used as information for estimating head positions of the various patterns and data subsequent thereto. Specifically, the blocks that receive detection information from the multiple-preamble processing controller 238 can estimate which head position of what pattern is recorded how many bits away from a point when the synchronization patterns 42-1, 42-2, 42-3, and 42-4 of the first preamble 23 have been detected. The synchronization patterns 42-1, 42-2, 42-3, and 42-4 are also used for reproduction position control of the reproduction signals in the reproduction position control processor 235.

At the time of the reproduction in the forward direction, the identification patterns 43-1, 43-2, 43-3, and 43-4 in the first preamble 23 on the respective tracks #1, #2, #3, and #4 are detected by the identification information detecting section 232 and used for obtaining identification information of the tracks.

In the first preamble 23, the patterns of the tracks #1, #2, #3, and #4 are arranged so that positions thereof in the track running direction do not overlap one another. Therefore, even in a case where channel lock positions of the tracks #1, #2, #3, and #4 are deviated, lowering of the output of the reproduction signals due to the recording signals of the tracks canceling each other out is not caused when the reproducing heads R-1, R-2, R-3, and R-4 reproduce signals across the plurality of tracks. Accordingly, the processing control described above that uses the gain control patterns 41-1, 41-2, 41-3, and 41-4, the synchronization patterns 42-1, 42-2, 42-3, and 42-4, and the identification patterns 43-1, 43-2, 43-3, and 43-4 can favorably be carried.

At the time of the reproduction in the forward direction, the separation patterns 44-1, 44-2, 44-3, and 44-4 on the respective tracks #1, #2, #3, and #4 are used for obtaining a channel matrix that is necessary for a calculation for separating the reproduction signals of the tracks #1, #2, #3, and #4 from the reproduction signals of the reproducing heads R-1, R-2, R-3, and R-4, respectively, in the channel estimate calculating section 234.

The separation patterns 44-1, 44-2, 44-3, and 44-4 are also arranged so that positions thereof in the track running direction do not overlap one another. Specifically, in FIG. 7, the separation pattern 44-1 of the track #1 is recorded in a T1 section, the separation pattern 44-2 of the track #2 is recorded in a T2 section, the separation pattern 44-3 of the track #3 is recorded in a T3 section, and the separation pattern 44-4 of the track #4 is recorded in a T4 section. Accordingly, the number of types of separation patterns becomes four that corresponds to the number of tracks. Between the recording sections of the separation patterns 44-1, 44-2, 44-3, and 44-4 on the adjacent tracks, a marginal gap 29 that corresponds to a predetermined time period is provided.

Here, the separation patterns 44-1, 44-2, 44-3, and 44-4 are patterns recorded with a predetermined recording wavelength equal to or larger than a minimum recording wavelength.

Further, at the time of the reproduction in the forward direction, the gain control patterns 41-5, 41-6, 41-7, and 41-8 in the third preamble 25 are detected by the multiple-preamble processing controller 238 and used for the calculation of a second gain with respect to the reproduction signals of the reproducing heads R-1, R-2, R-3, and R-4. The reproduction signal gain control processor 233 calculates a more-appropriate gain by combining a first gain that the reproduction signal gain control processor 233 itself has obtained based on the gain control patterns 41-1, 41-2, 41-3, and 41-4 of the first preamble 23 and the second gain input from the multiple-preamble processing controller 238 by, for example, calculating a mean value of the gains, and amplifies the reproduction signals of the reproducing heads R-1, R-2, R-3, and R-4 by that gain to thus optimize output levels.

In the example of FIG. 7, a width of each of the reproducing heads R-1, R-2, R-3, and R-4 is 1.5 times the track width. In other words, the width of each of the reproducing heads R-1, R-2, R-3, and R-4 is 1.5 times the head width of each of the recording heads W-1, W-2, W-3, and W-4, for example, and signals can be read from the plurality of tracks by the individual reproducing heads R-1, R-2, R-3, and R-4. Specifically, the reproducing head R-1 reproduces signals across the tracks #1 and #2, the reproducing head R-2 reproduces signals across three tracks of the tracks #1 to #3, the reproducing head R-3 reproduces signals across three tracks of the tracks #2 to #4, and the reproducing head R-4 reproduces signals across the tracks #3 and #4.

Next, the relationship between the reproduction in the backward direction and the preamble 21 will be described with reference to FIG. 8.

Figure 8:
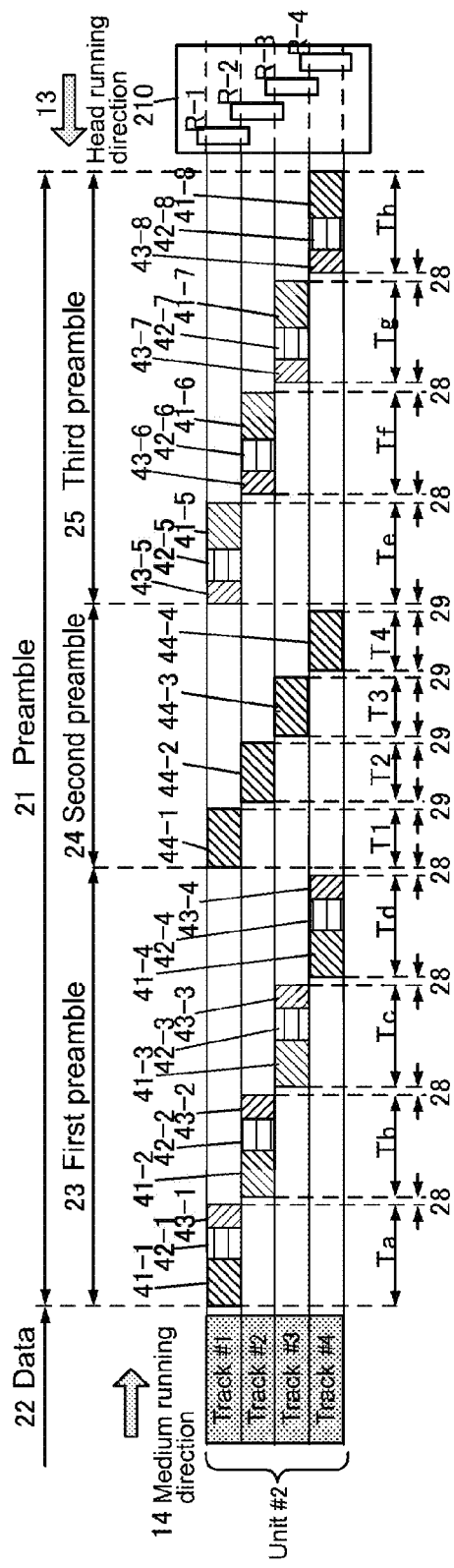
FIG. 8 is a diagram showing a structure of a preamble of a unit #2 in the track format shown in FIG. 6.

FIG. 8 is a diagram showing a structure of the preamble 21 of the unit #2 in the track format shown in FIG. 6.

At the time of the reproduction in the backward direction, the gain control patterns 41-5, 41-6, 41-7, and 41-8 in the third preamble 25 on the respective tracks #1, #2, #3, and #4 are used as learning signals for the gain control of the reproducing amplifiers 221-1, 221-2, 221-3, and 221-4 by the gain adjusting sections 224-1, 224-2, 224-3, and 224-4. Moreover, the gain control patterns 41-5, 41-6, 41-7, and 41-8 are also used for the gain control with respect to the reproduction signals in the reproduction signal gain control processor 233. Furthermore, the gain control patterns 41-5, 41-6, 41-7, and 41-8 are also used for controlling the reproduction positions of the reproduction signals in the reproduction position control processor 235.

At the time of the reproduction in the backward direction, the synchronization patterns 42-5, 42-6, 42-7, and 42-8 in the third preamble 25 on the respective tracks #1, #2, #3, and #4 are detected by the synchronization signal detecting section 231 and the multiple-preamble processing controller 238 and used as information for estimating the head positions of the various patterns and data subsequent thereto. The synchronization patterns 42-5, 42-6, 42-7, and 42-8 are also used for carrying out the reproduction position control with respect to the reproduction signals in the reproduction position control processor 235.

At the time of the reproduction in the backward direction, the identification patterns 43-5, 43-6, 43-7, and 43-8 in the third preamble 25 on the respective tracks #1, #2, #3, and #4 are detected by the identification information detecting section 232 and used for obtaining identification information of the tracks.

In the third preamble 25, the patterns of the tracks #1, #2, #3, and #4 are arranged so that positions thereof in the track running direction do not overlap one another. Therefore, even in a case where the channel lock positions of the tracks #1, #2, #3, and #4 are deviated, lowering of the output of the reproduction signals due to the recording signals of the tracks canceling each other out is not caused when the reproducing heads R-1, R-2, R-3, and R-4 individually reproduce signals across the plurality of tracks. Accordingly, the processing control described above that uses the gain control patterns 41-5, 41-6, 41-7, and 41-8, the synchronization patterns 42-5, 42-6, 42-7, and 42-8, and the identification patterns 43-5, 43-6, 43-7, and 43-8 can favorably be carried out.

At the time of the reproduction in the backward direction, the separation patterns 44-1, 44-2, 44-3, and 44-4 on the respective tracks #1, #2, #3, and #4 are used for obtaining a channel matrix that is necessary for a calculation for separating the reproduction signals of the tracks #1, #2, #3, and #4 from the reproduction signals of the reproducing heads R-1, R-2, R-3, and R-4, respectively, in the channel estimate calculating section 234.

Further, at the time of the reproduction in the backward direction, the gain control patterns 41-1, 41-2, 41-3, and 41-4 in the first preamble 23 are detected by the multiple-preamble processing controller 238 and used for the calculation of the second gain with respect to the reproduction signals of the reproducing heads R-1, R-2, R-3, and R-4. The reproduction signal gain control processor 233 calculates a more-appropriate gain by combining a first gain that the reproduction signal gain control processor 233 itself has obtained based on the gain control patterns 41-5, 41-6, 41-7, and 41-8 of the third preamble 25 and the second gain input from the multiple-preamble processing controller 238 by, for example, calculating a mean value of the gains, and amplifies the reproduction signals of the reproducing heads R-1, R-2, R-3, and R-4 by that gain to thus optimize output levels.

Patterns from which the same code string is reproduced in both the forward direction and the backward direction are employed for the first preamble 23 and the third preamble 25, for example. For example, when the synchronization pattern is "4T-4T-3T-2T", the synchronization pattern of the first preamble 23 becomes "10001000100101" and the synchronization pattern of the third preamble 25 becomes "10100100010001", thus being longitudinally-symmetric patterns. Here, the last one bit of the synchronization patterns in both directions indicates an inversion. Accordingly, the same code string can be obtained in the reproduction in the forward direction and the reproduction in the backward direction. The same holds true for the gain control patterns and the identification patterns. It should be noted that repetition signals of a certain frequency as in a 3T consecutive pattern are used for the gain control pattern, for example.

Next, details of processing carried out by the main blocks of the reproducing apparatus 200 shown in FIG. 3 will be described.

(Identification Information Detecting Section 232)

At the time of the reproduction in the forward direction, the identification information detecting section 232 specifies head positions of the identification patterns 43-1, 43-2, 43-3, and 43-4 in the reproduction signals of the reproducing heads R-1, R-2, R-3, and R-4 based on a result of the detection of the synchronization patterns 42-1, 42-2, 42-3, and 42-4 in the first preamble 23 by the synchronization signal detecting section 231, to thus detect the identification patterns 43-1, 43-2, 43-3, and 43-4, and outputs identification information of the tracks.

At the time of the reproduction in the backward direction, the identification information detecting section 232 similarly specifies head positions of the identification patterns 43-5, 43-6, 43-7, and 43-8 in the reproduction signals of the reproducing heads R-1, R-2, R-3, and R-4 based on a result of the detection of the synchronization patterns 42-5, 42-6, 42-7, and 42-8 in the third preamble 25 by the synchronization signal detecting section 231, to thus detect the identification patterns 43-5, 43-6, 43-7, and 43-8, and outputs identification information of the tracks.

In a case where a single reproducing head crosses a plurality of tracks, the synchronization patterns of the tracks are detected in different sections from the reproduction signals obtained by the reproducing head in the synchronization signal detecting section 231. Using the synchronization patterns, the identification information detecting section 232 specifies the head positions of the identification patterns of the tracks to detect the identification patterns, and obtains the identification information of the tracks.

(Regarding Reproduction Signal Gain Control Processor 233)

At the time of the reproduction in the forward direction, the reproduction signal gain control processor 233 calculates the gain with respect to the reproduction signals of the reproducing heads R-1, R-2, R-3, and R-4 as follows based on the reproduction signals of the gain control patterns 41-1, 41-2, 41-3, and 41-4 in the first preamble 23, for example.

For example, in FIG. 7, the reproduction signal gain control processor 233 adds the reproduction signals of the gain control patterns 41-1 and 41-2 of the respective tracks #1 and #2 that have been reproduced by the reproducing head R-1. Similarly, the reproduction signal gain control processor 233 adds the reproduction signals of the gain control patterns 41-1 to 41-3 of the respective tracks #1 to #3 that have been reproduced by the reproducing head R-2. Similarly, the reproduction signal gain control processor 233 adds the reproduction signals of the gain control patterns 41-2 to 41-4 of the respective tracks #2 to #4 that have been reproduced by the reproducing head R-3. Similarly, the reproduction signal gain control processor 233 adds the reproduction signals of the gain control patterns 41-3 and 41-4 of the respective tracks #3 and #4 that have been reproduced by the reproducing head R-4.

The addition of the reproduction signals of the gain control patterns is carried out by detecting peak values of the reproduction signals of the gain control patterns in the tracks and obtaining a mean value thereof, for example. It should be noted that the calculation is not limited to the method described above, and any other method may be used as long as correlations among the reproduction signals are established.

The reproduction signal gain control processor 233 selects a largest one of the four calculation results obtained as described above and uses it as a reference output with respect to all the reproducing heads R-1, R-2, R-3, and R-4. Then, the reproduction signal gain control processor 233 calculates a value obtained by multiplying each value of the input reproduction signals of the reproducing heads R-1, R-2, R-3, and R-4 by 1/(reference output) as the first gain.

It should be noted that the reference output can also be used in the channel estimation calculation in the channel estimate calculating section 234 or used in the signal separation calculating section 236.

Furthermore, the reproduction signal gain control processor 233 receives an input of the second gain from the multiple-preamble processing controller 238 and combines the first and second gains by, for example, calculating a mean value of the gains, to thus obtain a more-appropriate third gain. The third gain is used to amplify the reproduction signals of the reproducing heads R-1, R-2, R-3, and R-4.

At the time of the reproduction in the backward direction, the reproduction signal gain control processor 233 obtains the first gain by the same method based on the reproduction signals of the gain control patterns 41-5, 41-6, 41-7, and 41-8 in the third preamble 25. The reproduction signal gain control processor 233 receives an input of the second gain from the multiple-preamble processing controller 238 and combines the first and second gains by, for example, calculating a mean value of the gains, to thus obtain a more-appropriate third gain. The third gain is used to amplify the reproduction signals of the reproducing heads R-1, R-2, R-3, and R-4. Accordingly, the gain control can be carried out more favorably with respect to the reproduction signals of the reproducing heads R-1, R-2, R-3, and R-4, thus enabling the subsequent signal separation calculation to be carried out favorably.

(Regarding Multiple-Preamble Processing Controller 238)

At the time of the reproduction in the forward direction, regarding the tracks identified by the identification information detecting section 232, the multiple-preamble processing controller 238 specifies, based on the synchronization patterns 42-1, 42-2, 42-3, and 42-4 in the first preamble 23 as the synchronization patterns detected first in the reproduction, head positions of the gain control patterns 41-5, 41-6, 41-7, and 41-8 in the third preamble 25 disposed subsequent to the synchronization patterns. The multiple-preamble processing controller 238 calculates the second gain by the same method as the reproduction signal gain control processor 233 based on the reproduction signals of the gain control patterns 41-5, 41-6, 41-7, and 41-8 in the third preamble 25, and outputs the second gain to the reproduction signal gain control processor 233.

At the time of the reproduction in the backward direction, regarding the tracks identified by the identification information detecting section 232, the multiple-preamble processing controller 238 similarly specifies, based on the synchronization patterns 42-5, 42-6, 42-7, and 42-8 in the third preamble 25 as the synchronization patterns detected first in the reproduction, head positions of the gain control patterns 41-1, 41-2, 41-3, and 41-4 in the first preamble 23 disposed subsequent to the synchronization patterns. The multiple-preamble processing controller 238 calculates the second gain by the same method as the reproduction signal gain control processor 233 based on the reproduction signals of the gain control patterns 41-1, 41-2, 41-3, and 41-4 in the first preamble 23, and outputs the second gain to the reproduction signal gain control processor 233.

(Regarding Channel Estimate Calculating Section 234)

The channel estimate calculating section 234 specifies head positions of the separation patterns 44-1, 44-2, 44-3, and 44-4 based on the information obtained by the synchronization signal detecting section 231 in both the reproductions in the forward direction and the backward direction and carries out the channel estimation calculation based on the reproduction signals of the separation patterns 44-1, 44-2, 44-3, and 44-4, to thus generate a channel matrix necessary for separating the reproduction signals of the respective tracks from the reproduction signals of one unit, the levels of which have been controlled by the reproduction signal gain control processor 233. At this time, the channel estimate calculating section 234 can grasp, based on the identification information of the tracks detected by the identification information detecting section 232, where a head of each of the separation patterns is located on the tracks. Therefore, the reproduction signals of the separation patterns can be discriminated from the reproduction signals with high accuracy, and the channel estimation calculation can thus be carried out accurately.

(Regarding Reproduction Position Control Processor 235)

In both the reproductions in the forward direction and the backward direction, the reproduction position control processor 235 receives an input of the reproduction signals of the reproducing heads R-1, R-2, R-3, and R-4 on which the level control has been carried out in the reproduction signal gain control processor 233, and carries out processing of aligning the reproduction positions of the reproduction signals of the reproducing heads R-1, R-2, R-3, and R-4 that have passed through the reproduction signal gain control processor 233 based on the information obtained by the synchronization signal detecting section 231. Accordingly, even when the reproduction positions of the reproduction signals that have been taken in by the reproducing heads, in the track running direction do not match, the reproduction signals can be input to the signal separation calculating section 236 with the reproduction positions aligned, thus enabling a stable data reproduction to be carried out.

(Regarding Signal Separation Calculating Section 236)

In both the reproductions in the forward direction and the backward direction, the signal separation calculating section 236 carries out a predetermined signal separation calculation based on the channel matrix output from the channel estimate calculating section 234, to thus separate the reproduction signals of the respective tracks from the reproduction signals of one unit, the reproduction positions of which have been aligned by the reproduction position control processor 235.

As a calculation method for the signal separation processing by the signal separation calculating section 236, there is, for example, a method of calculating a generalized inverse matrix with respect to the channel matrix. The method of calculating a generalized inverse matrix with respect to the channel matrix is generally called a zero forcing method. However, the method for the signal separation processing is not limited thereto, and an MMSE (Minimum Mean Squared Error) method may be used instead, for example.

As described above, according to this embodiment, by arranging the first preamble 23 corresponding to the reproduction in the forward direction and the third preamble 25 corresponding to the reproduction in the backward direction to be symmetric to each other on both sides of the second preamble 24, the second preamble 24, that is, the separation patterns 44-1, 44-2, 44-3, and 44-4 can be reproduced in both the forward direction and the backward direction, and the signal separation processing can favorably be carried out. Accordingly, reproduction processing can favorably be carried out irrespective of which of the forward direction and the backward direction the track has been recorded in on the magnetic recording medium 2.

Furthermore, in this embodiment, in both the reproductions in the forward direction and the backward direction, the multiple-preamble processing controller 238 calculates the gain by the same method as the reproduction signal gain control processor 233 based on the reproduction signals of the gain control patterns disposed subsequent to the second preamble 24, and outputs the gain to the reproduction signal gain control processor 233. The reproduction signal gain control processor 233 combines the first gain of the reproduction signals of the reproducing heads R-1, R-2, R-3, and R-4 that the reproduction signal gain control processor 233 itself has calculated and the second gain input from the multiple-preamble processing controller 238 to obtain a more-appropriate third gain, and controls the level of the reproduction signals of the reproducing heads R-1, R-2, R-3, and R-4 by the third gain. Accordingly, the gain control can be carried out more favorably, and the subsequent signal separation calculation can thus be carried out favorably.

Moreover, according to this embodiment, the track forwarding amount controller 271 calculates an adjustment amount with respect to the defined forwarding amount of the reproducing heads R-1, R-2, R-3, and R-4 based on the channel matrix obtained by the channel estimate calculating section 234 through the channel estimation calculation, and the track forwarding amount determining section 272 adjusts the defined forwarding amount by the adjustment amount. Accordingly, it is possible to position the reproducing heads R-1, R-2, R-3, and R-4 at appropriate positions in the track width direction and start the reproduction from immediately after the switch of the reproduction direction.

Figure 9:
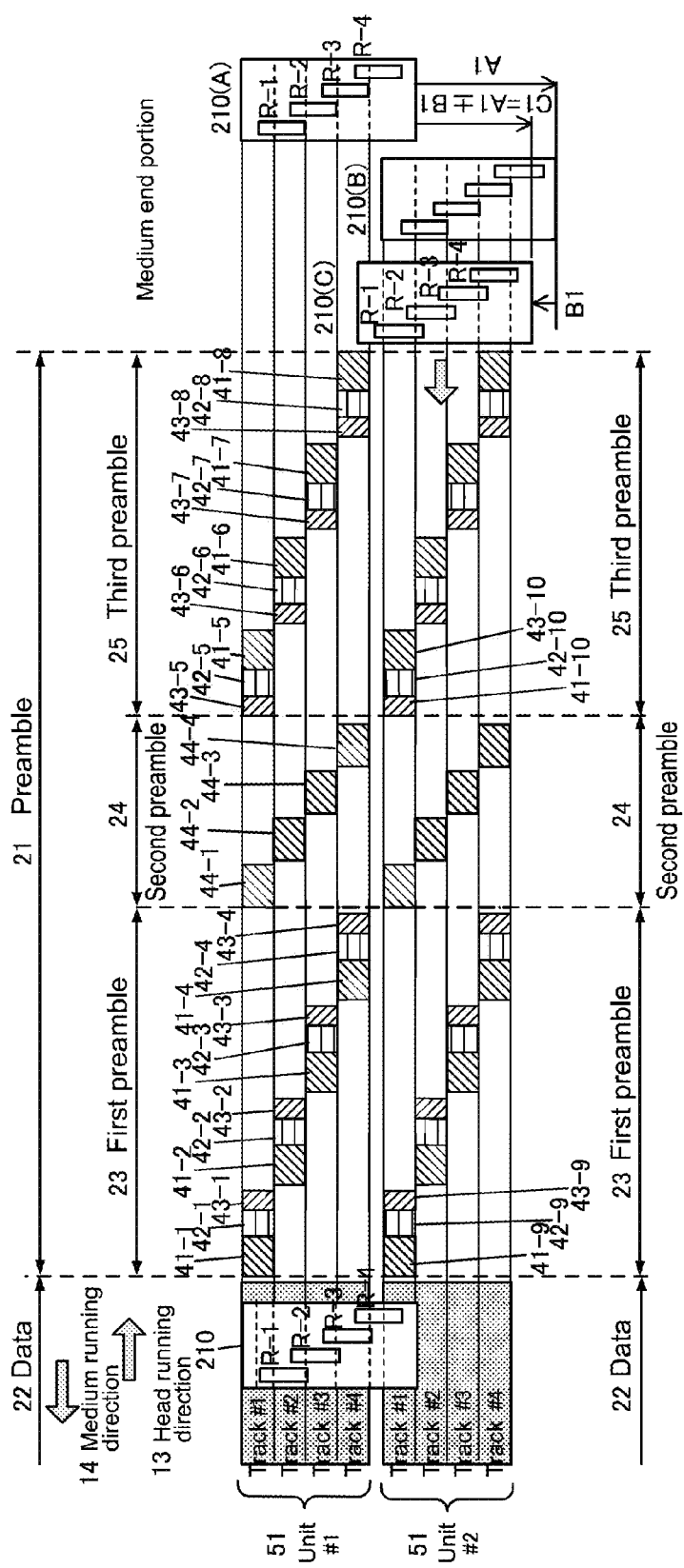
FIG. 9 is a diagram showing a specific example of an adjustment of a forwarding amount of reproducing heads R-1, R-2, R-3, and R-4 when switching a unit to be reproduced.

FIG. 9 is a diagram showing a specific example of an adjustment of a forwarding amount of the reproducing heads R-1, R-2, R-3, and R-4 when switching the unit to be reproduced. FIG. 9 shows a state where the reproduction processing of the unit #1 is ended and the reproducing heads R-1, R-2, R-3, and R-4 are moved to the positions on the next unit #2. 210(A) shows the reproducing heads R-1, R-2, R-3, and R-4 positioned at an end of the unit #1 in the reproduction direction upon completion of the trace. The positions of the reproducing heads R-1, R-2, R-3, and R-4 at this time are deviated downward in the figure by only 75% of the track width, for example. As a defined forwarding amount A1, a sum of a unit width and a width of the guard band 52 provided between the units is given. Thus, if the reproducing heads R-1, R-2, R-3, and R-4 are forwarded only by the defined forwarding amount A1, the deviation at the end of the unit #1 is carried over to a positional relationship thereof with the unit #2 after being moved. 210(B) shows the positions of the reproducing heads R-1, R-2, R-3, and R-4 in a case where the reproducing heads R-1, R-2, R-3, and R-4 are moved without any adjustment.

In this regard, the track forwarding amount controller 271 calculates an adjustment amount B1 with respect to the defined forwarding amount A1 based on the channel matrix obtained by the channel estimate calculating section 234. In this specific example, a minus forwarding amount corresponding to about 75% of the track width is obtained as the adjustment amount B1. The track forwarding amount determining section 272 determines a value obtained by adjusting the defined forwarding amount A1 (defined forwarding amount A1=(track width)*4(number of tracks constituting unit)+(width of guard band in this example) by the adjustment amount B1 as an appropriate forwarding amount C1 (C1=A1±B1), and outputs a control signal to the track forwarding section 273 so that the reproducing heads R-1, R-2, R-3, and R-4 are moved only by the appropriate forwarding amount C1. It should be noted that a sign of a value of B1 is minus in the case of FIG. 9. Accordingly, the reproducing heads R-1, R-2, R-3, and R-4 are moved to appropriate positions in the track width direction. 210(C) shows the reproducing heads R-1, R-2, R-3, and R-4 that have been moved to the appropriate positions in the track width direction. 210(B) shows the reproducing heads R-1, R-2, R-3, and R-4 after being moved in a case where the defined forwarding amount A1 is not adjusted by the adjustment amount B1.

Modified Example 1 of First Embodiment

Next, a modified example of the first embodiment will be described.

In the above embodiment, for example, at the time of the reproduction in the forward direction, the multiple-preamble processing controller 238 has detected the gain control patterns 41-5, 41-6, 41-7, and 41-8 in the third preamble 25, calculated the second gain with respect to the reproduction signals of the reproducing heads R-1, R-2, R-3, and R-4 based on the reproduction signals of the gain control patterns 41-5, 41-6, 41-7, and 41-8, and output the second gain to the reproduction signal gain control processor 233. On the contrary, in this modified example, at the time of the reproduction in the forward direction, it is also possible for the multiple-preamble processing controller 238 to receive an input of the first gain with respect to the reproduction signals of the reproducing heads R-1, R-2, R-3, and R-4 obtained based on the reproduction signals of the gain control patterns 41-1, 41-2, 41-3, and 41-4 in the reproduction signal gain control processor 233, and combine the first gain with the second gain that the multiple-preamble processing controller 238 itself has obtained, to thus obtain a more-appropriate third gain.

Modified Example 2 of First Embodiment

A modified example of the multiple-preamble processing controller 238 will be described below as a modified example 2 of the first embodiment.

At the time of the reproduction in the forward direction, for example, the multiple-preamble processing controller 238 may estimate head positions of the synchronization patterns 42-5, 42-6, 42-7, and 42-8 in the third preamble 25 based on a result of the detection of the synchronization patterns 42-1, 42-2, 42-3, and 42-4 in the first preamble 23, and output information thereof to the synchronization signal detecting section 231. In this case, the synchronization signal detecting section 231 detects the synchronization patterns 42-5, 42-6, 42-7, and 42-8 in the third preamble 25 based on the information output from the multiple-preamble processing controller 238 and readjusts the captured synchronization based on the previously-detected synchronization patterns 42-1, 42-2, 42-3, and 42-4 in the first preamble 23.

It should be noted that as long as the plurality of different patterns are defined as the synchronization patterns in the synchronization signal detecting section 231, the multiple-preamble processing controller 238 only needs to output a notification that instructs the detection of the synchronization patterns to the synchronization signal detecting section 231. In other words, the synchronization signal detecting section 231 detects a pattern defined in advance as the synchronization pattern from the reproduction signal based on the instruction from the multiple-preamble processing controller 238, and recognizes the pattern as the second synchronization pattern in terms of the reproduction order. It should be noted that the detection of the first synchronization pattern in terms of the reproduction order is carried out without the instruction from the multiple-preamble processing controller 238, and the pattern is thus detected as the first synchronization pattern in terms of the reproduction order.

In this case, two types of patterns of, for example, "4T-4T-3T-2T" and "2T-3T-4T-4T" are used as the plurality of different synchronization patterns so as to cope with the reproductions in both the forward direction and the backward direction.

At this time, it is also possible for the second synchronization pattern to function as a pattern for a redetection of a synchronization in a case where the first synchronization pattern is not detected by any chance. At this time, the second pattern can be used for detecting a part of the data 22 recorded a predetermined amount rearward from the second synchronization pattern. It should be noted that a case where the second synchronization pattern alone is detected includes a case where it has been unable to carry out the processing of that part by the second preamble 24 of the preamble 21. In this case, information obtained at a time the processing is carried out in a different preamble that has been detected one or more preambles before the current one is processed only needs to be used to process the part of the current data 22.

Further, it is also possible that, in each of the synchronization patterns 42-1, 42-2, 42-3, and 42-4 in the first preamble 23 and each of the synchronization patterns 42-5, 42-6, 42-7, and 42-8 in the third preamble 25, an ID pattern for identifying itself to the corresponding one of the synchronization patterns in the other preamble be embedded. In this case, the synchronization signal detecting section 231 may identify the synchronization patterns in the two preambles based on the ID patterns, capture the synchronization based on the synchronization pattern detected first, and readjust the synchronization based on the synchronization pattern detected next.

Modified Example 3 of First Embodiment

Figure 10:
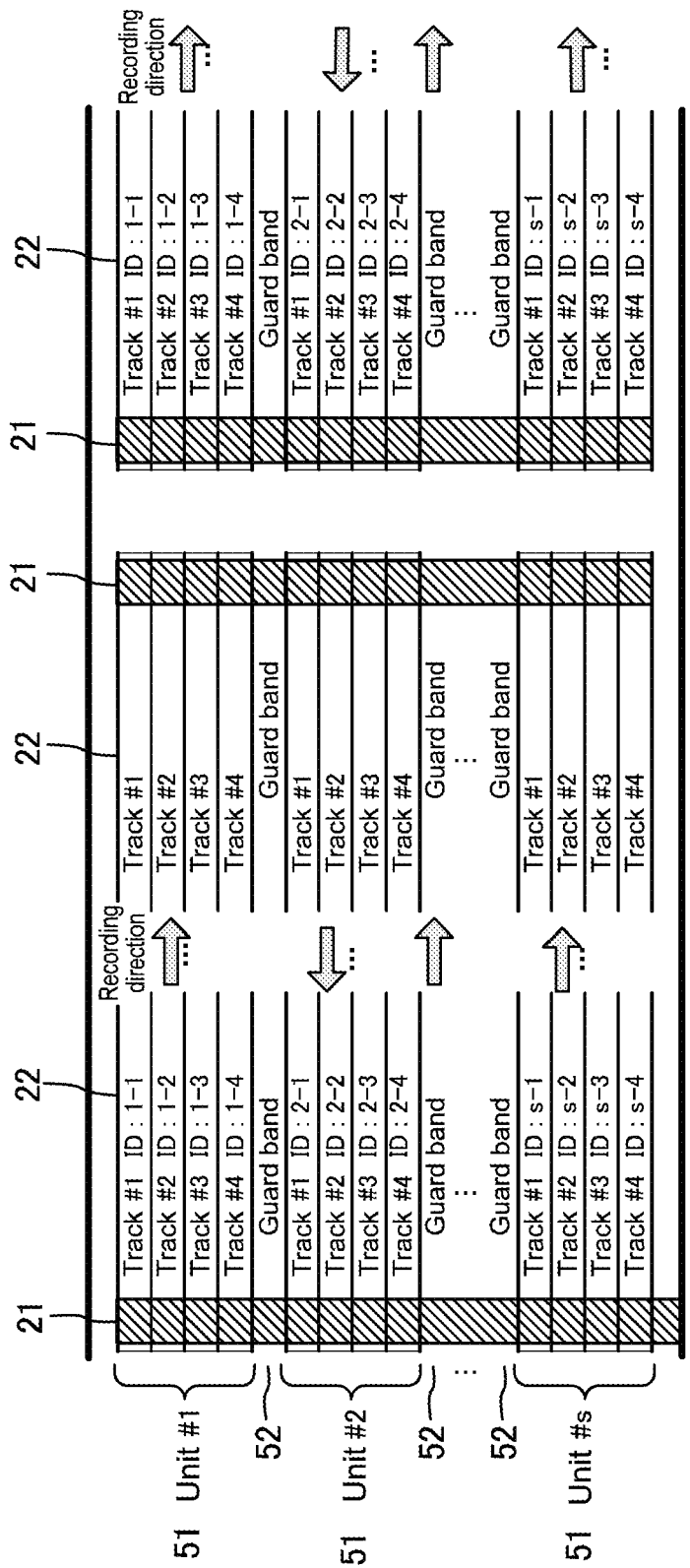
FIG. 10 is a conceptual diagram of another track format according to the embodiment of the present invention.

FIG. 10 is a conceptual diagram of another track format according to the present invention. In this track format, in addition to the preamble 21 provided on each of the tracks, a first preamble 23 and a third preamble 25 of the preamble 21 are also provided to the guard band 52.

Figure 11A:
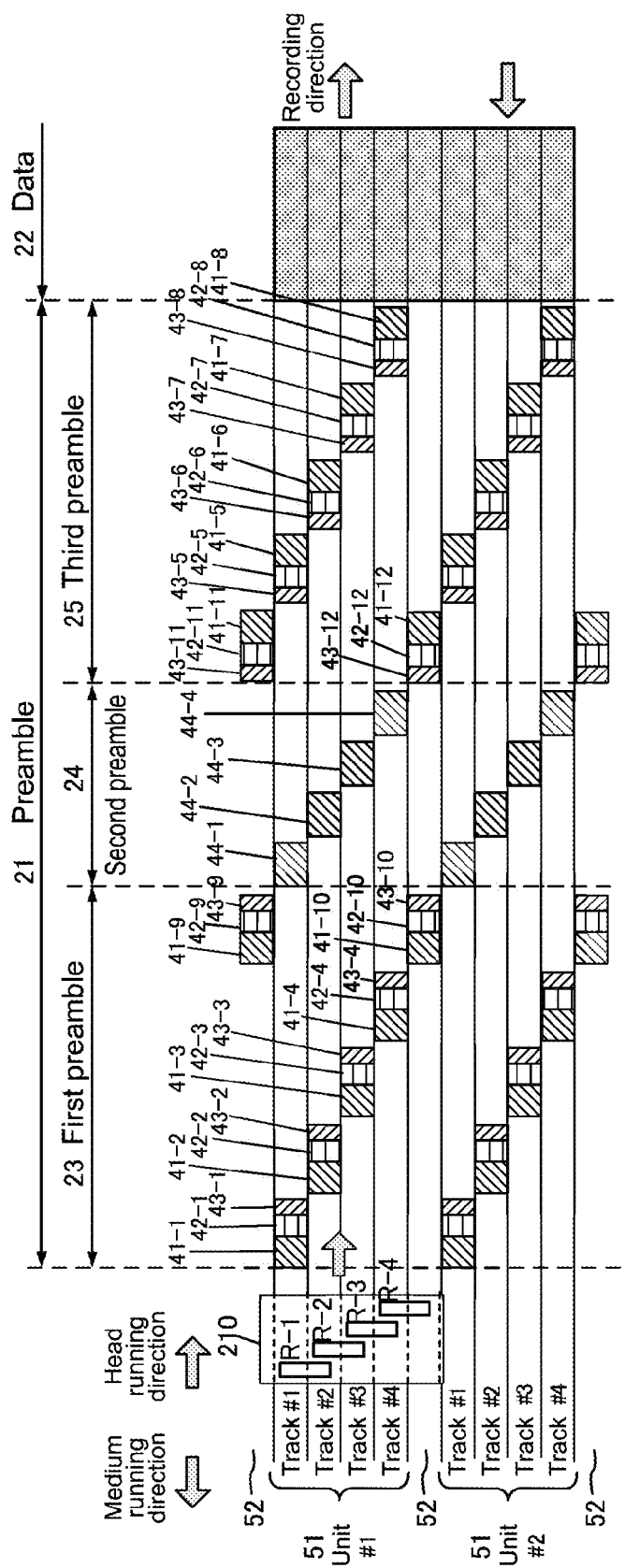
FIG. 11A is a diagram showing a structure of a preamble in the track format shown in FIG. 10.

FIG. 11A is a diagram showing a structure of the preamble 21 in the track format shown in FIG. 10.

The structure of the preamble 21 provided on each of the tracks #1 to #4 in both the units #1 and #2 is the same as that of FIGS. 7 and 8. Structures of the first preamble 23 and the third preamble 25 arranged on the guard band 52 are also the same as those of the first preamble 23 and the third preamble 25 arranged on each of the tracks #1, #2, #3, and #4.

In FIG. 11A, the reproducing heads R-1, R-2, R-3, and R-4 are deviated downward in the figure from appropriate positions thereof by about 75% of the track width, and the reproducing head R-4 is thus positioned between the track #4 of the unit #1 and the guard band 52 provided between the units #1 and #2. In this case, the identification information detecting section 232 detects the identification pattern 43-4 in the first preamble 23 from the reproduction signal of the reproducing head R-4 to thus identify the track #4 (track ID=1_4) (see FIG. 6), and detects an identification pattern 43-10 of the guard band 52 to thus identify the guard band 52. Accordingly, with the channel matrix obtained by the channel estimate calculating section 234 through the channel estimation calculation, the positions of the reproducing heads R-1, R-2, R-3, and R-4 in the track width direction can be estimated more accurately, and more-stable signal reproduction processing becomes possible, with the result that an increase in a track density can be realized.

FIG. 9 shows a case where the reproducing heads R-1, R-2, R-3, and R-4 are deviated in the track width direction due to a disturbance, and the reproducing head R-4 is thus positioned between the track #4 of the unit #1 and the track #1 of the adjacent unit #2. In such a case, in the reproduction in the forward direction, the identification information detecting section 232 detects the identification pattern 43-4 in the first preamble 23 from the reproduction signal of the reproducing head R-4 to identify the track #4 of the unit #1 (track ID=1_4) (see FIG. 6), and detects an identification pattern 43-9 in the first preamble 23 of the unit #2 to thus identify the track #1 of the unit #2 (track ID=2_1) (see FIG. 6).

In the modified example 3, information on the tracks thus detected by the identification information detecting section 232 is output to the track forwarding amount controller 271. Based on the channel matrix obtained by the channel estimate calculating section 234 through the channel estimation calculation and the information on the tracks detected by the identification information detecting section 232, the track forwarding amount controller 271 calculates an adjustment amount with respect to the defined forwarding amount of the reproducing heads R-1, R-2, R-3, and R-4. In other words, the calculation of the adjustment amount that is based on the channel matrix takes into account the result of the track detection. Accordingly, it becomes possible to calculate the adjustment amount more accurately and carry out the signal reproduction processing more stably, with the result that an increase in the track density can be realized.

Modified Example 4 of First Embodiment

FIG. 10 is a conceptual diagram of another track format according to the present invention. In this track format, in addition to the preamble 21 provided on each of the tracks, a first preamble 23 and a third preamble 25 of the preamble 21 are also provided to the guard band 52.

FIG. 11A is a diagram showing a structure of the preamble 21 in the track format shown in FIG. 10.

The structure of the preamble 21 provided on each of the tracks #1 to #4 in both the units #1 and #2 is the same as that of FIGS. 7 and 8. Structures of the first preamble 23 and the third preamble 25 arranged on the guard band 52 are also the same as those of the first preamble 23 and the third preamble 25 arranged on each of the tracks #1, #2, #3, and #4.

In FIG. 11A, the reproducing heads R-1, R-2, R-3, and R-4 are deviated downward in the figure from appropriate positions thereof by about 75% of the track width, and the reproducing head R-4 is thus positioned between the track #4 of the unit #1 and the guard band 52 provided between the units #1 and #2. In this case, the identification information detecting section 232 detects the identification pattern 43-4 in the first preamble 23 from the reproduction signal of the reproducing head R-4 to thus identify the track #4 (track ID=1_4) (see FIG. 6), and detects an identification pattern 43-10 of the guard band 52 to thus identify the guard band 52. Accordingly, with the channel matrix obtained by the channel estimate calculating section 234 through the channel estimation calculation, the positions of the reproducing heads R-1, R-2, R-3, and R-4 in the track width direction can be estimated more accurately, and more-stable signal reproduction processing becomes possible, with the result that an increase in the track density can be realized.

Figure 11B:
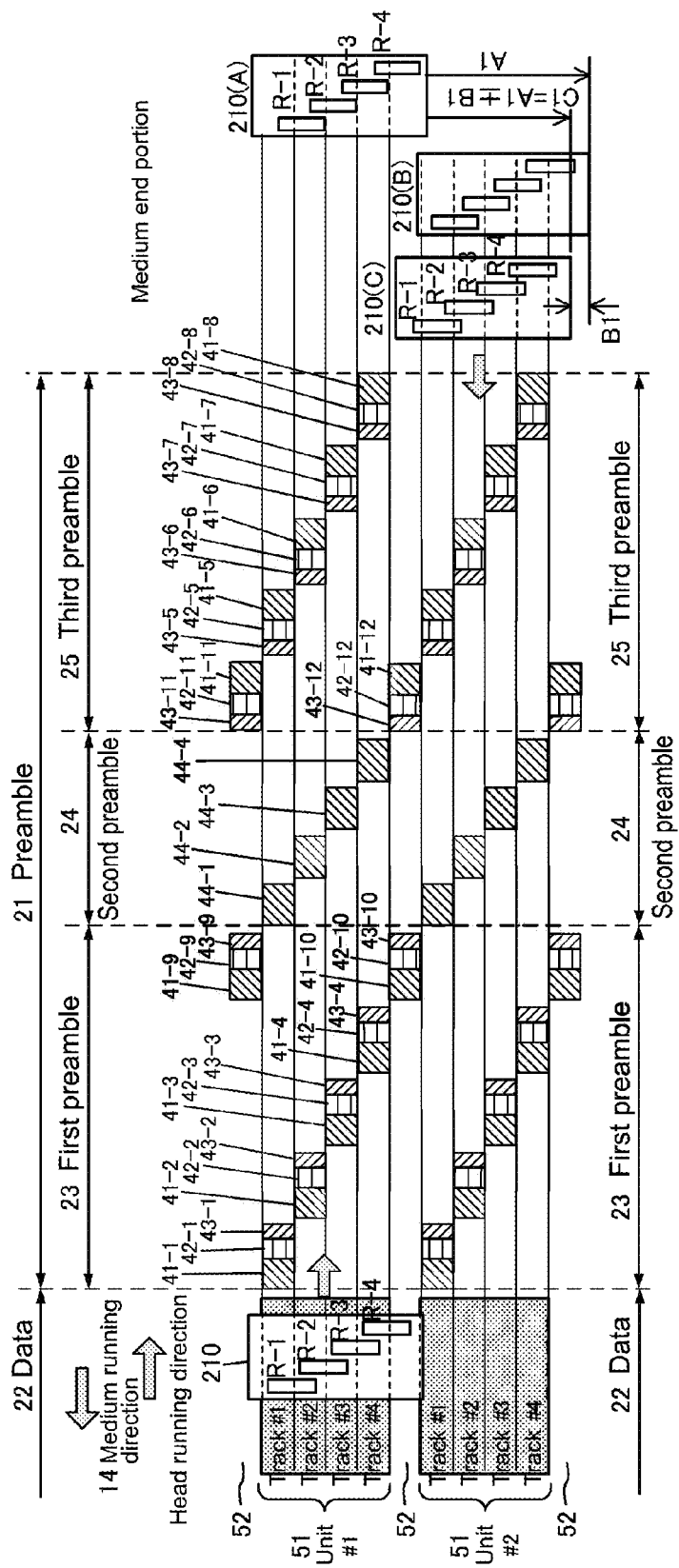
FIG. 11B is a diagram showing a structure of a preamble in the track format shown in FIG. 10.

FIG. 11B is a diagram showing a structure of the preamble 21 in the track format shown in FIG. 10.

FIG. 11B shows a state where the reproducing heads R-1, R-2, R-3, and R-4 are forwarded to positions at which the next unit #2 can be traced upon ending the trace of the unit #1 in the forward direction. Here, at a point when the trace of the unit #1 is ended, the reproducing heads R-1, R-2, R-3, and R-4 are deviated downward in the figure from appropriate positions thereof by about 75% of the track width, and the reproducing head R-4 is thus positioned between the track #4 of the unit #1 and the guard band 52 provided between the units #1 and #2. It should be noted that the unit #1 is recorded in the forward direction whereas the unit #2 is recorded in the backward direction.

In this case, in the reproduction in the forward direction, the identification information detecting section 232 detects the identification pattern 43-4 in the first preamble 23 from the reproduction signal of the reproducing head R-4 to identify the track #4 (track ID=1_4) (see FIG. 6), and detects an identification pattern 43-10 of the guard band 52 to thus identify the guard band 52.

Information on the track and the guard band thus detected by the identification information detecting section 232 is output to the track forwarding amount controller 271. Based on the channel matrix obtained by the channel estimate calculating section 234 through the channel estimation calculation and the information on the track and the guard band detected by the identification information detecting section 232, the track forwarding amount controller 271 calculates an adjustment amount with respect to the defined forwarding amount of the reproducing heads R-1, R-2, R-3, and R-4. In other words, the calculation of the adjustment amount that is based on the channel matrix takes into account the result of the identification of the track and the guard band. Accordingly, it becomes possible to calculate the adjustment amount more accurately and carry out the signal reproduction processing more stably, with the result that an increase in the track density can be realized.

Another Modified Example

Next, another modified example of the first embodiment will be described.

Although identification patterns have been provided to the first preamble and the third preamble, by using different types of patterns according to the tracks as the synchronization patterns, it is possible to remove the identification patterns by carrying out the track identification based on the synchronization patterns. Alternatively, it is also possible to carry out the track identification based on the arrangement of the synchronization patterns and gain control patterns in the preamble 21.

Although the gain control pattern has been disposed only at the head of the patterns in terms of the reproduction order in both the first preamble 23 and the third preamble 25, the gain control pattern may be disposed in the rear of the synchronization pattern so that the synchronization detection can be carried out a plurality of times.

It is also possible that the gain control pattern and the separation pattern be constituted of the same pattern and the synchronization detection be carried out based on those patterns.

Based on the track identification information obtained by the identification information detecting section 232, the channel estimation calculation may be carried out by making, for each of the reproduction signals of the individual reproducing heads R-1, R-2, R-3, and R-4 in the sections in which the separation patterns of one unit are arranged, a distinction between the reproduction signal corresponding to the section of the separation pattern that is reproduced by the corresponding reproducing head and the reproduction signal corresponding to the section of the separation pattern that is not reproduced by the corresponding reproducing head, and replacing the reproduction signal corresponding to the section of the separation pattern that is not reproduced by the corresponding reproducing head by a predetermined value such as 0 while using the reproduction signal corresponding to the section of the separation pattern that is reproduced by the corresponding reproducing head as it is.

Furthermore, the above embodiment has described the case where a 4×4 matrix is calculated as the channel estimation information. However, the signal separation processing can be carried out by using other square matrices by obtaining a generalized inverse matrix thereof. Moreover, even in the case of a matrix other than the square matrix, a generalized inverse matrix thereof only needs to be obtained in the same manner. In this case, for obtaining the generalized inverse matrix, the types of separation patterns are in correspondence with the number of tracks.

Further, the above embodiment has used the separation patterns orthogonalized on a time axis. However, the present invention is not limited thereto, and separation patterns orthogonalized on a frequency axis or separation patterns that use orthogonal codes may be used instead.

Furthermore, regarding the recording heads, as long as the same reproduction characteristics can be obtained with respect to the recordings in the forward direction and the backward direction, a common recording head may be used for both the forward direction and the backward direction, or different recording heads may be used for the recordings in the forward direction and the backward direction. The same holds true for the reproducing heads.

Heretofore, the descriptions have been given on the magnetic recording/reproducing system that records signals onto the recording medium without aligning the recording positions for each track and reproduce the signals without aligning the reproduction positions. However, the applicable range of the present invention is not limited thereto, and the present invention is similarly applicable to a magnetic recording/reproducing system that records signals without aligning the recording positions for each track but reproduce the signals by aligning the reproduction positions. Furthermore, the present invention is similarly applicable to an apparatus that records signals by aligning the recording positions for each track but reproduce the signals without aligning the reproduction positions, and an apparatus that records signals by aligning the recording positions for each track and reproduces the signals by aligning the reproduction positions.

Second Embodiment

Next, a second embodiment of the present invention will be described.

The first embodiment above has described the magnetic recording/reproducing system that employs the track format in which, by arranging the first preamble 23 capable of being reproduced in the forward direction and the third preamble 25 capable of being reproduced in the backward direction on both sides of the second preamble 24, the second preamble 24 can be reproduced in both the forward direction and the backward direction. However, such a track format is not essential in the present invention, and the present invention can also be applied to a case where a track format, in which the reproduction can be performed only in one of the forward direction and the backward direction set for each track, is employed.

Figure 12:
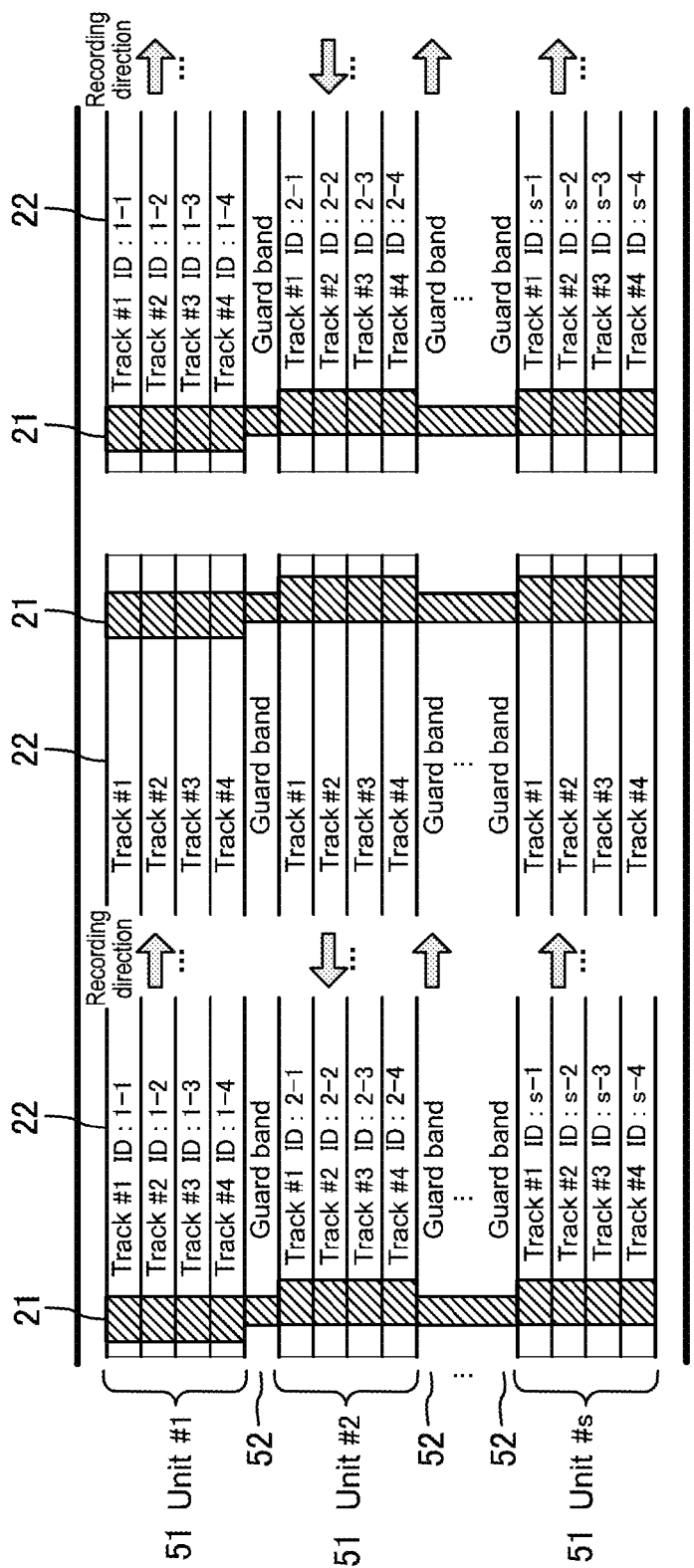
FIG. 12 is a diagram showing a track format according to a second embodiment of the present invention.
Figure 13A:
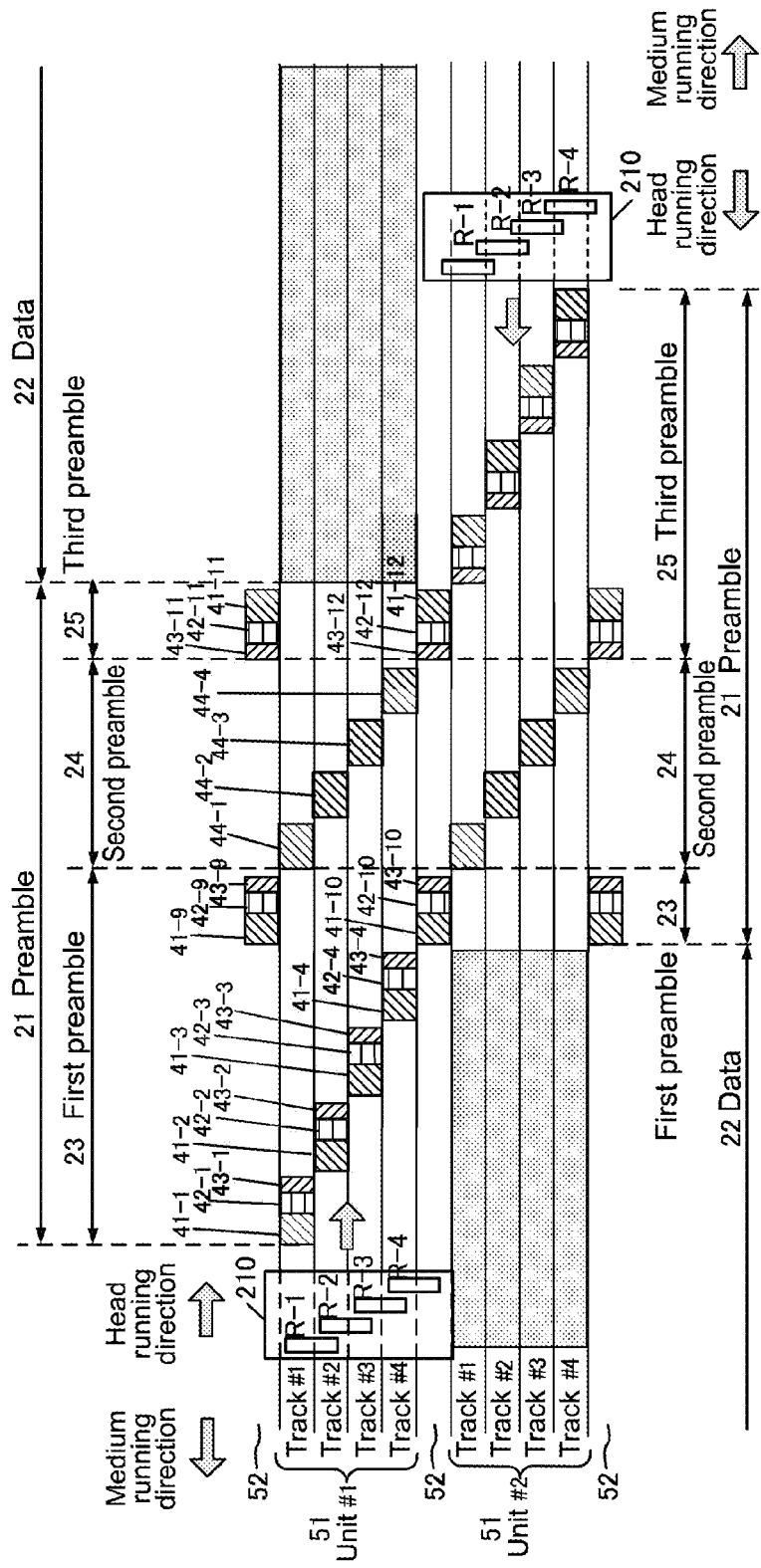
FIG. 13A is a diagram showing a structure of a preamble in the track format shown in FIG. 12.

FIG. 12 is a conceptual diagram showing such a track format. FIG. 13A is a diagram showing a structure of a preamble in the track format shown in FIG. 12.

Here, the unit #1 is a unit on which the recording has been carried out in the forward direction whereas the unit #2 is a unit on which the recording has been carried out in the backward direction. A difference of the track format shown in FIG. 12 from the track format in the modified example 3 of the first embodiment is that, in the track format of the modified example 3, both the first preamble 23 and the third preamble 25 are provided on the tracks #1, #2, #3, and #4 and the guard band 52, whereas, in the track format of the second embodiment, the patterns subsequent in terms of the reproduction order to the separation patterns 44-1, 44-2, 44-3, and 44-4 as the second preamble 24 are provided only on the guard band 52.

Also in the second embodiment, when the reproducing heads R-1, R-2, R-3, and R-4 are largely deviated in the track width direction and the reproducing head R-4 is thus positioned between the track #4 of the unit #1 and the guard band 52 provided between the units #1 and #2, the identification information detecting section 232 detects the identification pattern 43-4 in the first preamble 23 from the reproduction signal of the reproducing head R-4 to thus identify the track #4 (track ID=1_4) (see FIG. 6), and detects the identification pattern 43-10 of the guard band 52 to thus detect the guard band 52. Accordingly, with the channel matrix obtained by the channel estimate calculating section 234 through the channel estimation calculation, the positions of the reproducing heads R-1, R-2, R-3, and R-4 in the track width direction can be estimated more accurately and more-stable signal reproduction processing becomes possible, with the result that an increase in the track density can be realized. Furthermore, in this embodiment, an area of the preamble as a whole can be reduced, thus obtaining an effect that data recording efficiency with respect to the magnetic recording medium 2 is improved.

Figure 13B:
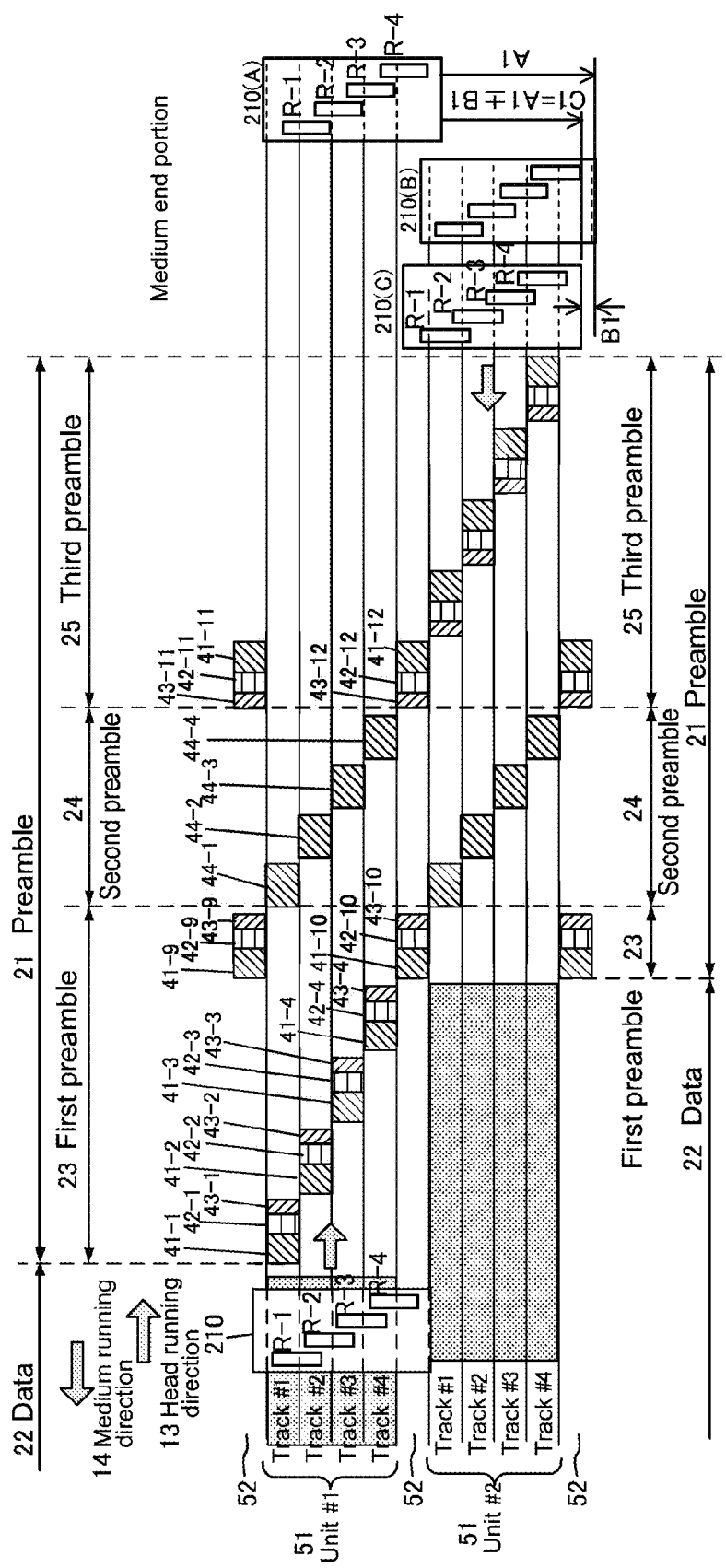
FIG. 13B is a diagram showing a track format of a magnetic recording medium at an end portion thereof at a time of a reproduction in a forward direction, in the track format shown in FIG. 12.

FIG. 13B is a diagram showing a track format of the magnetic recording medium 2 at an end portion thereof at the time of the reproduction in the forward direction, in the track format shown in FIG. 12.

Here, the unit #1 is a unit on which the recording has been carried out in the forward direction whereas the unit #2 is a unit on which the recording has been carried out in the backward direction. A difference of this track format from that of the modified example 4 of the first embodiment is that, in the track format of the modified example 4, both the first preamble 23 and the third preamble 25 are provided on the tracks #1, #2, #3, and #4 and the guard band 52, whereas, in the track format of the second embodiment, the patterns subsequent in terms of the reproduction order to the separation patterns 44-1, 44-2, 44-3, and 44-4 as the second preamble 24 are provided only on the guard band 52. Therefore, in the second embodiment, the reproduction needs to be carried out in the same forward direction as the recording when reproducing the unit #1, and the reproduction needs to be carried out in the same backward direction as the recording when reproducing the unit #2.

Even when such a track format is employed, the track forwarding amount controller 271 calculates an adjustment amount with respect to the defined forwarding amount of the reproducing heads R-1, R-2, R-3, and R-4 based on the channel matrix obtained by the channel estimate calculating section 234 through the channel estimation calculation, and the track forwarding amount determining section 272 adjusts the defined forwarding amount by the adjustment amount. As a result, the reproducing heads R-1, R-2, R-3, and R-4 can start the reproduction from appropriate positions thereof in the track width direction from immediately after the switch of the reproduction direction.

In addition, in this embodiment, at the time of the reproduction of the unit #1 in the forward direction, the identification information detecting section 232 detects the identification pattern 43-4 in the first preamble 23 from the reproduction signal of the reproducing head R-4 to thus identify the track #4 (track ID=1_4) (see FIG. 6), and detects the identification pattern 43-10 of the guard band 52 to thus identify the guard band 52. Information on the track and the guard band thus detected by the identification information detecting section 232 is output to the track forwarding amount controller 271. Based on the channel matrix obtained by the channel estimate calculating section 234 through the channel estimation calculation and the information on the track and the guard band detected by the identification information detecting section 232, the track forwarding amount controller 271 calculates the adjustment amount with respect to the defined forwarding amount of the reproducing heads R-1, R-2, R-3, and R-4. In other words, the calculation of the adjustment amount that is based on the channel matrix takes into account the result of the detection of the track. Accordingly, the adjustment amount can be calculated more accurately and more-stable signal reproduction processing becomes possible, with the result that an increase in the recording density can be realized.

Furthermore, in this embodiment, since the third preamble 25 is not recorded on the tracks, an area of the preamble as a whole can be reduced, thus obtaining an effect that data recording efficiency with respect to the magnetic recording medium 2 is improved.

Third Embodiment

Next, a reproducing apparatus in a magnetic recording/reproducing system according to a third embodiment of the present invention will be described.

Figure 14:
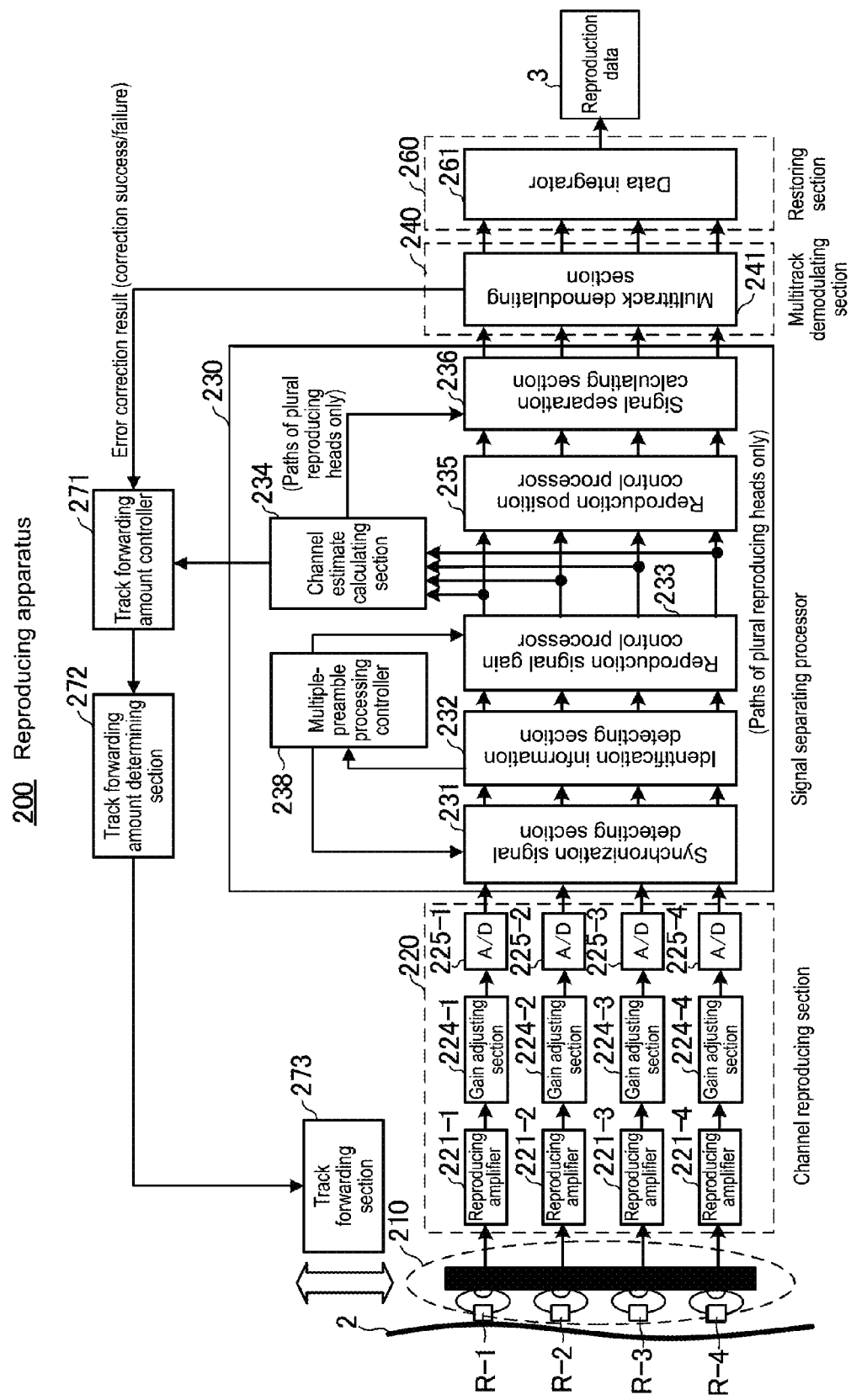
FIG. 14 is a diagram showing a structure of a reproducing apparatus in a magnetic recording/reproducing system according to a third embodiment of the present invention.

FIG. 14 is a diagram showing a structure of a reproducing apparatus 200 in the magnetic recording/reproducing system according to the third embodiment. The reproducing apparatus 200 of this embodiment is different from that of the first embodiment in that information on a result of an error correction (correction success/failure) from the multitrack demodulating section 240 is notified to the track forwarding amount controller 271 as information on a quality of reproduced data, for example.

Figure 15:
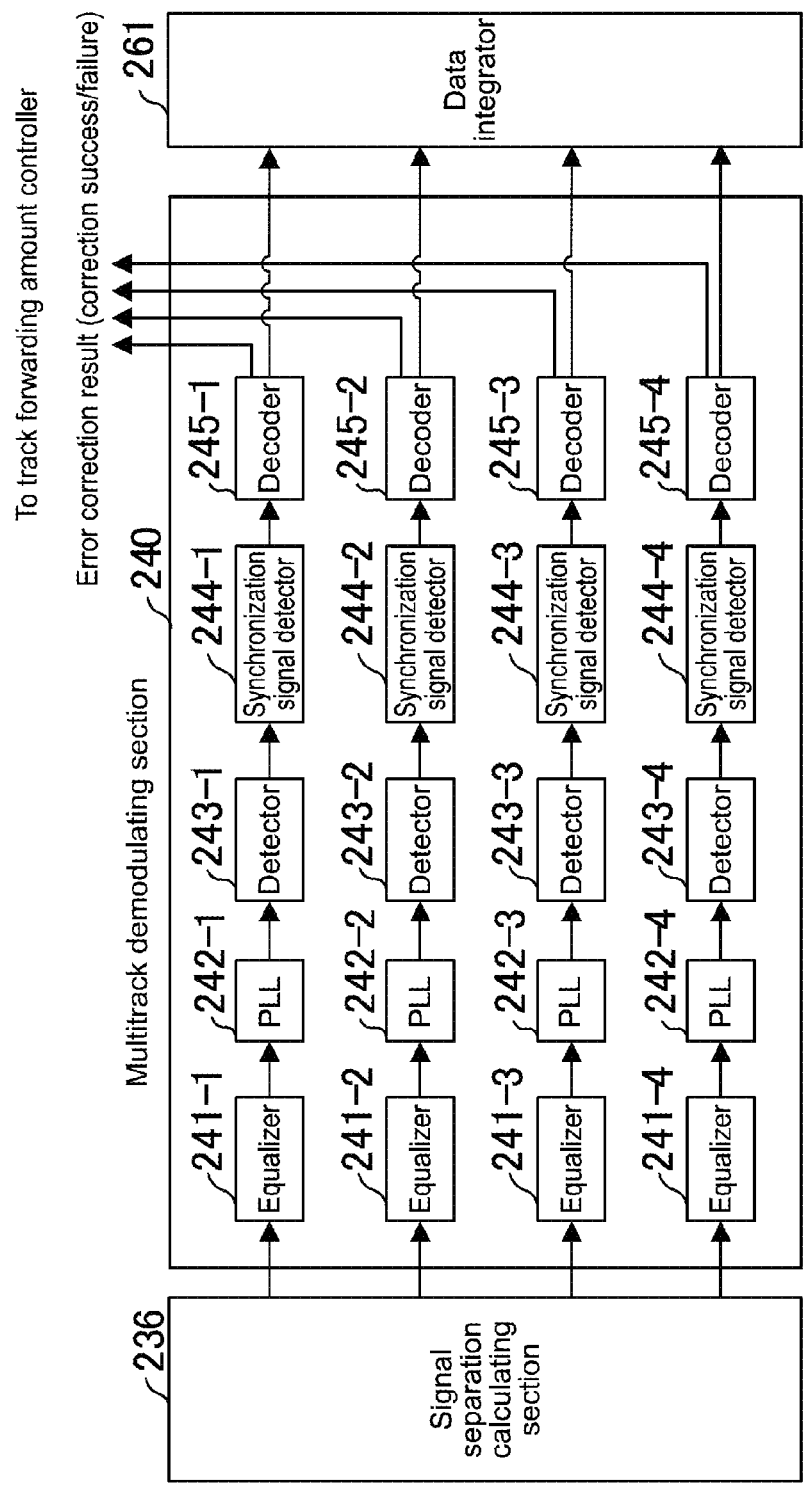
FIG. 15 is a diagram showing a structure of a multitrack demodulating section according to the third embodiment.

Further, FIG. 15 is a diagram showing a structure of the multitrack demodulating section 240 of this embodiment. As shown in the figure, in the multitrack demodulating section 240, the decoders 245-1, 245-2, 245-3, and 245-4 correct errors of the reproduced data, and information on a result of the error correction (correction success/failure) is output to the track forwarding amount controller 271.

It should be noted that a track format to be a target of this embodiment is a track format employed in the first embodiment, that is, a track format capable of being reproduced in both the forward direction and the backward direction without making a distinction between the track recorded in the forward direction and the track recorded in the backward direction.

Figure 16:
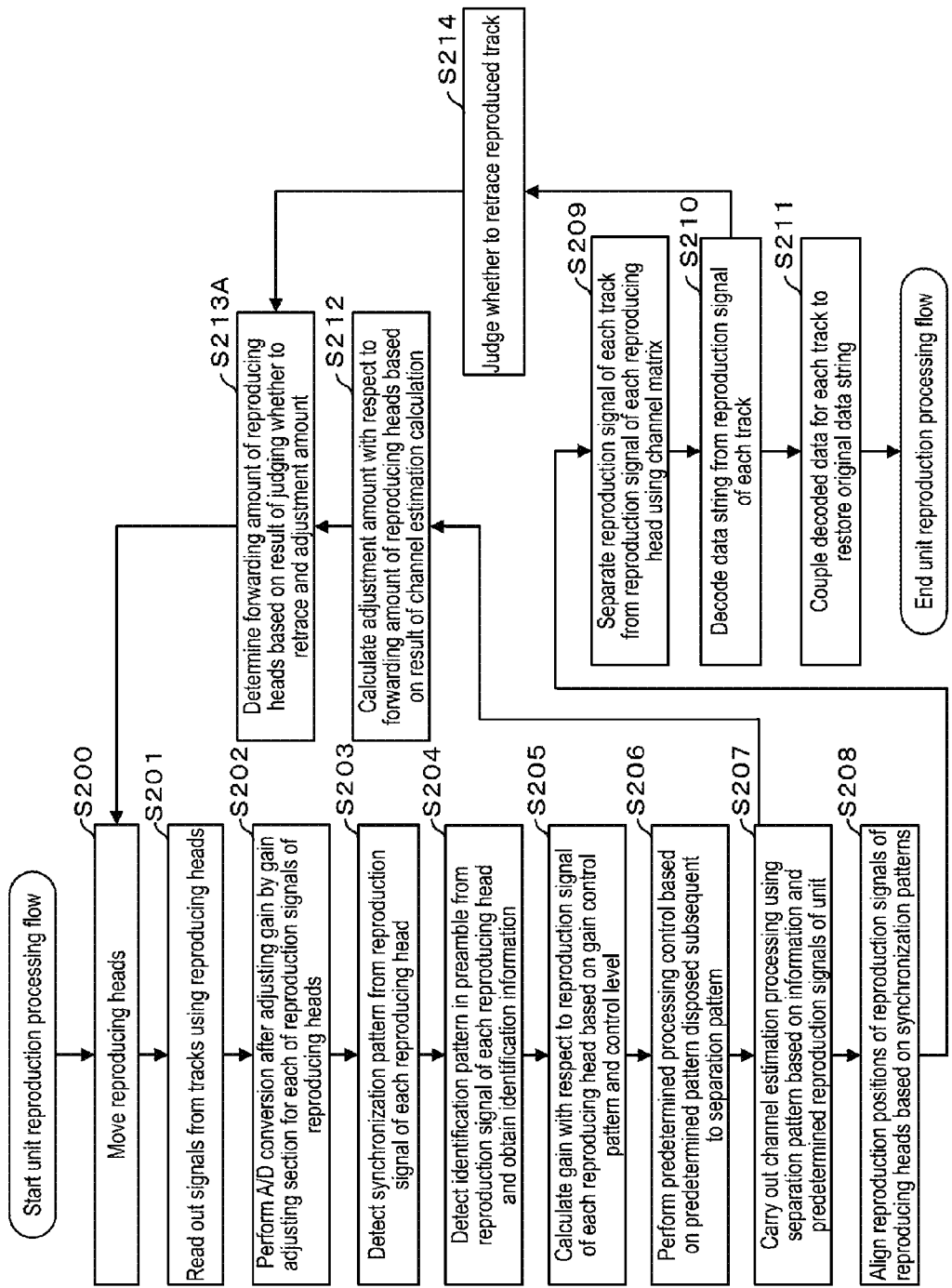
FIG. 16 is a flowchart showing a unit reproduction operation of the reproducing apparatus according to the third embodiment.

FIG. 16 is a flowchart showing a unit reproduction operation of the reproducing apparatus 200.

An operation from Step S201 to S212 is the same as that of the reproducing apparatus 200 of the first embodiment shown in FIG. 5. Therefore, descriptions thereof will be omitted.

In Step S214, upon receiving the information on the error correction result (correction success/failure) from the multitrack demodulating section 240, the track forwarding amount controller 271 transmits, when judging that a content of the information is a correction failure, information instructing a retrace of the unit that has been reproduced until then to the track forwarding amount determining section 272.

Moreover, in Step S212, based on the channel matrix obtained by the channel estimate calculating section 234 through the channel estimation calculation, the track forwarding amount controller 271 calculates an adjustment amount with respect to the defined forwarding amount of the reproducing heads R-1, R-2, R-3, and R-4 at the time of switching the unit to be reproduced, and transmits the adjustment amount to the track forwarding amount determining section 272.

In Step S213A, when having received the information instructing the retrace of the unit that has been reproduced until then from the track forwarding amount controller 271, the track forwarding amount determining section 272 determines the forwarding amount for moving the reproducing heads R-1, R-2, R-3, and R-4 to appropriate positions in the track width direction with respect to the unit to be retraced based on the adjustment amount output from the track forwarding amount controller 271, and outputs a control signal corresponding to the forwarding amount to the track forwarding section 273.

When the information instructing the retrace is not received from the track forwarding amount controller 271, the track forwarding amount determining section 272 determines a value obtained by adjusting the defined forwarding amount among the units by the adjustment amount as an appropriate forwarding amount of the reproducing heads R-1, R-2, R-3, and R-4 as in the first embodiment, and outputs a control signal corresponding to the appropriate forwarding amount to the track forwarding section 273. In response to the control signal from the track forwarding amount determining section 272, the track forwarding section 273 moves the reproducing heads R-1, R-2, R-3, and R-4 in the track width direction.

Figure 17:
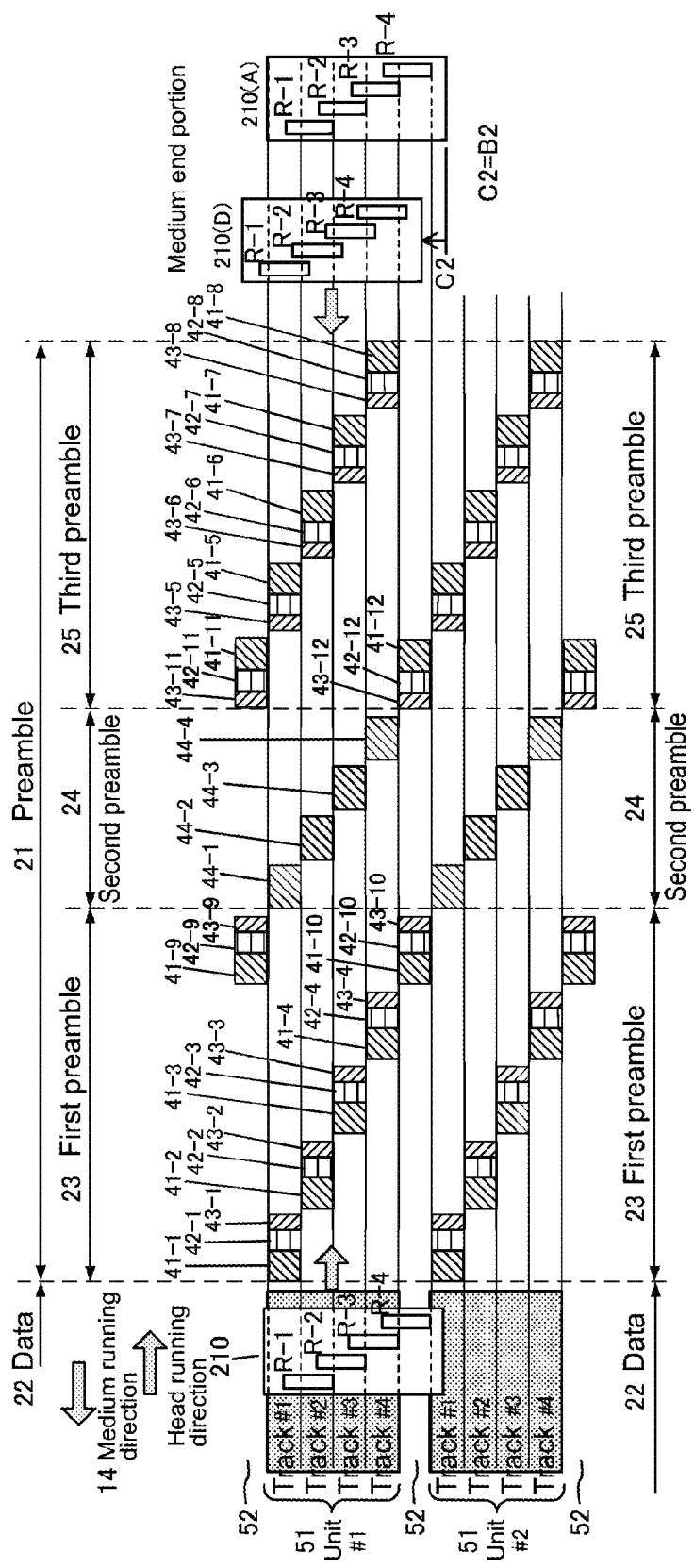
FIG. 17 is a diagram showing a specific example of an adjustment of a forwarding amount of a reproducing head in a case where a unit is retraced in the third embodiment.

FIG. 17 is a diagram showing a specific example of an adjustment of the forwarding amount of the reproducing heads R-1, R-2, R-3, and R-4 in a case where a unit is retraced in this embodiment. FIG. 17 shows a state where the reproduction processing of the unit #1 is ended and a retrace of the same unit is about to be started next in the backward direction. 210(A) shows the reproducing heads R-1, R-2, R-3, and R-4 positioned at an end portion of the unit #1 in the reproduction direction after the trace is completed. At this time, the positions of the reproducing heads R-1, R-2, R-3, and R-4 are deviated downward in the figure by about 75% of the track width. At this time, it is assumed that information indicating an error correction failure is notified to the track forwarding amount controller 271 from the multitrack demodulating section 240, and the information instructing the retrace of the unit #1 that has been reproduced until then is input to the track forwarding amount determining section 272 from the track forwarding amount controller 271.

In this case, the track forwarding amount determining section 272 determines, based on an adjustment amount B2 output from the track forwarding amount controller 271, an appropriate forwarding amount C2 (C2=B2) for moving the reproducing heads R-1, R-2, R-3, and R-4 to appropriate positions in the track width direction with respect to the unit #1 to be retraced, and outputs a control signal corresponding to the appropriate forwarding amount C2 to the track forwarding section 273. 210(D) shows positions of the reproducing heads R-1, R-2, R-3, and R-4 after being moved.

As described above, in this embodiment, when the quality of the reproduction data is poor, the retrace of the same unit is carried out from the other direction. In this case, the track forwarding amount determining section 272 determines the forwarding amount for moving the reproducing heads R-1, R-2, R-3, and R-4 to appropriate positions in the track width direction with respect to the unit based on the adjustment amount output from the track forwarding amount controller 271. Accordingly, a correct positional relationship between the unit and the reproducing heads R-1, R-2, R-3, and R-4 in the track width direction can be obtained immediately after the start of the retrace of the unit, with the result that the data reproduction can be carried out favorably.

It should be noted that this embodiment can be combined with other embodiments.

Fourth Embodiment

Next, a magnetic recording/reproducing system that uses a single head will be described as a fourth embodiment of the present invention.

The magnetic recording/reproducing system of this embodiment includes one or more recording heads and reproducing heads in a number smaller than the number of tracks per unit, and is a system for reproducing a recording medium onto which the recording has been performed without aligning the recording positions for each track, without aligning the reproduction positions for each track.

Figure 18:
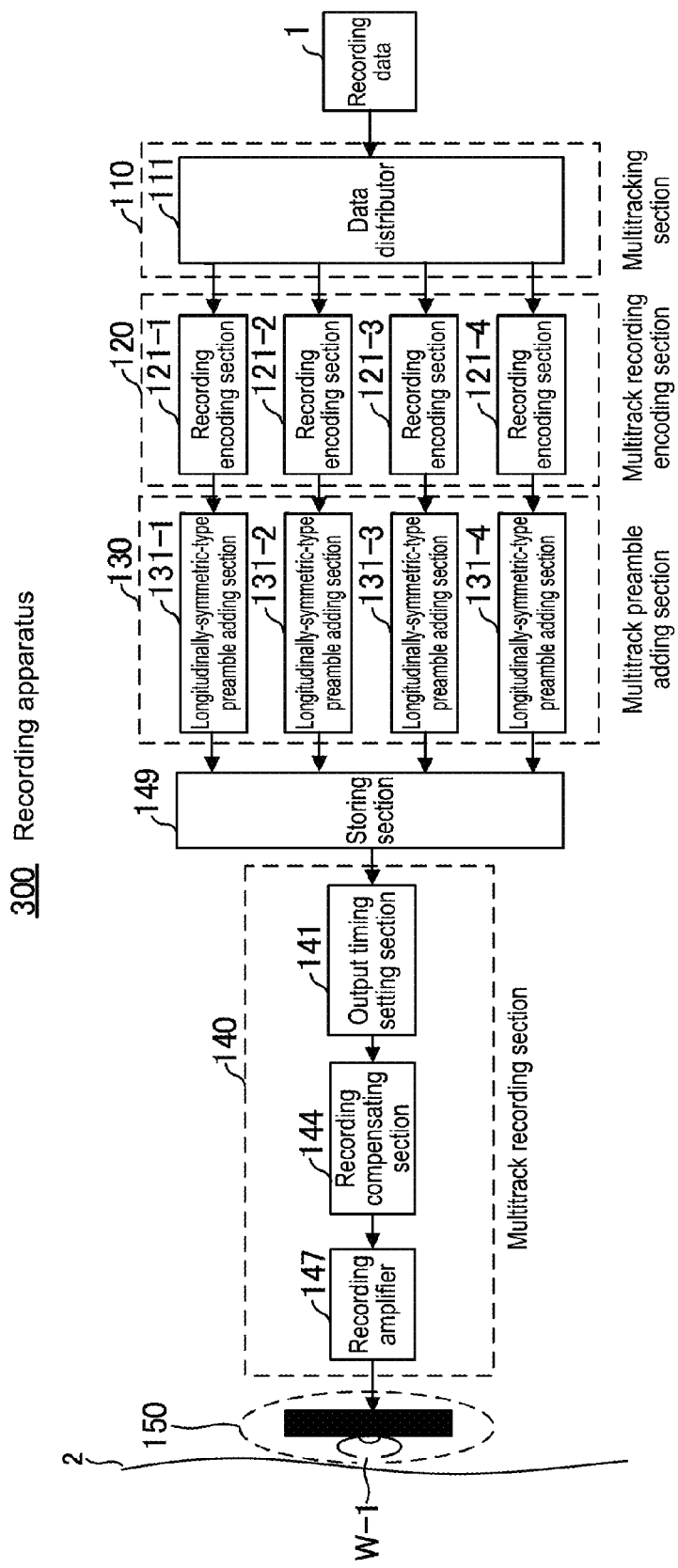
FIG. 18 is a diagram showing a structure of a recording apparatus in a magnetic recording/reproducing system according to a fourth embodiment of the present invention.

FIG. 18 is a diagram showing a structure of a recording apparatus 300 in the magnetic recording/reproducing system according to the fourth embodiment of the present invention.

The recording apparatus 300 records a unit with a single head. Here, a predetermined number of times a unit recording is carried out by a single recording head is represented by M, and a predetermined number of times a unit reproduction is carried out by a single reproducing head is represented by N.

As shown in the figure, the recording apparatus 300 includes a multitracking section 110, a multitrack recording encoding section 120, a multitrack preamble adding section 130, a multitrack recording section 140, a recording head array 150, and a storing section 149.

The multitrack recording encoding section 120 is constituted of M recording encoding sections 121-1, 121-2, 121-3, and 121-4 that encode M pieces of recording data divided by the data distributor 111.

The multitrack preamble adding section 130 is constituted of M longitudinally-symmetric-type preamble adding sections 131-1, 131-2, 131-3, and 131-4 that add a longitudinally-symmetric-type preamble that can be read from both the forward direction and the backward direction to the pieces of recording data encoded by the multitrack recording encoding section 120, as a preamble necessary for controlling the data reproduction per unit.

The storing section 149 stores code strings of recording data of at least one unit, that have been generated by the multitrack preamble adding section 130.

The multitrack recording section 140 is means for recording onto the recording medium the recording code string of each track to which the preamble has been added. More specifically, the multitrack recording section 140 is constituted of one output timing setting section 141 that imparts a desired timing to the recording code string to which the preamble has been added, one recording compensating sections 144 that carries out recording compensation processing, and one recording amplifier 147 that drives the recording head W-1 based on the recording code strings that have been subjected to the recording compensation processing.

Figure 19:
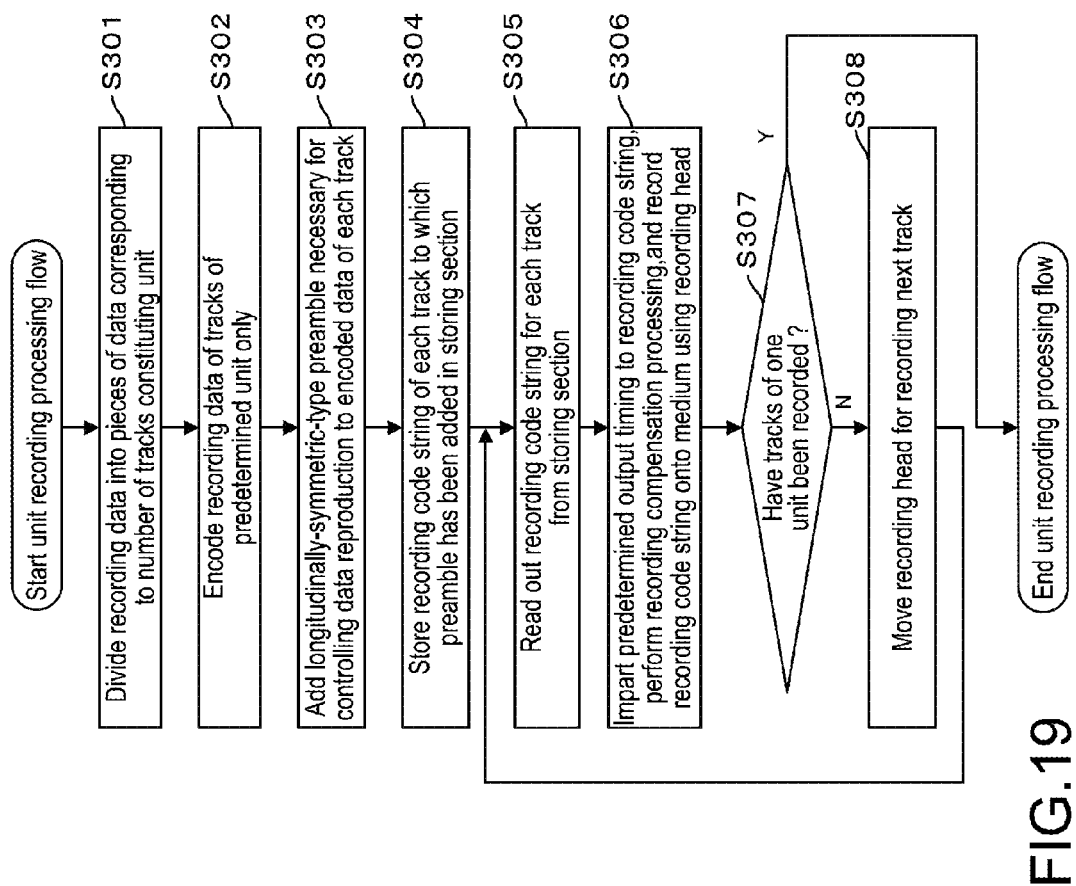
FIG. 19 is a flowchart showing a flow of a unit recording operation of the recording apparatus according to the fourth embodiment.

FIG. 19 is a flowchart showing a flow of a unit recording operation of the recording apparatus 300.

In the recording apparatus 300, the multitracking section 110 first divides the input recording data 1 into M (M=4) pieces of data (data of each track) (Step S301).

The divided pieces of data are encoded into code strings that take into account the recording/reproduction characteristics of the magnetic recording medium 2 by the recording encoding sections 121-1, 121-2, 121-3, and 121-4 of the multitrack recording encoding section 120. At this time, each of the code strings is added with information necessary for data demodulation, such as a synchronization pattern for demodulation (Step S302).

Next, the M longitudinally-symmetric-type preamble adding sections 131-1, 131-2, 131-3, and 131-4 of the multitrack preamble adding section 130 add longitudinally-symmetric-type preambles that can be read in both the forward direction and the backward direction at predetermined positions on the encoded pieces of recording data, as a preamble necessary for controlling the data reproduction per unit, to thus obtain recording code strings (Step S303). The recording code string of each track to which the preamble has thus been added is stored in the storing section 149 (Step S304).

After that, the recording code string of the track to be recorded first is read out from the storing section 149 (Step S305) and imparted with a desired timing in the output timing setting section 141. Then, the recording code string is subjected to recording compensation processing for optimization for the recording with respect to the magnetic recording medium 2 in the recording compensating section 144, subjected to a voltage-to-current conversion in the recording amplifier 147, and recorded onto the magnetic recording medium 2 with the recording head W-1 (Step S306).

Then, it is judged whether the recording of the tracks of one unit has ended (Step S307). If not ended (NO in Step S307), the recording head W-1 is moved to the next position (Step S308). After that, the recording code string of the next track is read out from the storing section 149, and the recording processing is repeated in the same manner. The operation above is repeated until the recording of the tracks of one unit is ended.

Next, a modified example of the recording apparatus in the magnetic recording/reproducing system according to the fourth embodiment will be described.

Figure 20:
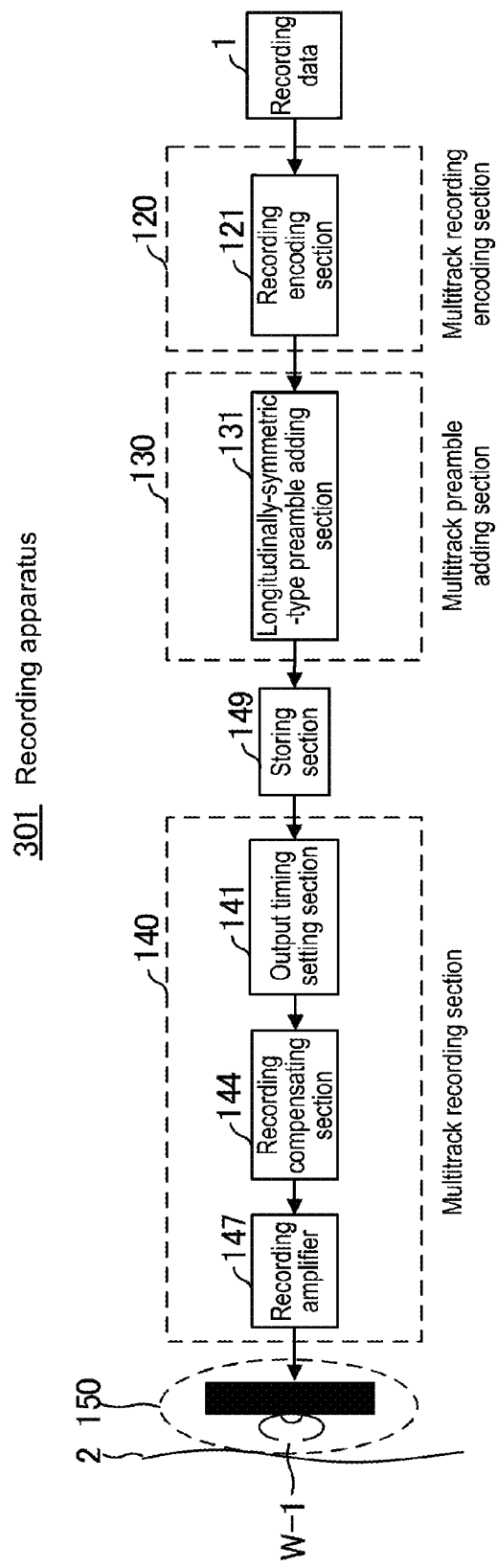
FIG. 20 is a diagram showing a structure of a modified example of the recording apparatus according to the fourth embodiment.

FIG. 20 is a diagram showing a structure of a recording apparatus 301 as the modified example of the recording apparatus in the magnetic recording/reproducing system according to the fourth embodiment.

As shown in the figure, a difference between the recording apparatus 301 and the recording apparatus 300 shown in FIG. 18 is the structure of the multitrack recording encoding section 120 and the multitrack preamble adding section 130. The multitrack recording encoding section 120 is constituted of one recording encoding section 121 that encodes pieces of recording data of a predetermined unit, for example, pieces of recording data of a predetermined number of tracks, and the multitrack preamble adding section 130 is constituted of one longitudinally-symmetric-type preamble adding section 131 that adds a longitudinally-symmetric-type preamble necessary for controlling the data reproduction per unit to the encoded recording data of each track. In addition, in the recording apparatus 301, the multitracking section 110 (data distributor 111) is omitted from the structure of the recording apparatus 300 shown in FIG. 18.

Figure 21:
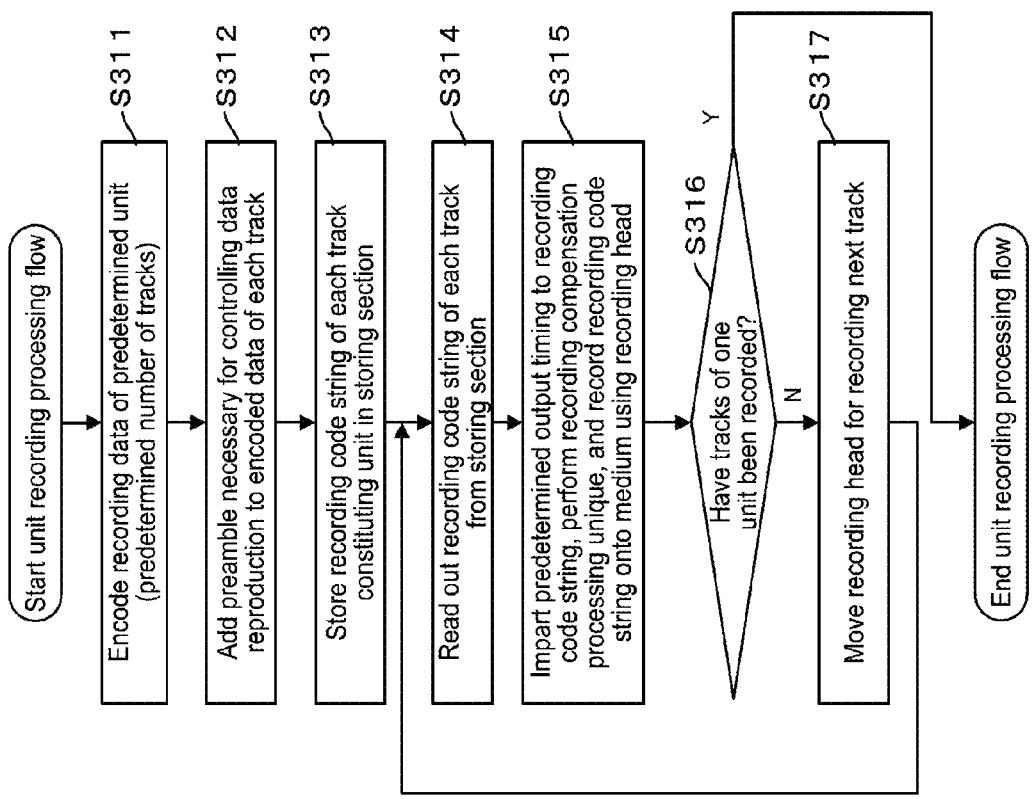
FIG. 21 is a flowchart showing a flow of a unit recording operation of the recording apparatus shown in FIG. 20.

FIG. 21 is a flowchart showing a flow of a unit recording operation of the recording apparatus 301.

In the recording apparatus 301, the recording encoding section 121 first encodes pieces of recording data of a predetermined unit, for example, pieces of recording data of a predetermined number of tracks into code strings that take into account the recording/reproduction characteristics of the magnetic recording medium 2. At this time, the code string of the data is also added with information necessary for data demodulation, such as a synchronization pattern for demodulation (Step S311).

Next, the longitudinally-symmetric-type preamble adding section 131 adds longitudinally-symmetric-type preambles that can be read in both the forward direction and the backward direction to the encoded pieces of recording data at predetermined positions, as a preamble necessary for controlling the data reproduction per unit, to thus obtain recording code strings (Step S312). The recording code string of each track to which the preamble has thus been added is stored in the storing section 149 (Step S313).

After that, the recording code string of the track to be recorded first is read out from the storing section 149 (Step S314) and imparted with a desired timing in the output timing setting section 141. Then, the recording code string is subjected to recording compensation processing for optimization for the recording with respect to the magnetic recording medium 2 in the recording compensating section 144, subjected to a voltage-to-current conversion in the recording amplifier 147, and recorded onto the magnetic recording medium 2 with the recording head W-1 (Step S315).

Then, it is judged whether the recording of the tracks of one unit has ended (Step S316). If not ended (NO in Step S316), the recording head W-1 is moved to the next position (Step S317). After that, the recording code string of the next track is read out from the storing section 149, and the recording processing is repeated in the same manner. The operation above is repeated until the recording of the tracks of one unit is ended.

Figure 22:
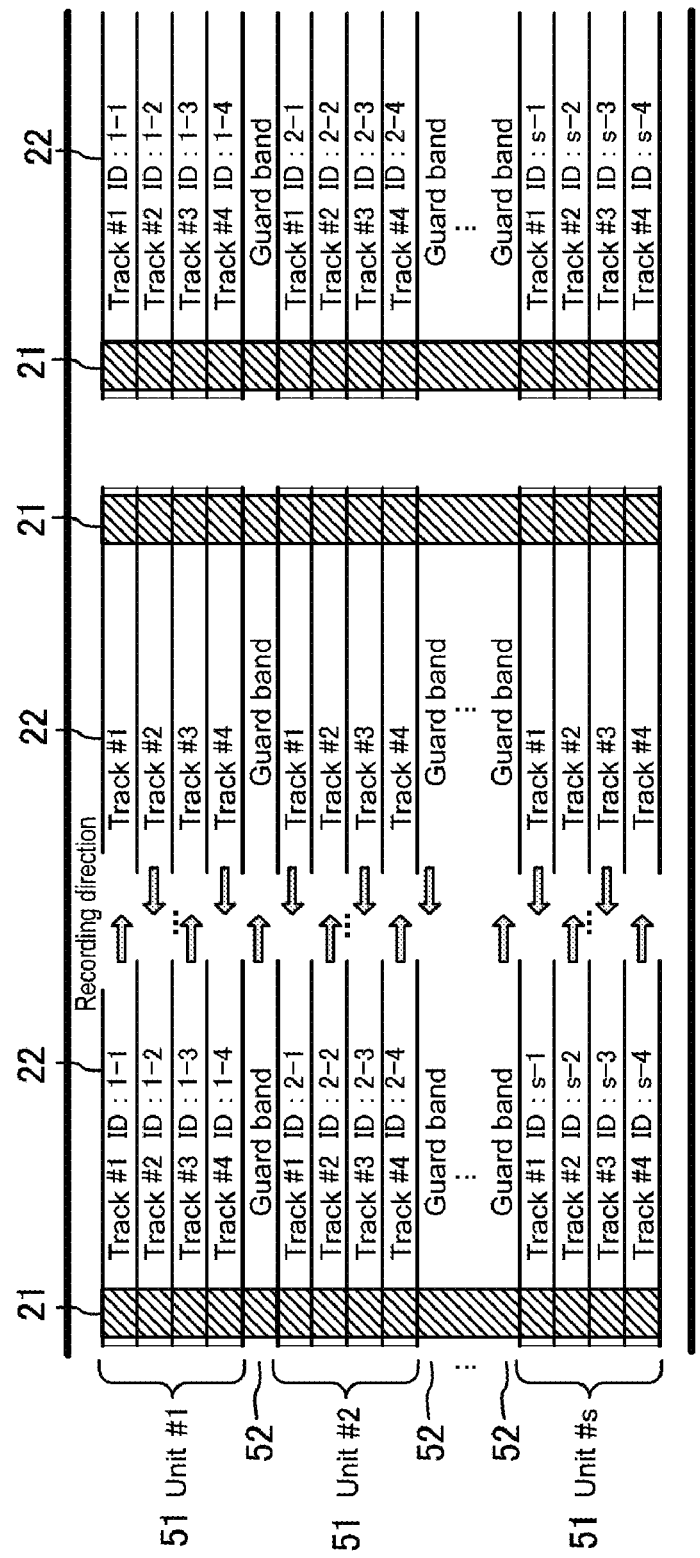
FIG. 22 is a conceptual diagram of a track format on a magnetic recording medium that has been recorded by the recording apparatus according to the fourth embodiment.

FIG. 22 is a conceptual diagram of a track format on the magnetic recording medium 2 recorded by the recording apparatus 300 (or recording apparatus 301).

First, the recording apparatus 300 (or recording apparatus 301) carries out the recording of the track #1 while moving the recording head W-1 in the forward direction at a position on the track #1. Next, after forwarding the recording head W-1 to a position on the track #2, the recording apparatus 300 (or recording apparatus 301) carries out the recording on the track #2 while moving the recording head W-1 in the backward direction. Then, after forwarding the recording head W-1 to a position on the track #3, the recording apparatus 300 (or recording apparatus 301) carries out the recording on the track #3 while moving the recording head W-1 in the forward direction. Finally, after forwarding the recording head W-1 to a position on the track #4, the recording apparatus 300 (or recording apparatus 301) carries out the recording on the track #4 while moving the recording head W-1 in the backward direction. Accordingly, the recording of one unit is completed. It should be noted that although a structure in which the preamble 21 is provided on the guard band 52 is employed in FIG. 22, it is also possible to provide the preamble 21 only on the tracks as shown in FIG. 6.

Figure 23:
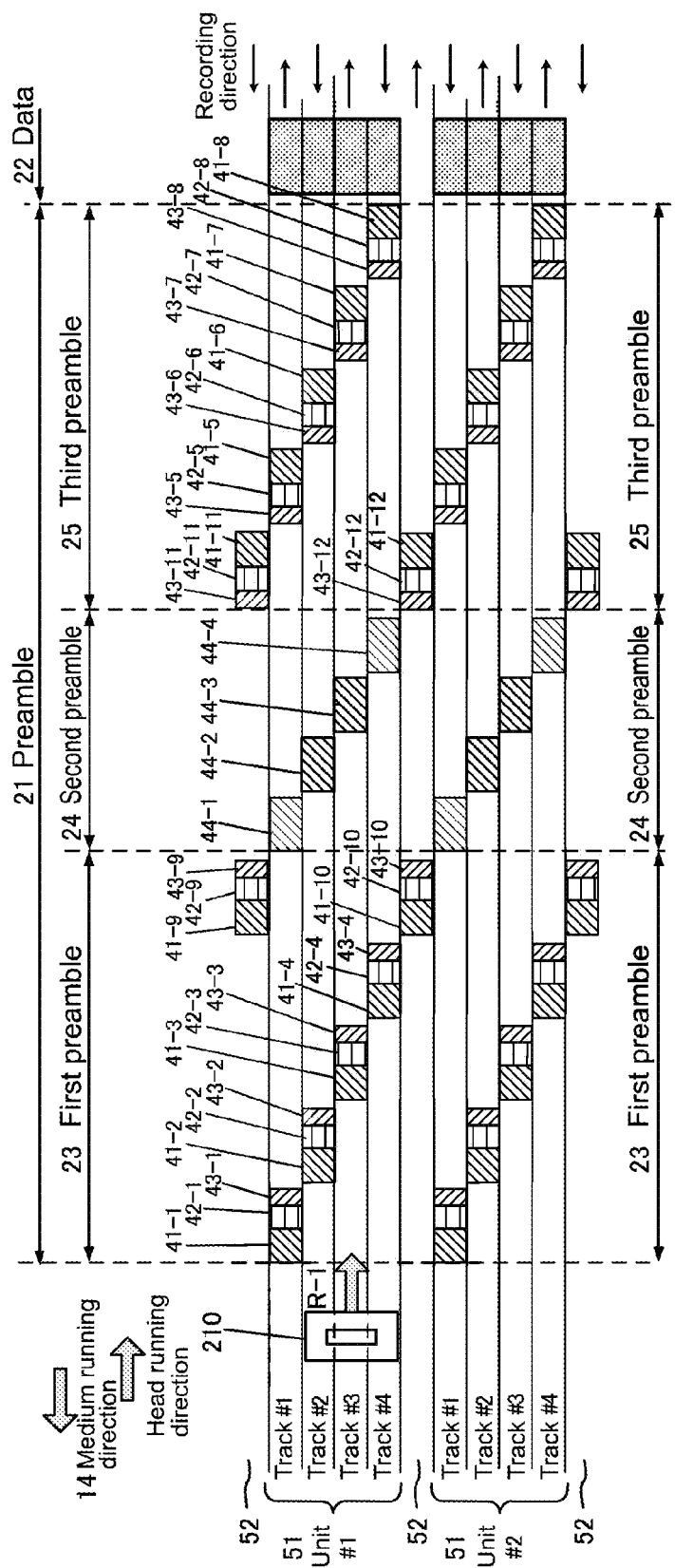
FIG. 23 is a diagram showing an example of a structure of a preamble in the track format shown in FIG. 22.

FIG. 23 is a diagram showing an example of a structure of a preamble in the track format shown in FIG. 22. In this track format, in addition to the preamble 21 provided on each of the tracks, the first preamble 23 and the third preamble 25 in the preamble 21 are also provided on the guard band 52. Here, the structure of the preamble 21 provided on each of the tracks #1, #2, #3, and #4 is the same as that shown in FIG. 7. Structures of the first preamble 23 and the third preamble 25 provided on the guard band 52 are also the same as those of the first preamble 23 and the third preamble 25 provided on the tracks.

Next, a reproducing apparatus in the magnetic recording/reproducing system according to the fourth embodiment of the present invention will be described.

Figure 24:
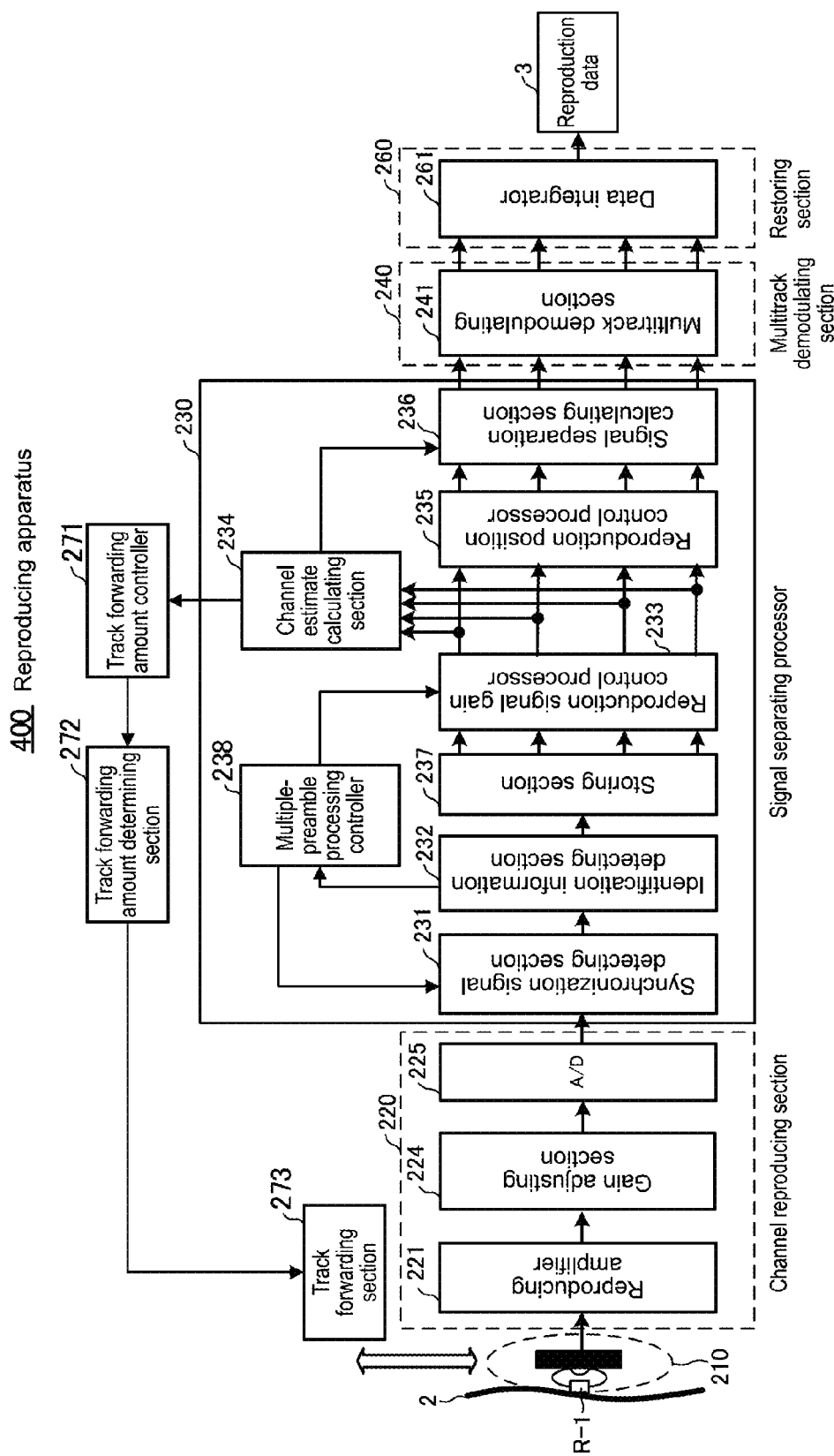
FIG. 24 is a diagram showing a structure of a reproducing apparatus according to the fourth embodiment.

FIG. 24 is a diagram showing a structure of a reproducing apparatus 400 in the magnetic recording/reproducing system according to the fourth embodiment of the present invention.

As shown in the figure, the reproducing apparatus 400 includes reproducing head array 210, a channel reproducing section 220, a signal separating processor 230, a multitrack demodulating section 240, a restoring section 260, a track forwarding amount controller 271, a track forwarding amount determining section 272, and a track forwarding section 273.

The reproducing head array 210 includes one reproducing head R-1 that reads out signals from the tracks recorded onto the magnetic recording medium 2.

The channel reproducing section 220 includes one reproducing amplifier 221 that amplifies the signals reproduced by the reproducing head R-1 mounted to the reproducing head array 210, one gain adjusting section 224 that controls a gain so that an output amplitude level of the reproducing amplifier 221 becomes a predetermined value, and one A/D converter 225 that quantizes the output of the gain adjusting section 224 into a digital value of a predetermined bit width.

It should be noted that a lowpass filter for removing unnecessary high-frequency components may be provided immediately before the A/D converter 225 as necessary.

Moreover, the gain adjusting section 224 may be disposed subsequent to the A/D converter 225 instead of before. The gain adjusting section 224 may control a gain after quantization. This is effective in a case where the bit width of the A/D converter 225 is to be used effectively or a structure of the gain adjusting section 224 is to be made a simple structure that takes into account the detection of the patterns included in the preamble.

Further, if demodulation processing is carried out while an output timing of each track is controlled in the multitrack demodulating section 240, processing of coupling the data in the restoring section 260 becomes unnecessary. Therefore, the restoring section 260 is unnecessary in this case.

The signal separating processor 230 includes a synchronization signal detecting section 231, an identification information detecting section 232, a reproduction signal gain control processor 233, a channel estimate calculating section 234, a reproduction position control processor 235, a signal separation calculating section 236, a storing section 237, and a multiple-preamble processing controller 238.

The synchronization signal detecting section 231 detects a synchronization pattern disposed in front of the separation pattern from each of the reproduction signals of the reproducing head R-1 output from the A/D converter 225.

The identification information detecting section 232 uses information obtained by the synchronization signal detecting section 231 to specify and detect a head position of the identification pattern in each of the reproduction signals of the reproducing head R-1, and thus obtains identification information.

Regarding each of the tracks identified by the identification information detecting section 232, the multiple-preamble processing controller 238 specifies head positions of various patterns disposed subsequent to the synchronization pattern detected first in terms of the reproduction order. Then, the multiple-preamble processing controller 238 carries out predetermined processing control such as a calculation of a gain with respect to the reproduction signals of the reproducing head R-1 based on reproduction signals of various patterns within the preamble disposed subsequent to the separation pattern (third preamble).

Based on the reproduction signal of the gain control pattern within the preamble from the reproduction signal of the reproducing head R-1 for each trace obtained from the storing section 237, the reproduction signal gain control processor 233 calculates a gain with respect to the reproduction signal of the reproducing head R-1 for each trace, combines the gain with the gain input from the multiple-preamble processing controller 238, determines a more-appropriate gain with respect to the reproduction signal of the reproducing head R-1 for each trace, and controls a level of the reproduction signal by amplifying the reproduction signal by the gain.

Based on the information obtained by the synchronization signal detecting section 231 and the identification information obtained by the identification information detecting section 232, the channel estimate calculating section 234 specifies a head position of the separation pattern included in the preamble of the reproduction signal of the reproducing head R-1 for each trace and carries out a channel estimation calculation for calculating a channel matrix that corresponds to the positional relationship between the reproducing head R-1 for each trace and the plurality of tracks in the track width direction at the time of the reproduction based on the reproduction signal of the separation pattern output from the reproduction signal gain control processor 233.

Based on the information obtained by the synchronization signal detecting section 231, the reproduction position control processor 235 carries out processing of aligning a reproduction position of the reproduction signal of the reproducing head R-1 for each trace that has passed through the reproduction signal gain control processor 233.

The signal separation calculating section 236 carries out processing of separating, from the reproduction signal of the reproducing head R-1 for each trace whose reproduction position has been aligned by the reproduction position control processor 235, a reproduction signal of each track by predetermined calculation processing using the channel matrix obtained by the channel estimate calculating section 234.

The storing section 237 is disposed subsequent to the identification information detecting section 232 and stores reproduction signals of at least one unit.

As shown in FIG. 4, the multitrack demodulating section 240 includes M equalizers 241-1, 241-2, 241-3, and 241-4 that carry out equalization processing on the reproduction signal of each track separated by the signal separation calculating section 236, M PLLs 242-1, 242-2, 242-3, and 242-4 that carry out bit synchronization processing based on the outputs of the equalizers 241-1, 241-2, 241-3, and 241-4, M detectors 243-1, 243-2, 243-3, and 243-4 exemplified by a Viterbi detector, for generating a code string by binarizing the reproduction signal of each track using a bit synchronization signal generated by the PLLs 242-1, 242-2, 242-3, and 242-4, M synchronization signal detectors 244-1, 244-2, 244-3, and 244-4 that detect the synchronization patterns on the code string from the binarized reproduction signals as the outputs of the detectors 243-1, 243-2, 243-3, and 243-4, and M decoders 245-1, 245-2, 245-3, and 245-4 that specify a head position of the data based on the synchronization patterns detected by the synchronization signal detectors 244-1, 244-2, 244-3, and 244-4 and decode a data string from the code string. It should be noted that the multitrack demodulating section 240 includes a storing section (not shown) that stores information such as data necessary for the processing above.

Referring back to FIG. 24, the restoring section 260 includes a data integrator 261 that couples the data of the tracks output from the M decoders 245-1, 245-2, 245-3, and 245-4 of the multitrack demodulating section 240 by an operation opposite to that at the time of the recording, to thus restore reproduction data 3.

It should be noted that a trace of a track in the reproduction using a single head is only repeated the number of times corresponding to the number of recording tracks of at least one unit. In other words, the trace may be repeated the number of times equal to or more than the number of tracks. In this case, each of the tracks of one unit is traced at least once. The storing section 237 stores signals reproduced at positions to which the reproducing head R-1 is moved, that is, signals reproduced from the plurality of tracks by the reproducing head R-1 at respective positions, the signals being reproduction signals of patterns subsequent to the separation pattern stored by the synchronization signal detecting section 231.

In the reproduction, the tracing direction is switched between the forward direction and the backward direction for each trace by the reproducing head R-1. The reproducing head R-1 performs the reproduction across the plurality of tracks recorded in different directions. However, in the track format used herein, since the first preamble 23 corresponding to the reproduction in the forward direction and the third preamble 25 corresponding to the reproduction in the backward direction are arranged symmetrically on both sides of the second preamble 24, information on the preambles necessary for controlling the data reproduction per unit can be obtained. Accordingly, the reproduction processing can favorably be carried out irrespective of which of the forward direction and the backward direction the track has been recorded in on the magnetic recording medium 2.

Figure 25:
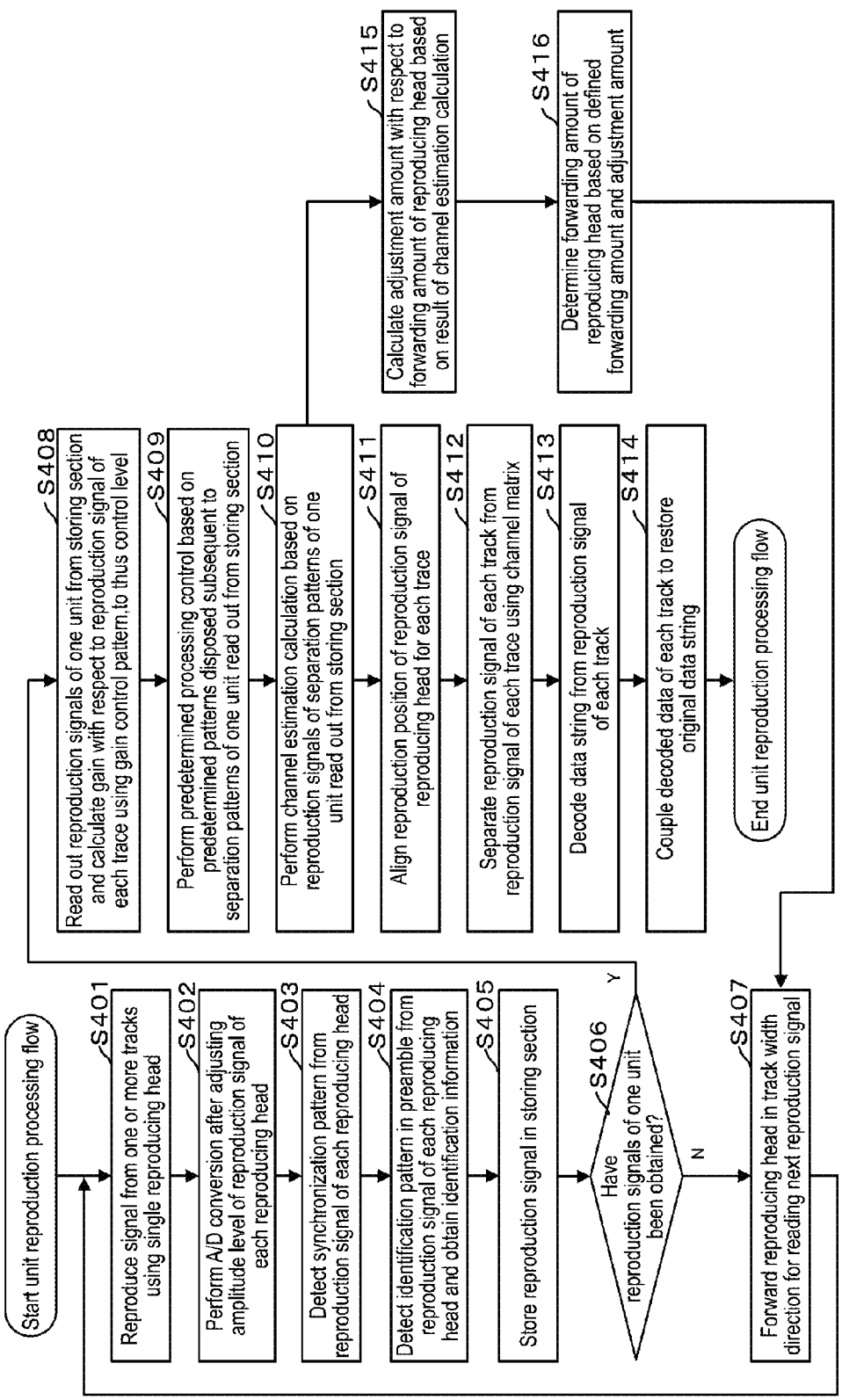
FIG. 25 is a flowchart showing a unit reproduction operation of the reproducing apparatus according to the fourth embodiment.

FIG. 25 is a flowchart showing a unit reproduction operation of the reproducing apparatus 400.

In the reproducing apparatus 400, the reproducing head R-1 first reproduces signals from the plurality of tracks at an initial position (Step S401). Next, the gain adjusting section 224 adjusts an output amplitude level of the reproducing amplifier 221, and an output thereof is converted into a digital value in the A/D converter 225 to thus be output to the synchronization signal detecting section 231 (Step S402).

Then, after a synchronization pattern included in the reproduction signal output from the A/D converter 225 is detected by the synchronization signal detecting section 231 (Step S403), the identification information detecting section 232 uses information obtained by the synchronization signal detecting section 231 to specify a head position of an identification pattern in the reproduction signal of the reproducing head R-1 to thus detect an identification pattern, and obtains identification information (Step S404). The reproduction signal that has passed through the identification information detecting section 232 is stored in the storage section 237 (Step S405).

Next, it is judged whether reproduction signals of one unit have been stored in the storage section 237 (Step S406). When the reproduction signals of one unit are not yet stored in the storage section 237, the reproducing head R-1 is forwarded to the next position in the track width direction (Step S407), and the operation from Steps S401 to S405 is repeated.

When the reproduction signals of one unit are stored in the storage section 237, the reproduction signal gain control processor 233 reads out the reproduction signals of one unit stored in the storage section 237, calculates a gain with respect to the reproduction signal of each trace based on the reproduction signal of the gain control pattern in the reproduction signal of each trace, and individually controls a level of the reproduction signal of each trace (Step S408).

Subsequently, regarding the tracks identified by the identification information detecting section 232, the multiple-preamble processing controller 238 specifies the head positions of the various patterns subsequent to the synchronization pattern detected first in terms of the reproduction order. Then, the multiple-preamble processing controller 238 carries out predetermined processing control such as a calculation of a gain with respect to the reproduction signals of the reproducing head R-1 based on the reproduction signals of the various patterns in the preamble disposed subsequent to the separation pattern (third preamble) (Step S409).

Next, the channel estimate calculating section 234 specifies a head position of the separation pattern included in the preamble of the reproduction signal of the reproducing head R-1 of each trace based on the information obtained by the synchronization signal detecting section 231 and the identification information obtained by the identification information detecting section 232, and calculates a channel matrix that corresponds to the positional relationship between the reproducing head R-1 and the plurality of tracks in the track width direction for each trace at the time of the reproduction based on the reproduction signal of the separation pattern output from the reproduction signal gain control processor 233 (Step S410).

Then, the reproduction position control processor 235 aligns the reproduction position of the reproduction signal of the reproducing head R-1 of each trace that has passed through the reproduction signal gain control processor 233 based on the information obtained by the synchronization signal detecting section 231 and the identification information obtained by the identification information detecting section 232 (Step S411).

Subsequently, using the channel matrix obtained by the channel estimate calculating section 234, the signal separation calculating section 236 carries out processing of separating, by predetermined calculation processing, the reproduction signal of each track from the reproduction signal of the reproducing head R-1 of each trace whose reproduction position has been aligned by the reproduction position control processor 235 (Step S412).

After that, the multitrack demodulating section 240 decodes the data string from the reproduction signal separated for each track (Step S413), and the restoring section 260 couples the data of each track to thus obtain reproduction data 3 (Step S414).

In the processing described above, the channel matrix obtained by the channel estimate calculating section 234 through the channel estimation calculation is also transmitted to the track forwarding amount controller 271. Based on the channel matrix input from the channel estimate calculating section 234, the track forwarding amount controller 271 calculates an adjustment amount with respect to the defined forwarding amount of the reproducing head R-1 at the time of switching the unit to be reproduced (Step S415). The adjustment amount calculated by the track forwarding amount controller 271 is transmitted to the track forwarding amount determining section 272.

The track forwarding amount determining section 272 is preset with a defined value of the forwarding amount of the reproducing head R-1. The defined forwarding amount is a sum of the track width and a width of the guard band 52. Upon obtaining the adjustment amount from the track forwarding amount controller 271, the track forwarding amount determining section 272 determines a value obtained by adjusting the defined forwarding amount by the adjustment amount as the forwarding amount of the reproducing head R-1 (Step S416) and outputs a control signal corresponding to the forwarding amount to the track forwarding section 273. Accordingly, the reproducing head R-1 is moved to an appropriate position in the track width direction for tracing the next unit.

Figure 26:
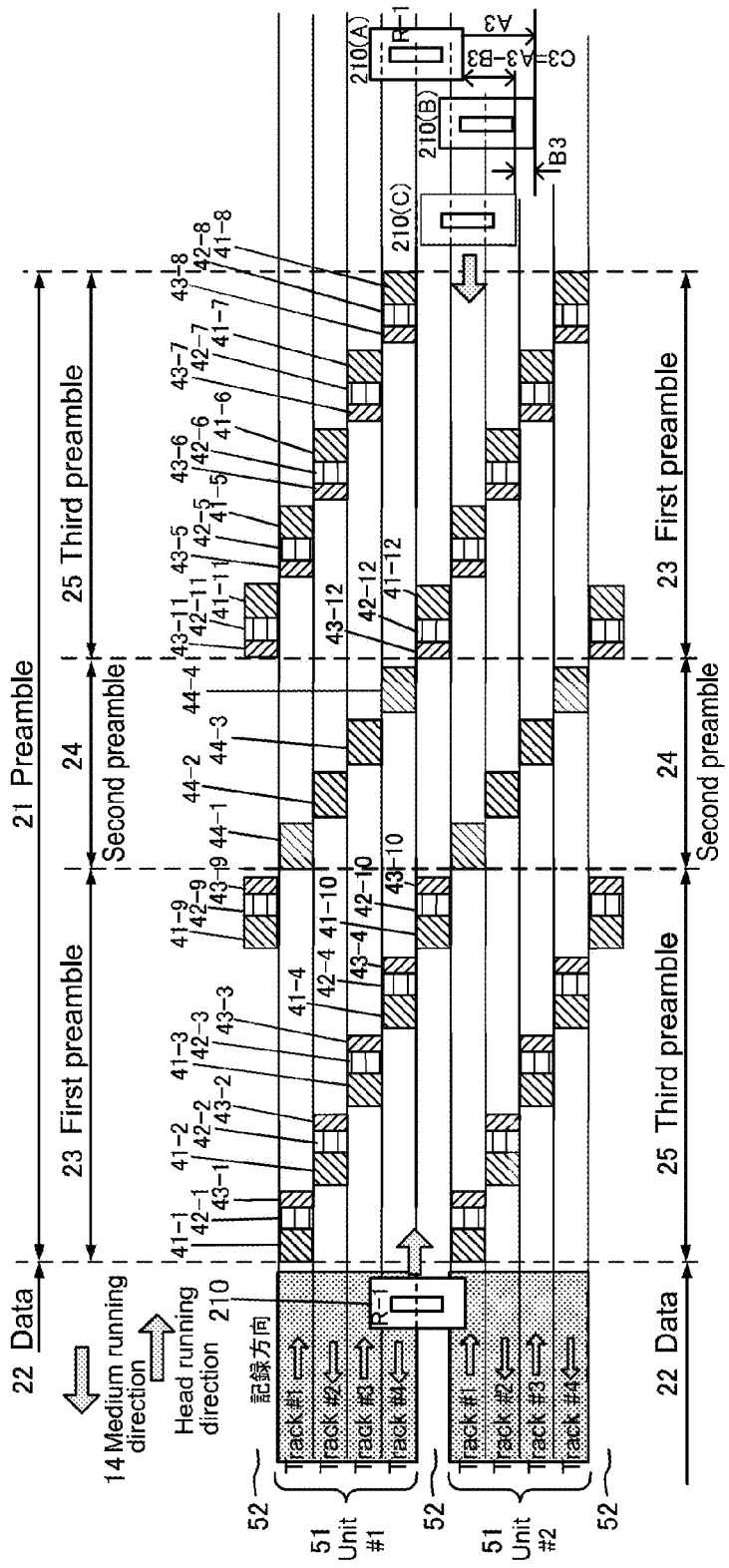
FIG. 26 is a diagram showing a specific example of an adjustment of a forwarding amount of a reproducing head when switching a unit to be reproduced in the reproducing apparatus according to the fourth embodiment.

FIG. 26 is a diagram showing a specific example of an adjustment of a forwarding amount of the reproducing head R-1 when switching the unit to be reproduced. FIG. 26 shows a state where the reproduction processing of the unit #1 is ended and the reproducing head R-1 is moved to a position from which a trace of the unit #2 is to be started next. 210(A) shows the reproducing head R-1 positioned at an end portion of the unit #1 in the reproduction direction upon completion of the reproduction of the unit #1. At this time, the position of the reproducing head R-1 is deviated downward in the figure only by 50% of the track width. As a defined forwarding amount A3, a sum of the track width and a width of the guard band 52 between the units is given. Thus, if the reproducing head R-1 is forwarded only by the defined forwarding amount A3, the deviation thereof at the end portion of the unit #1 is carried over to the positional relationship thereof with the unit #2 after being moved. 210(B) shows a position of the reproducing head R-1 in a case where the reproducing head R-1 is moved without any adjustment.

In this regard, the track forwarding amount controller 271 calculates an adjustment amount B3 with respect to the defined forwarding amount A3 based on the channel matrix obtained by the channel estimate calculating section 234. In this specific example, a minus forwarding amount corresponding to about 50% of the track width is obtained as the adjustment amount B3. The track forwarding amount determining section 272 determines a value obtained by adjusting the defined forwarding amount A3 by the adjustment amount B3 as an appropriate forwarding amount C3 (C3=A3±B3), and outputs a control signal to the track forwarding section 273 so that the reproducing head R-1 is moved only by the appropriate forwarding amount C3. It should be noted that a sign of a value of B3 is minus in the case of FIG. 26. Accordingly, the reproducing head R-1 is moved to an appropriate position in the track width direction. 210(C) shows the reproducing head R-1 that has been moved to the appropriate position in the track width direction.

Thus, according to this embodiment, also in the magnetic recording/reproducing system that uses a single head, the track forwarding amount controller 271 calculates the adjustment amount with respect to the defined forwarding amount of the reproducing head R-1 based on the channel matrix obtained by the channel estimate calculating section 234 through the channel estimation calculation, and the track forwarding amount determining section 272 adjusts the defined forwarding amount by the adjustment amount. As a result, the reproducing head R-1 can be moved to an appropriate position in the track width direction so that the reproduction can be started from immediately after the switch of the unit to be reproduced.

Further, according to this embodiment, in the magnetic recording/reproducing system that uses a single head, since the first preamble 23 corresponding to the reproduction in the forward direction and the third preamble 25 corresponding to the reproduction in the backward direction are arranged symmetrically on both sides of the second preamble 24, the second preamble 24, that is, the separation patterns 44-1, 44-2, 44-3, and 44-4 can be reproduced in both the forward direction and the backward direction, and the signal separation processing can thus be carried out favorably. Accordingly, the reproduction processing can favorably be carried out without making a distinction between the track recorded in the forward direction and the track recorded in the backward direction on the magnetic recording medium 2.

Furthermore, in this embodiment, at the time of the reproductions in the forward direction and the backward direction, the multiple-preamble processing controller 238 calculates a gain by the same method as the reproduction signal gain control processor 233 based on the reproduction signal of the gain control pattern disposed subsequent to the second preamble 24 and outputs the gain to the reproduction signal gain control processor 233. By combining a first gain of the reproduction signal of each trace that the reproduction signal gain control processor 233 itself has obtained and a second gain input from the multiple-preamble processing controller 238, the reproduction signal gain control processor 233 calculates a third gain that is more appropriate than the first and second gains, and controls a level of the reproduction signal of each trace by the third gain. Accordingly, gain control can be carried out more favorably, and a subsequent signal separation calculation can thus be carried out favorably.

Moreover, as shown in FIG. 23, in this embodiment, at a time of the last trace of the unit #1 (forward direction), the identification information detecting section 232 detects the identification pattern 43-4 of the first preamble 23 from the reproduction signal of the reproducing head R-1 to thus identify the track #4 (track ID=1_4) (see FIG. 6) and detects the identification pattern 43-10 of the guard band 52 to thus identify the guard band 52.

Information on the track and the guard band thus detected by the identification information detecting section 232 may be output to the track forwarding amount controller 271. In the case of such a structure, the track forwarding amount controller 271 can calculate the adjustment amount with respect to the defined forwarding amount of the reproducing head R-1 at the time of switching the unit to be reproduced based on the channel matrix obtained by the channel estimate calculating section 234 through the channel estimation calculation and the information on the track and the guard band detected by the identification information detecting section 232. In other words, the calculation of the adjustment amount that is based on the channel matrix may take into account the result of the identification of the track and the guard band. As a result, the adjustment amount can be calculated more accurately and more-stable signal reproduction processing becomes possible, with the result that an increase in the track density can be realized.

Fifth Embodiment

Next, a reproducing apparatus in a magnetic recording/reproducing system according to a fifth embodiment of the present invention will be described.

Figure 27:
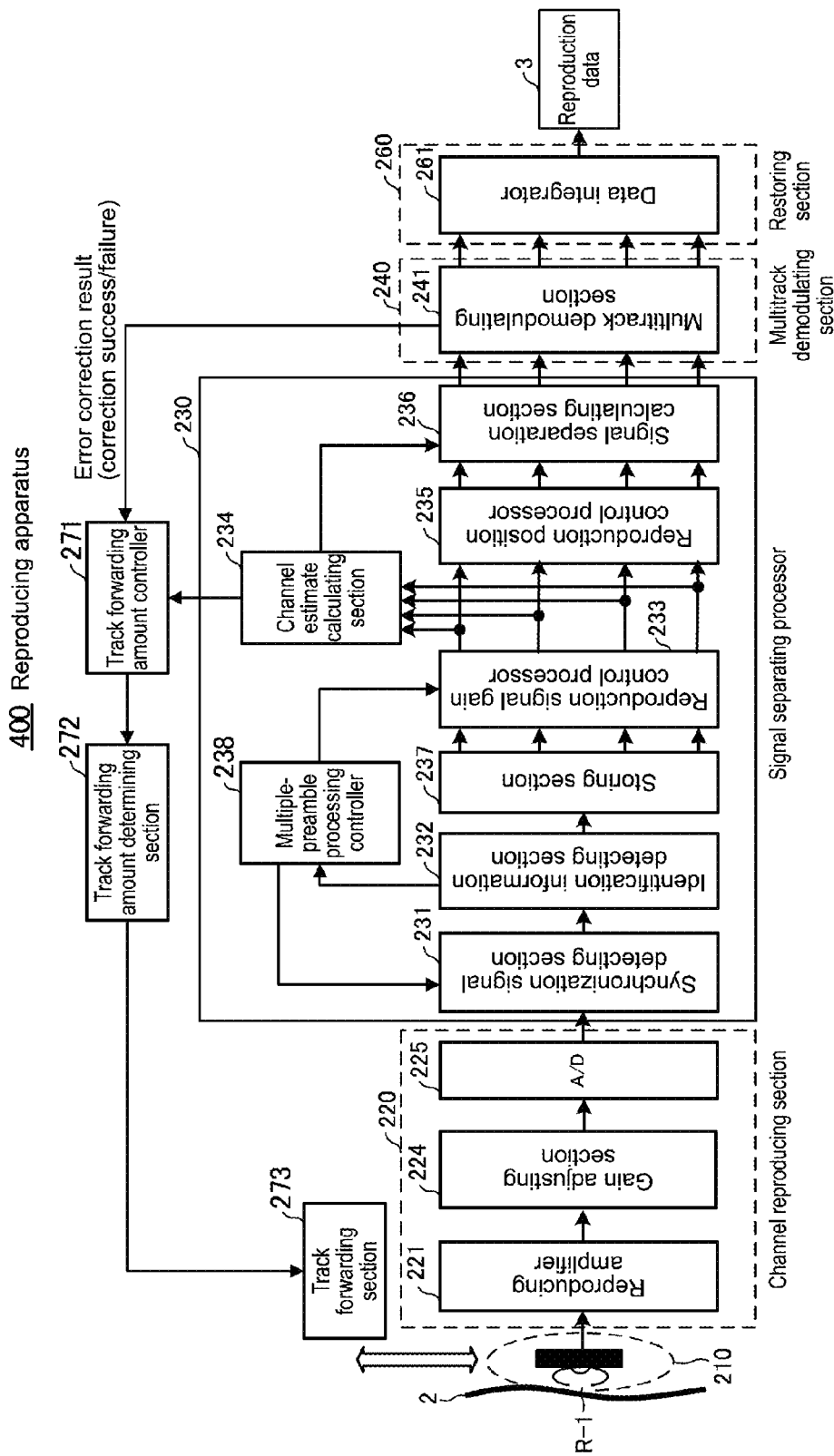
FIG. 27 is a diagram showing a structure of a reproducing apparatus according to a fifth embodiment of the present invention.

FIG. 27 is a diagram showing a structure of a reproducing apparatus 400 in the magnetic recording/reproducing system according to the fifth embodiment of the present invention. The reproducing apparatus 400 of this embodiment is structurally different from that of the fourth embodiment in that information on a result of an error correction (correction success/failure) is notified to the track forwarding amount controller 271 from the multitrack demodulating section 240. A structure of the multitrack demodulating section 240 is as shown in FIG. 15. The decoders 245-1, 245-2, 245-3, and 245-4 correct data errors, and information on a result of the error correction (correction success/failure) is output to the track forwarding amount controller 271.

Figure 28:
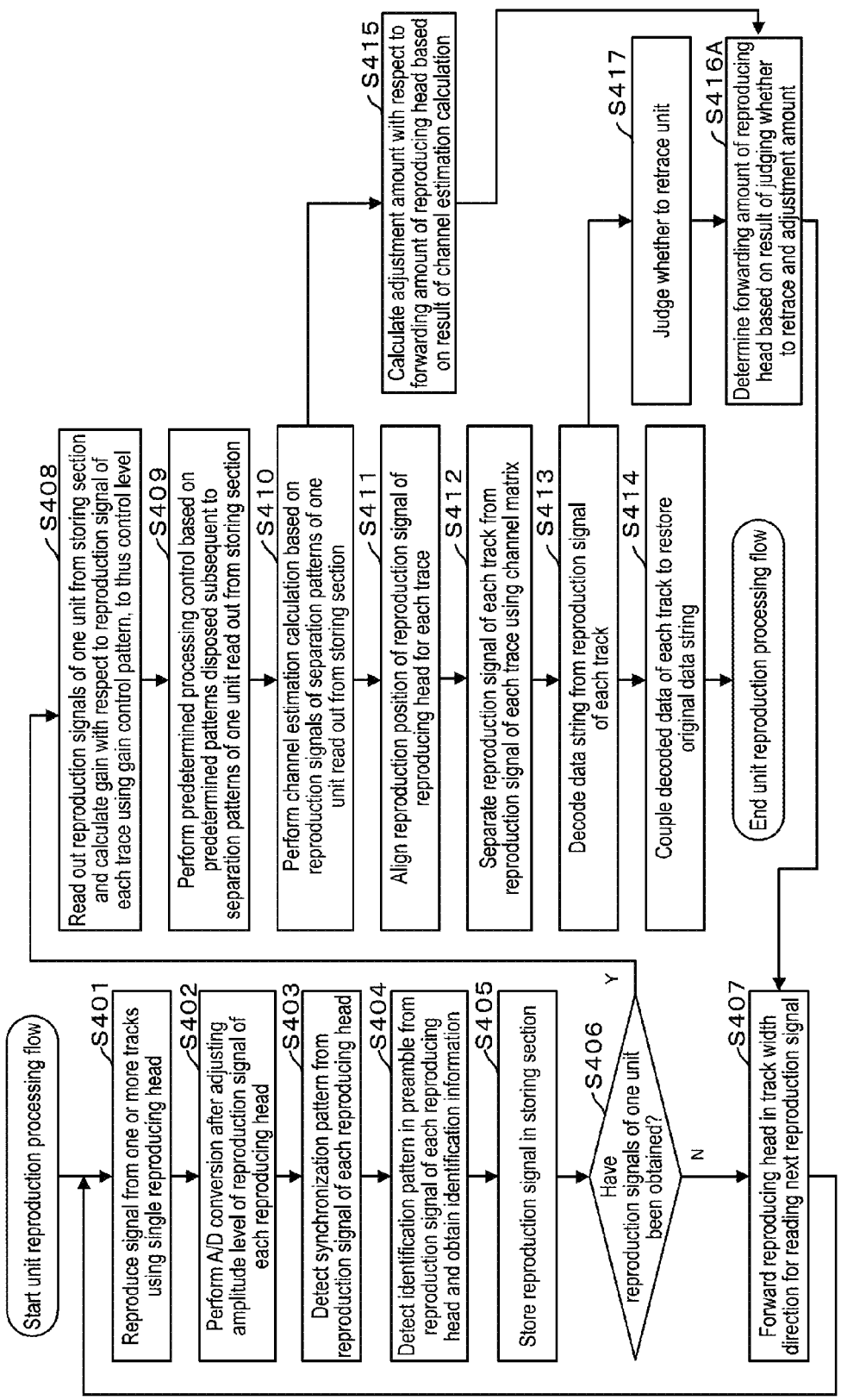
FIG. 28 is a flowchart showing a flow of a unit reproduction operation of the reproducing apparatus according to the fifth embodiment.

FIG. 28 is a flowchart showing a flow of a unit reproduction operation of the reproducing apparatus 400.

An operation of Steps S401 to S415 is the same as that of the reproducing apparatus 400 according to the fourth embodiment shown in FIG. 25. Thus, descriptions thereof will be omitted.

In Step S417, the track forwarding amount controller 271 receives the information on the result of the error correction (correction success/failure) from the multitrack demodulating section 240. When a content thereof is a correction failure, the track forwarding amount controller 271 transmits information instructing a retrace of the unit that has been reproduced until then to the track forwarding amount determining section 272.

Further, in Step S415, based on the channel matrix obtained by the channel estimate calculating section 234 through the channel estimation calculation, the track forwarding amount controller 271 calculates an adjustment amount with respect to the defined forwarding amount of the reproducing head R-1 in reproducing the next unit, and transmits the adjustment amount to the track forwarding amount determining section 272.

In Step S416A, when having received the information instructing the retrace of the unit from the track forwarding amount controller 271, the track forwarding amount determining section 272 determines the forwarding amount for moving the reproducing head R-1 to an appropriate position in the track width direction with respect to the unit to be retraced based on the adjustment amount output from the track forwarding amount controller 271, and outputs a control signal corresponding to the forwarding amount to the track forwarding section 273. As a result, the reproducing head R-1 is moved to an appropriate position in the track width direction for retracing the unit.

Figure 29:
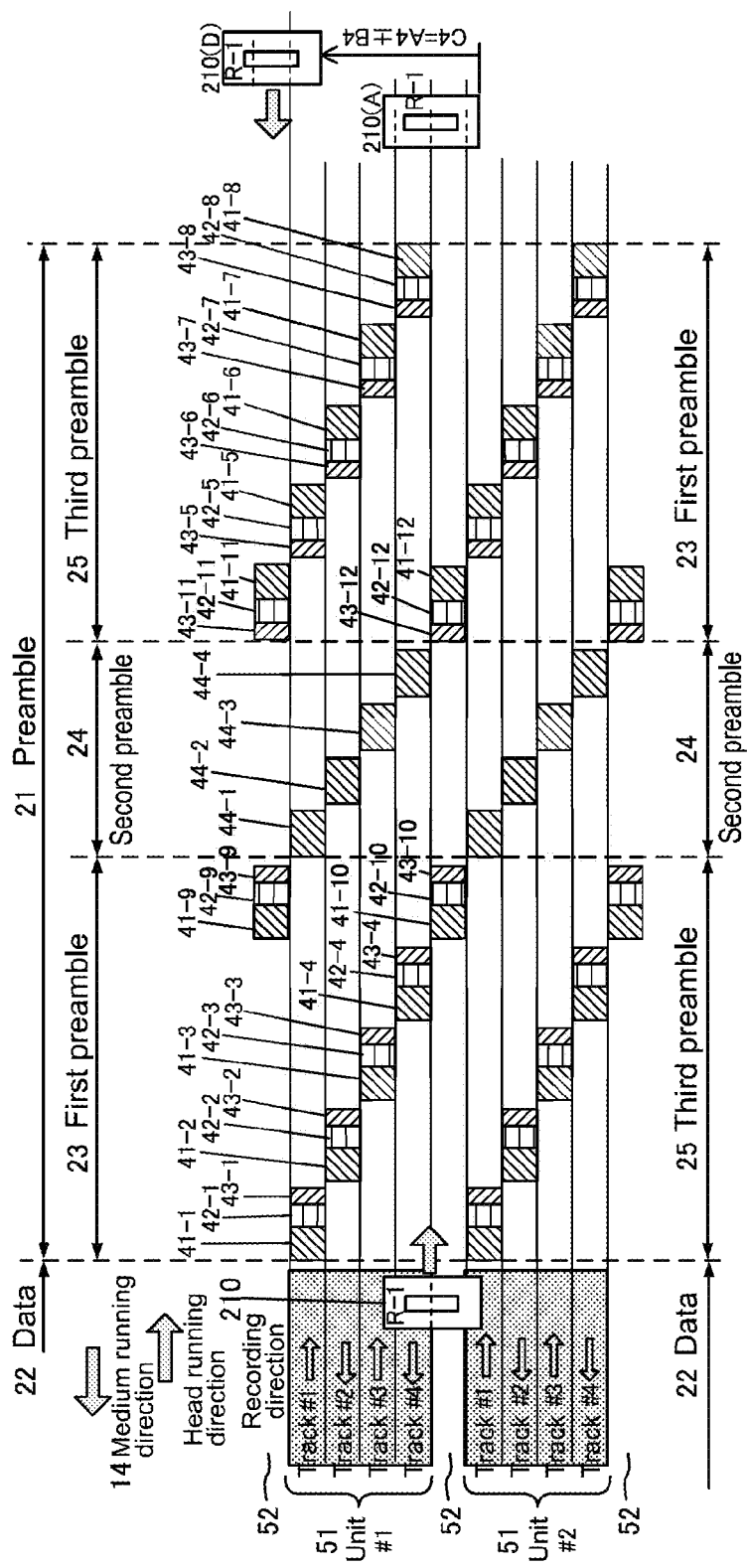
FIG. 29 is a diagram showing a specific example of an adjustment of a forwarding amount of a reproducing head when retracing a unit in the reproducing apparatus according to the fifth embodiment.

FIG. 29 is a diagram showing a specific example of an adjustment of the forwarding amount of the reproducing head R-1 in retracing the unit. FIG. 29 shows a state where the reproduction processing of the unit #1 is ended and a retrace of the same unit is about to be started next. 210(A) shows the reproducing head R-1 positioned at an end portion of the unit #1 in the reproduction direction upon completion of the reproduction of the unit #1. At this time, the position of the reproducing head R-1 is deviated downward in the figure by about 50% of the track width.

In this case, the track forwarding amount determining section 272 determines, based on an adjustment amount B4 output from the track forwarding amount controller 271 and a defined forwarding amount A4 for the retrace, a forwarding amount C4 (C4=A4±B4) for moving the reproducing head R-1 to an appropriate position in the track width direction for retracing the unit #1, and outputs a control signal corresponding to the forwarding amount C4 to the track forwarding section 273. It should be noted that in this embodiment, the defined forwarding amount A4 for the retrace is obtained as "track width×4 (number of tracks constituting unit)", and a value obtained by adjusting the defined forwarding amount A4 by the adjustment amount B4 is obtained as the appropriate forwarding amount C4. 210(D) shows a position of the reproducing head R-1 after being moved.

As described above, in the magnetic recording/reproducing system that uses a single head according to this embodiment, when an error correction has failed in the multitrack demodulating section 240, the retrace of the same unit is carried out. In this case, the track forwarding amount determining section 272 determines the forwarding amount for moving the reproducing head R-1 to an appropriate position in the track width direction with respect to the unit to be retraced based on the adjustment amount output from the track forwarding amount controller 271. Accordingly, the trace can be started from an appropriate position in the track width direction with respect to the unit from immediately after the start of the retrace of the unit, with the result that the data reproduction can be carried out favorably.

The present invention is applicable to not only the linear recording system described heretofore or a magnetic recording and reproduction using a non-azimuth recording system, but also a helical recording system and an azimuth recording system.

A specific example of this case will be described below.

Figure 30:
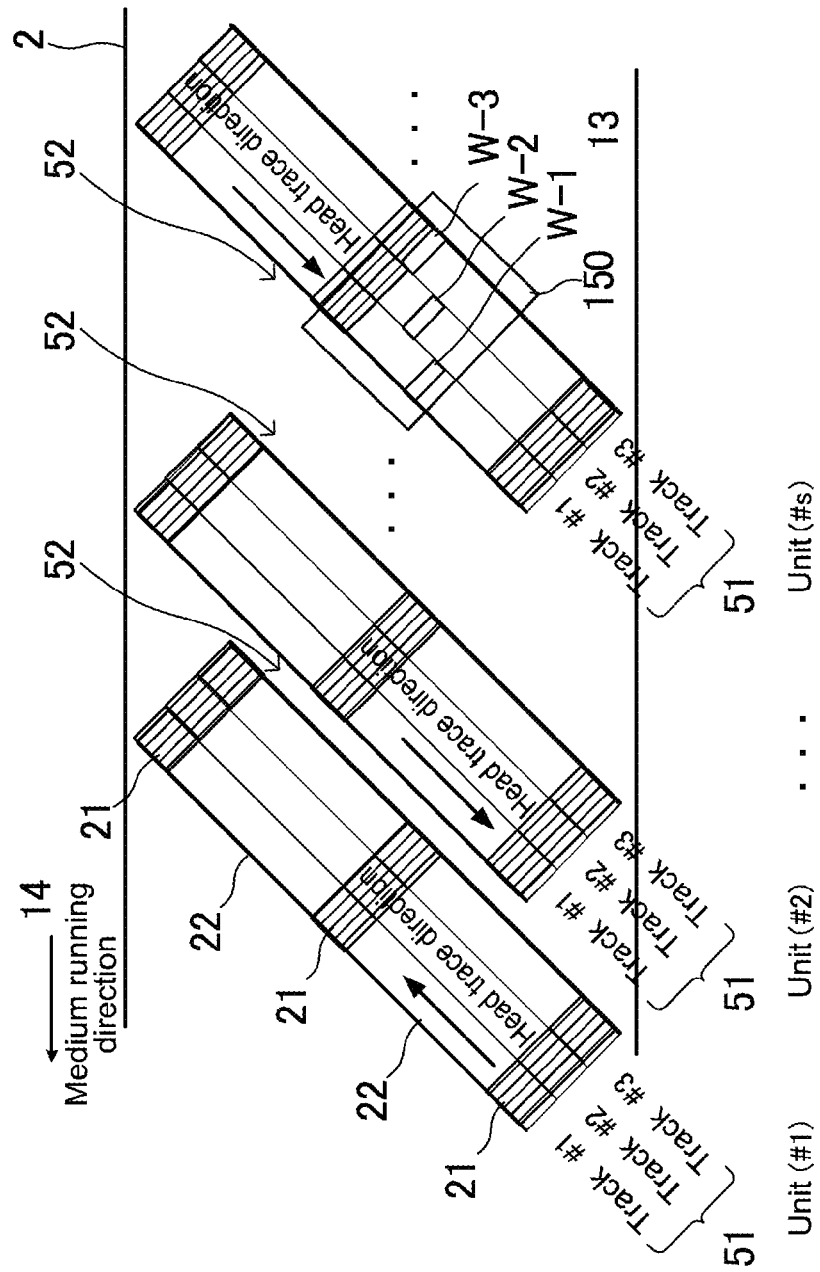
FIG. 30 is a conceptual diagram of a track format recorded onto a magnetic recording medium by a non-azimuth system and a helical scan system using a plurality of recording heads.

FIG. 30 is a conceptual diagram of a track format recorded onto the magnetic recording medium 2 by the non-azimuth system and the helical scan system using the plurality of recording heads W-1, W-2, and W-3 integrated like the recording head array 150, for example. Also in the helical scan system, a guard band 52 is provided between units 53 each constituted of tracks #1 to #3. The preamble 21 recorded on each of the tracks #1 to #3 may be the same as that of the above embodiments. A recording direction of a first unit (#1) is from bottom to top in the figure and a recording direction of a second unit (#2) is from top to bottom in the figure, and the recording direction is thereafter switched alternately in the running direction of the magnetic recording medium 2. The present invention is also applicable to the helical-scan-type magnetic recording/reproducing system as described above, and the structures of the recording apparatus 100 and the reproducing apparatus 200 in the magnetic recording/reproducing system according to the first embodiment may be employed.

It should be noted that for switching the recording direction between the forward direction and the backward direction, it is only necessary that a first drum that rotates in the forward direction and a second drum that rotates in the backward direction be provided as a drum mounted to a head, for example.

Figure 31:
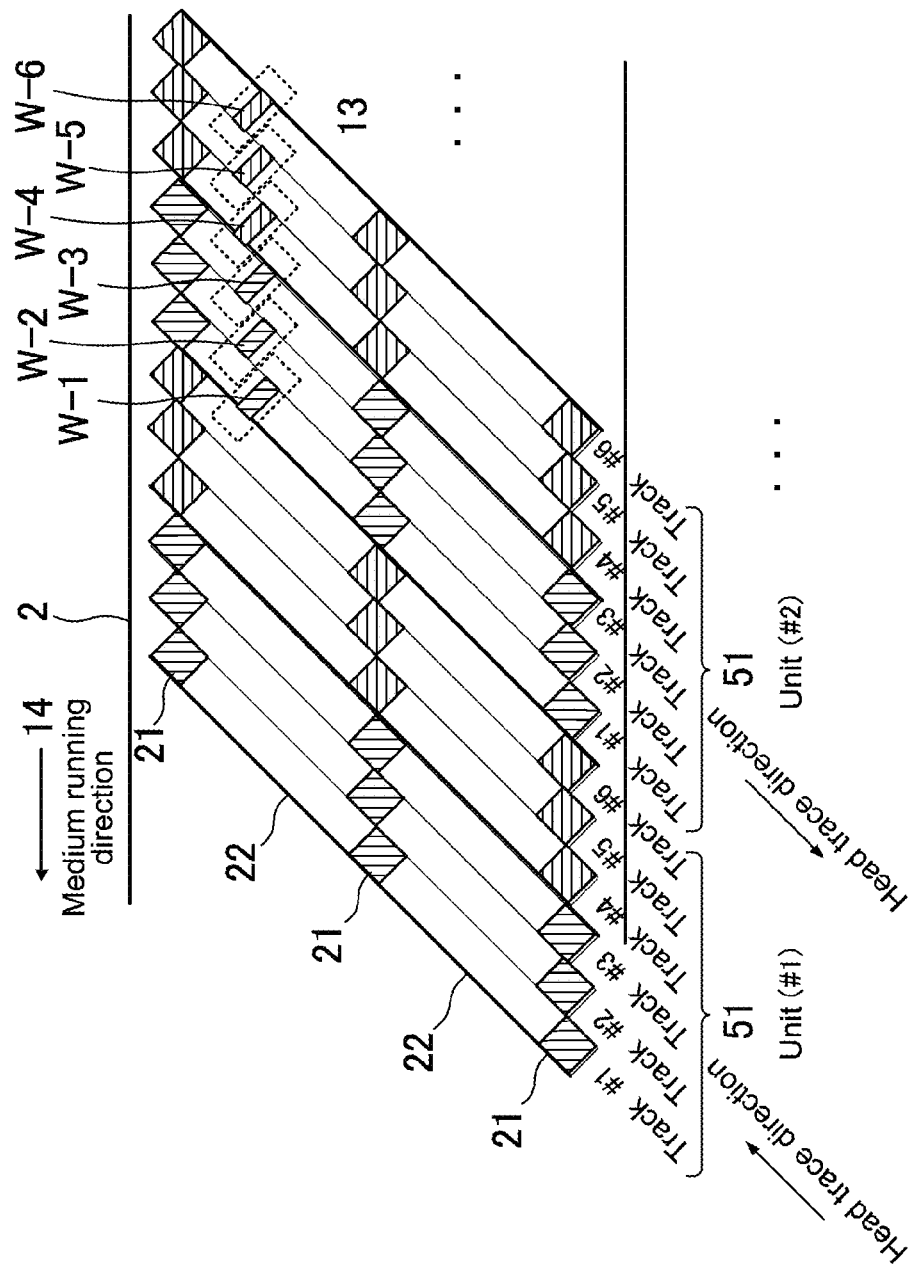
FIG. 31 is a conceptual diagram of a track format recorded onto a recording medium by a double azimuth system and a helical scan system using a plurality of recording heads.
Figure 32:
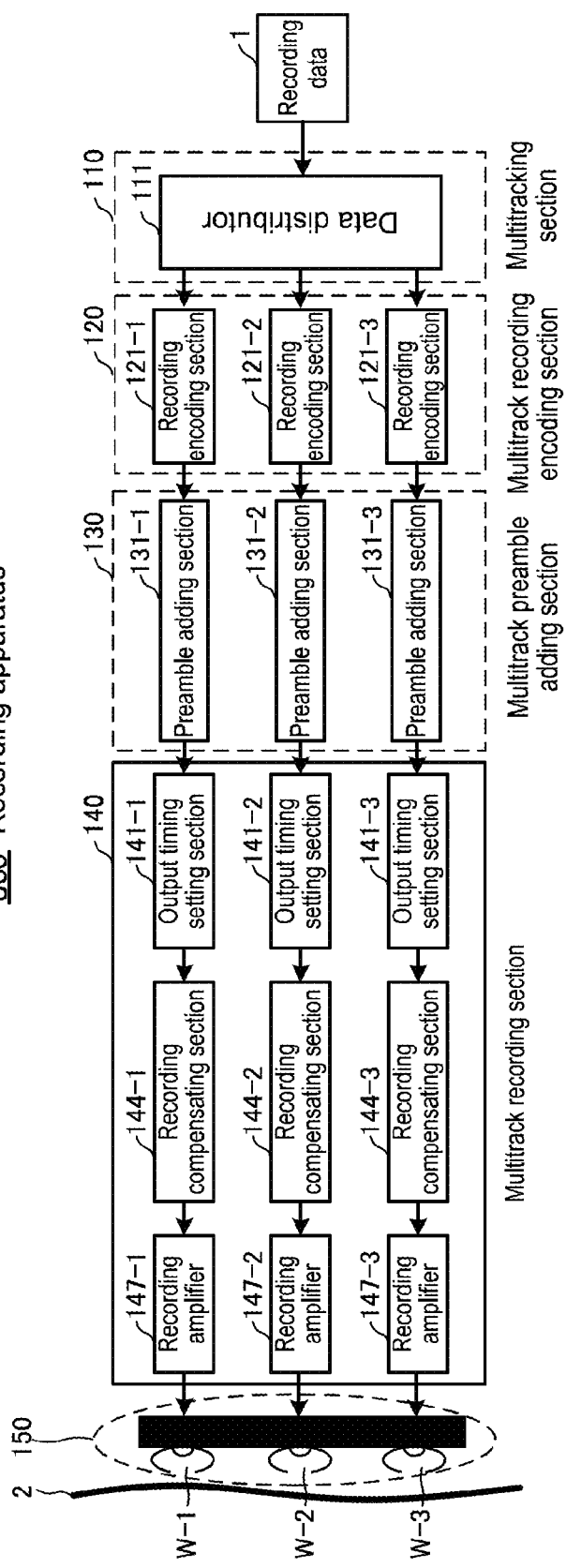
FIG. 32 is a diagram showing a structure of a recording apparatus employing a magnetic recording/reproducing system that the inventors of the present invention have proposed in the past.
Figure 33:
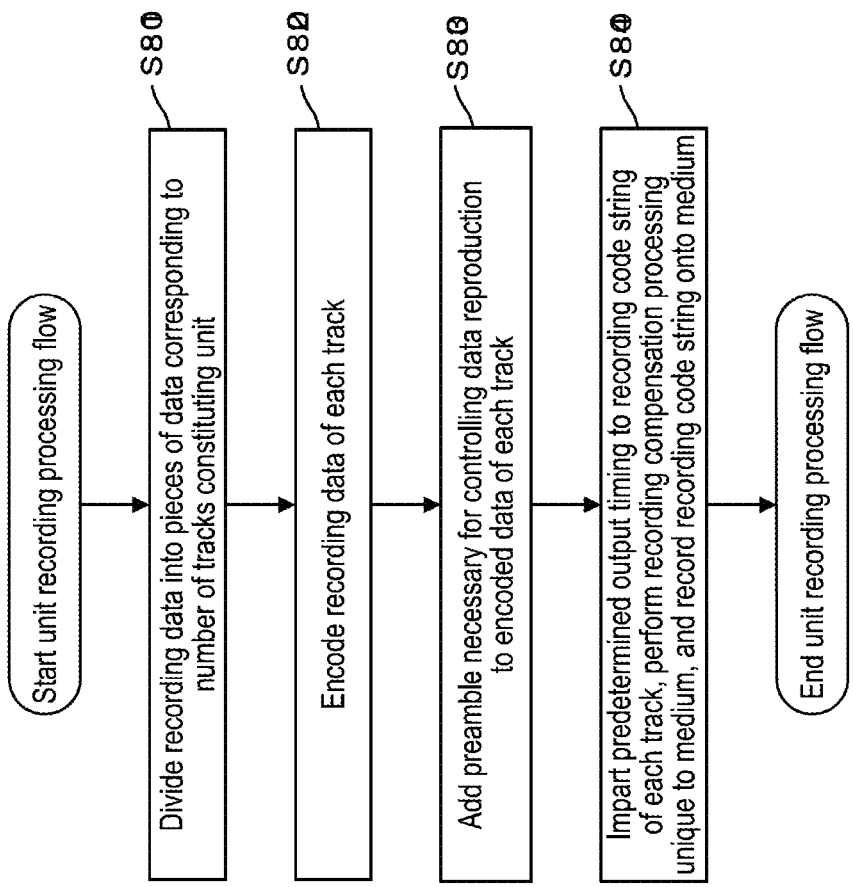
FIG. 33 is a flowchart showing a unit recording operation of the recording apparatus shown in FIG. 32.
Figure 34:
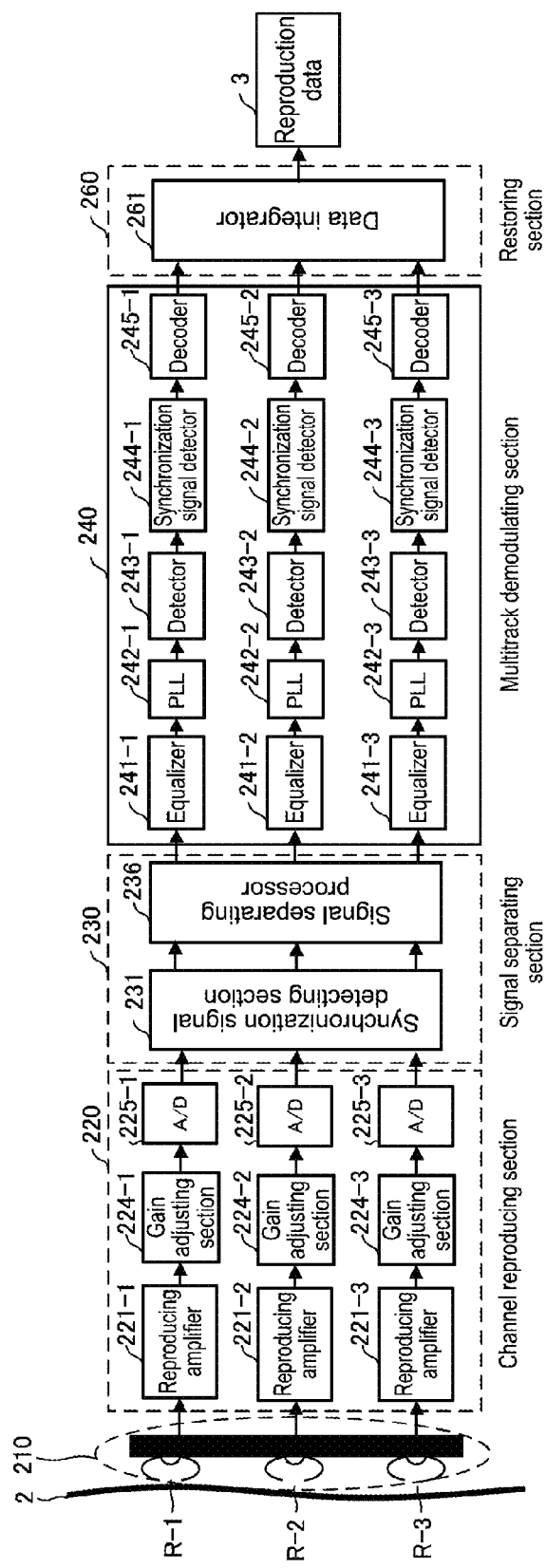
FIG. 34 is a diagram showing a structure of a reproducing apparatus employing the magnetic recording/reproducing system that the inventors of the present invention have proposed in the past.
Figure 35:
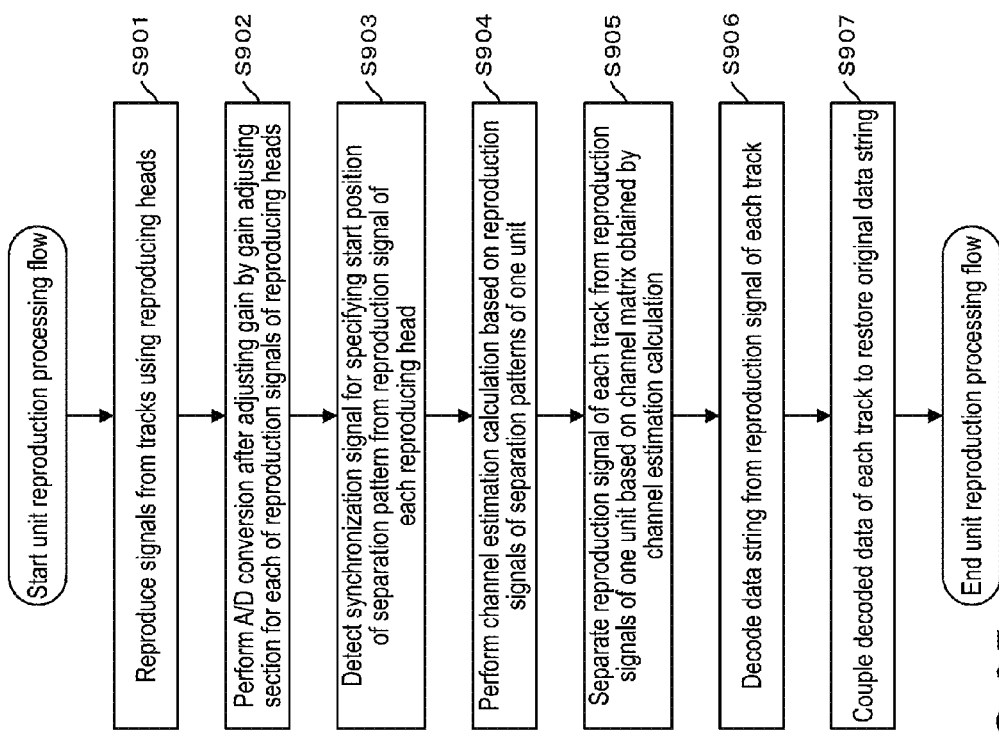
FIG. 35 is a flowchart showing a flow of a unit reproduction operation of the reproducing apparatus shown in FIG. 34.

FIG. 31 is a conceptual diagram of a track format recorded onto the recording medium by a double azimuth system and the helical scan system using a plurality of recording heads W-1, W-2, W-3, W-4, W-5, and W-6. In the magnetic recording using the helical scan system, the plurality of heads are mounted individually on a rotary drum, and a plurality of recording heads and reproducing heads are arranged alternately on the rotary drum.

In addition, a recording direction of a first unit (#1) is from bottom to top in the figure and a recording direction of a second unit (#2) is from top to bottom in the figure. For switching the recording direction between the forward direction and the backward direction as described above, a structure in which a drum that rotates in the forward direction and a drum that rotates in the backward direction are provided and six recording heads W-1, W-2, W-3, W-4, W-5, and W-6 are mounted to each of the drums is conceivable.

Out of the six recording heads W-1, W-2, W-3, W-4, W-5, and W-6, the three consecutive recording heads W-1, W-2, and W-3 and the remaining three consecutive recording heads W-4, W-5, and W-6 have mutually-different azimuth directions as magnetization directions of tracks. In other words, the tracks #1 to #3 have azimuth directions different from those of the tracks #4 to #6. The tracks #1 to #6 constitute a unit 51 that includes a plurality of tracks, the unit 51 being a unit of processing for data reproduction. It should be noted that a guard band is not required in the case of the double azimuth system.

It should be noted that in this example, a group of tracks #1 to #6 is set as a unit of signal processing for the data reproduction. However, the signal processing may be carried out with the three consecutive tracks (e.g., tracks #1 to #3 and tracks #4 to #6) having the same azimuth direction set as the unit 51.

A structure of a preamble recorded on each of the tracks #1 to #6 may be the same as that described in the above embodiments. The present invention is also applicable to the double-azimuth- and helical-scan-type magnetic recording/reproducing system, and the structures of the recording apparatus 100 and the reproducing apparatus 200 in the magnetic recording/reproducing system according to the first embodiment may be employed.

The present application contains subject matter related to that disclosed in Japanese Priority Patent Application JP 2008-181785 filed in the Japan Patent Office on Jul. 11, 2008 and Japanese Priority Patent Application JP 2008-182041 filed in the Japan Patent Office on Jul. 11, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording medium onto which a plurality of tracks that constitute a unit as one unit of signal processing for reproducing data are recorded, each of the plurality of tracks being recorded with at least data and, as a preamble for controlling the reproduction of the data, a separation pattern for detecting a positional relationship between a reproducing head and the plurality of tracks in a track width direction and synchronization patterns for synchronization processing, the synchronization patterns being recorded in front and rear of the separation pattern in a running direction of the plurality of tracks;
    wherein the synchronization patterns recorded in front and rear of the separation pattern are constituted of code strings that are longitudinally symmetric with respect to each other;
    wherein the preamble is at least recorded at a start point and an end point of each of the plurality of tracks;
    wherein, in addition to the synchronization patterns, gain control patterns constituted of second code strings that are longitudinally symmetric with respect to each other are recorded in front and rear of the separation pattern, and
    wherein an order in which the synchronization pattern and the gain control pattern are arranged in front of the separation pattern and an order in which the synchronization pattern and the gain control pattern are arranged in the rear of the separation pattern are longitudinally symmetric with respect to each other.

2. The recording medium according to claim 1,
    wherein, in addition to the synchronization patterns and the gain control patterns, track identification patterns constituted of code strings that are longitudinally symmetric with respect to each other are recorded in front and rear of the separation pattern, and
    wherein an order in which the synchronization pattern, the gain control pattern, and the track identification pattern are arranged in front of the separation pattern and an order in which the synchronization pattern, the gain control pattern, and the track identification pattern are arranged in the rear of the separation pattern are longitudinally symmetric with respect to each other.

3. The recording medium according to claim 2,
    wherein the synchronization patterns, the gain control patterns, and the track identification patterns recorded in front and rear of the separation pattern are also recorded on a guard band between units.

4. A recording apparatus for recording onto a recording medium using a recording head a plurality of tracks that constitute a unit as one unit of signal processing for reproducing data, the recording apparatus comprising:
    a recording encoding section to encode data to be recorded for each of the plurality of tracks;
    a preamble adding section to add, to the data of each of the plurality of tracks that has been encoded by the recording encoding section, as a preamble for controlling the reproduction of the data, a separation pattern for detecting a positional relationship between a reproducing head and the plurality of tracks in a track width direction, the separation pattern being provided with synchronization patterns for synchronization processing in front and rear thereof wherein a synchronization pattern and a gain control pattern are arranged in the front of the separation pattern and an order in which the synchronization pattern and the gain control pattern in the rear of the separation pattern are longitudinally symmetric with respect to one another; and
    a multitrack recording section to carry out processing for recording the data of each of the plurality of tracks, to which the preamble has been added, onto the recording medium using the recording head.

5. A reproducing apparatus reproducing a recording medium onto which a plurality of tracks that constitute a unit as one unit of signal processing for reproducing data are recorded, each of the plurality of tracks being recorded with at least data and, as a preamble for controlling the reproduction of the data, a separation pattern for detecting a positional relationship between a reproducing head and the plurality of tracks in a track width direction and synchronization patterns for synchronization processing, the synchronization patterns being recorded in front and rear of the separation pattern in a running direction of the plurality of tracks, the reproducing apparatus comprising:
    a detecting section to detect the synchronization patterns in front and rear of the separation pattern wherein a synchronization pattern and a gain control pattern are arranged in the front of the separation pattern and an order in which the synchronization pattern and the gain control pattern in the rear of the separation pattern are longitudinally symmetric with respect to one another; and
    an estimating section to estimate a head position of the separation pattern and the data based on a result of detecting the synchronization patterns by the detecting section at a time of reproduction in a first direction along the plurality of tracks and a time of reproduction in a second direction opposite to the first direction.

6. A reproducing apparatus reproducing a tape-like recording medium onto which a plurality of tracks that constitute a unit as one unit of signal processing for reproducing data are recorded, each of the plurality of tracks being recorded with data and, as a pattern for controlling the reproduction of the data, a preamble including a separation pattern for detecting a positional relationship between a reproducing head and the plurality of tracks in a track width direction, the unit being recorded plurally in parallel to each other along a running direction of the plurality of tracks, the reproducing apparatus comprising:
    one or more reproducing heads capable of reproducing signals across one or more tracks;
    an estimating section to estimate a positional relationship between the one or more reproducing heads and the plurality of tracks in the track width direction at a time of the reproduction using a reproduction signal of the separation pattern; and a forwarding amount calculating section to calculate a forwarding amount of the one or more reproducing heads at a time of switching the unit to be reproduced based on the positional relationship obtained by the estimating section;

wherein the forwarding amount calculating section calculates an adjustment amount with respect to a defined forwarding amount of the one or more reproducing heads at the time of switching the unit to be reproduced based on the positional relationship obtained by the estimating section, and calculates a value obtained by adjusting the defined forwarding amount by the adjustment amount as a calculation result;

a judging section to judge a quality of the reproduced data, wherein the forwarding amount calculating section additionally calculates a forwarding amount of the one or more reproducing heads at a time of retracing the unit when reproduction data of a unit that does not satisfy a predetermined quality is judged by the judging section.

7. The reproducing apparatus according to claim 6, wherein the preamble recorded onto the recording medium is constituted of patterns that are capable of being reproduced in both a forward direction as a running direction of the plurality tracks and a backward direction opposite thereto, the reproduction direction at a time of trace being switched alternately between the forward direction and the backward direction.

8. The reproducing apparatus according to claim 7, wherein the preamble includes gain control patterns in front and rear of the separation pattern, the reproducing apparatus further comprising a gain controller to control a gain with respect to a reproduction output of the one or more reproducing heads based on a reproduction signal of the gain control patterns in the preamble.

9. The reproducing apparatus according to claim 7, wherein the preamble includes, in front and rear of the separation pattern, synchronization patterns for estimating a head position of a pattern and data disposed subsequent thereto in terms of a reproduction order, the reproducing apparatus further comprising a detecting section to detect the synchronization patterns in the preamble.

10. A method of reproducing a tape-like recording medium onto which a plurality of tracks that constitute a unit as one unit of signal processing for reproducing data are recorded, each of the plurality of tracks being recorded with data and, as a pattern for controlling the reproduction of the data, a preamble including a separation pattern for detecting a positional relationship between a reproducing head and the plurality of tracks in a track width direction at a time of the reproduction, the unit being recorded plurally in parallel to each other along a running direction of the plurality of tracks, including a synchronization pattern and a gain control pattern arranged in a rear of the separation pattern longitudinally symmetric with respect to one another, the method comprising:

estimating a positional relationship between one or more reproducing heads capable of reproducing signals across one or more tracks and the plurality of tracks in the track width direction at the time of the reproduction using a reproduction signal of the separation pattern; and calculating a forwarding amount of the one or more reproducing heads at a time of switching the unit to be reproduced based on the estimated positional relationship.

* * * * *